(12) United States Patent
Takeshita et al.

(10) Patent No.: US 8,293,395 B2
(45) Date of Patent: Oct. 23, 2012

(54) METHOD FOR PREVENTING ERRONEOUS LOADING OF COMPONENT-TO-BE-LOADED ON MAIN BODY SIDE APPARATUS, COMPONENT-TO-BE-LOADED AND BATTERY PACK

(75) Inventors: Toshio Takeshita, Kanagawa (JP); Nobuhito Ebine, Tokyo (JP); Yoshiyuki Katsuno, Tokyo (JP); Kei Tashiro, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/162,018

(22) Filed: Jun. 16, 2011

(65) Prior Publication Data

US 2011/0244288 A1    Oct. 6, 2011

Related U.S. Application Data

(60) Continuation of application No. 12/940,227, filed on Nov. 5, 2010, which is a continuation of application No. 11/586,799, filed on Oct. 26, 2006, now Pat. No. 7,879,481, which is a division of application No. 10/381,394, filed as application No. PCT/JP02/07497 on Jul. 24, 2002, now Pat. No. 7,223,494.

(30) Foreign Application Priority Data

Jul. 24, 2001 (JP) ................. 2001-222951
Aug. 31, 2001 (JP) ................. 2001-263672

(51) Int. Cl.
*H01M 2/10* (2006.01)
*H01M 2/02* (2006.01)

(52) U.S. Cl. ....................... 429/100; 429/178

(58) Field of Classification Search ............ 429/178, 429/99–100, 179; 320/114; 26/246, 745, 26/746; 439/500, 754–774
See application file for complete search history.

(56) References Cited

U.S. PATENT DOCUMENTS

| | | | |
|---|---|---|---|
| 5,602,454 A | | 2/1997 | Arakawa et al. |
| 5,626,979 A | * | 5/1997 | Mitsui et al. ............... 429/97 |
| 5,672,441 A | | 9/1997 | Aoki et al. |
| 6,095,839 A | * | 8/2000 | Kline ...................... 439/224 |
| 6,235,426 B1 | | 5/2001 | Yanai et al. |

(Continued)

FOREIGN PATENT DOCUMENTS

EP    0 676 819    10/1995

(Continued)

OTHER PUBLICATIONS

Patent Abstracts of Japan, vol. 1996, No. 06, Jun. 28, 1996 & JP 08 050891 A (Fuji Elelctrochem Co Ltd), Feb. 20, 1996.

*Primary Examiner* — Ula C. Ruddock
*Assistant Examiner* — Thomas H. Parsons
(74) *Attorney, Agent, or Firm* — Frommer Lawrence & Haug LLP; William S. Frommer

(57) ABSTRACT

A battery device having a casing configured to house at least one battery cell and having an end surface that defines an outermost surface of the casing. A terminal case disposed in the casing has terminal grooves, terminal members in the terminal grooves and guide grooves. The terminal case projects outwardly from the end surface of the casing so as to extend beyond the outermost surface of that case.

4 Claims, 40 Drawing Sheets

U.S. PATENT DOCUMENTS

| | | | |
|---|---|---|---|
| 6,291,970 B1 | 9/2001 | Miller et al. | |
| 6,380,713 B2 * | 4/2002 | Namura | 320/112 |
| 6,521,370 B1 | 2/2003 | Takeshita et al. | |
| 6,577,101 B1 | 6/2003 | Takeshita et al. | |
| 6,749,960 B2 | 6/2004 | Takeshita et al. | |
| 7,556,526 B2 | 7/2009 | Ebine et al. | |

FOREIGN PATENT DOCUMENTS

| | | |
|---|---|---|
| EP | 0 707 350 | 4/1996 |
| EP | 1 030 385 | 8/2000 |
| EP | 1 033 766 | 9/2000 |
| EP | 1 071 147 | 1/2001 |
| JP | 59 56831 | 4/1984 |
| JP | 60 51869 | 4/1985 |
| JP | 62 4066 | 1/1987 |
| JP | 64 35854 | 2/1989 |
| JP | 1 146456 | 10/1989 |
| JP | 3 59954 | 3/1991 |
| JP | 3 118552 | 12/1991 |
| JP | 5 290821 | 11/1993 |
| JP | 6-132022 | 5/1994 |
| JP | 7-335186 | 12/1995 |
| JP | 7-335187 | 12/1995 |
| JP | 8-77991 | 3/1996 |
| JP | 9-55196 | 2/1997 |
| JP | 10 210664 | 8/1998 |
| JP | 2000 58015 | 2/2000 |
| JP | 2000 90961 | 3/2000 |
| JP | 2001 43841 | 2/2001 |
| JP | 2001 57205 | 2/2001 |
| JP | 2003 18753 | 1/2003 |
| JP | 2003 086158 | 3/2003 |

* cited by examiner

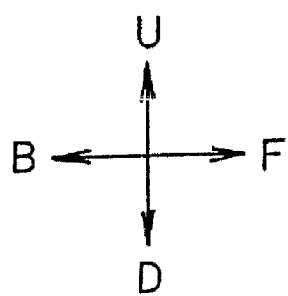
FIG. 2
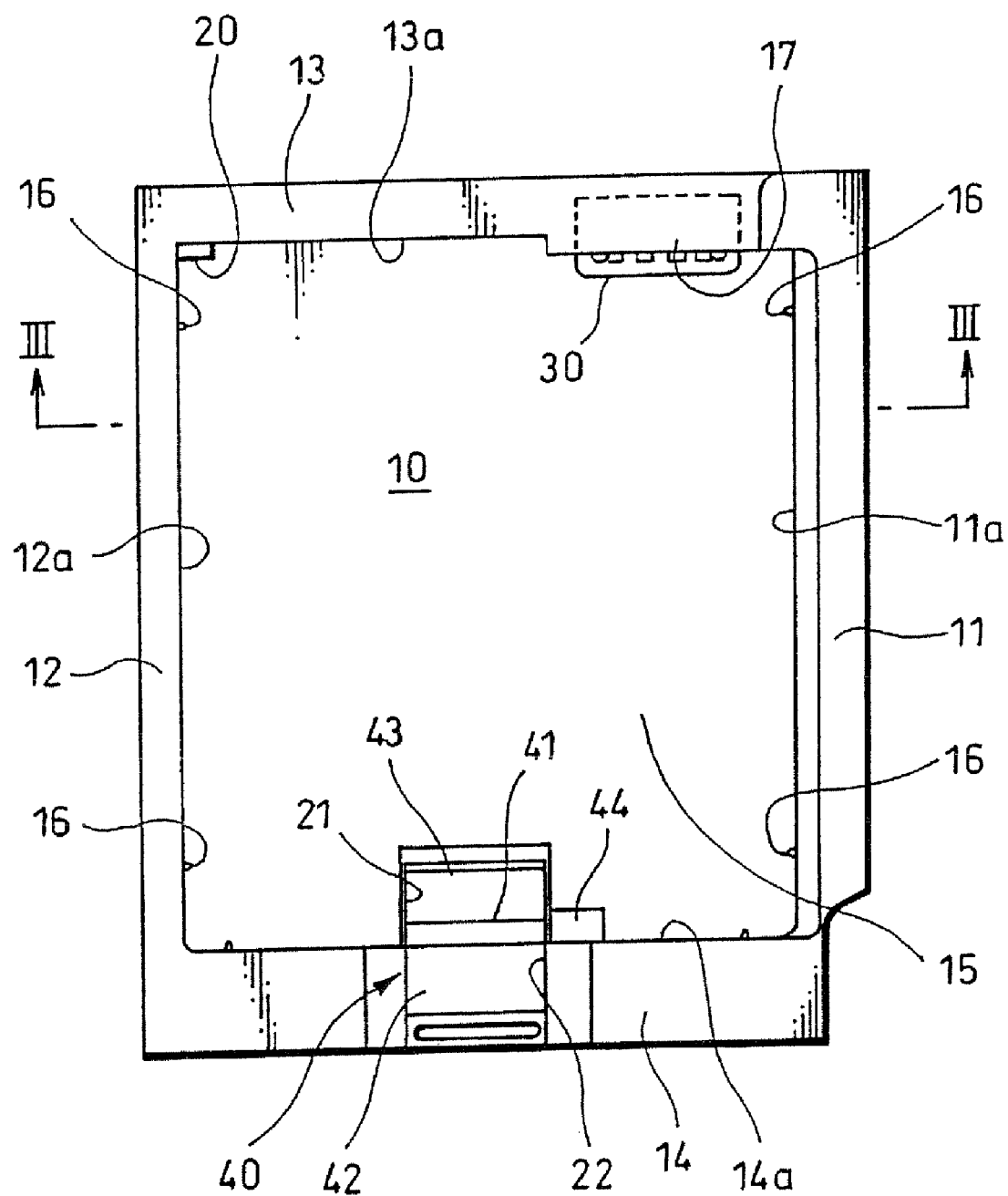

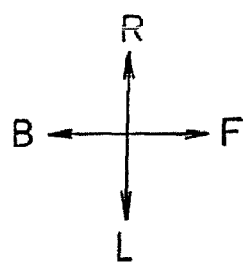
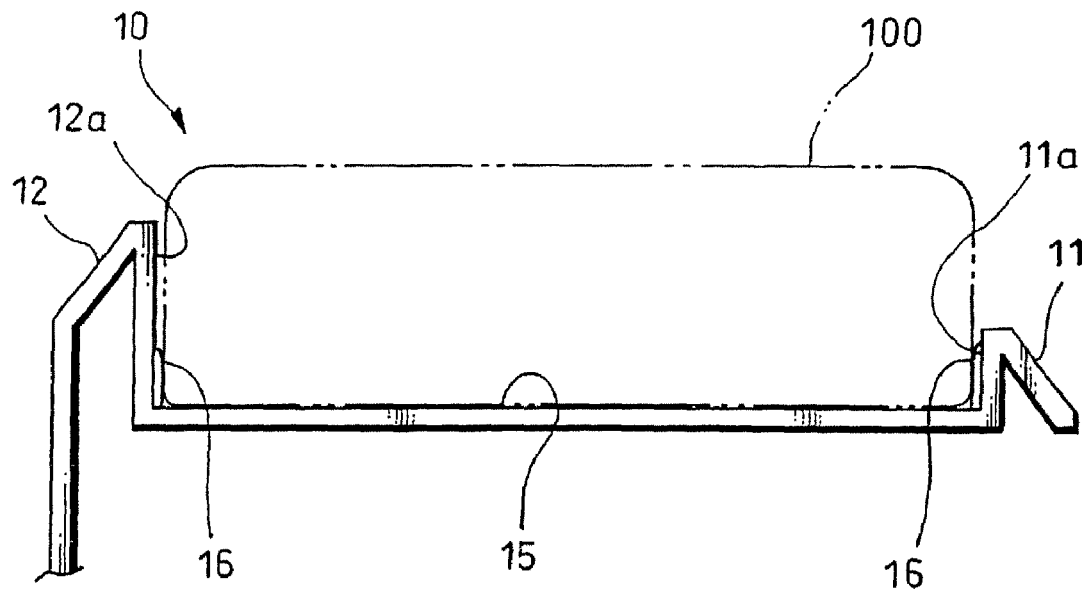
FIG. 3

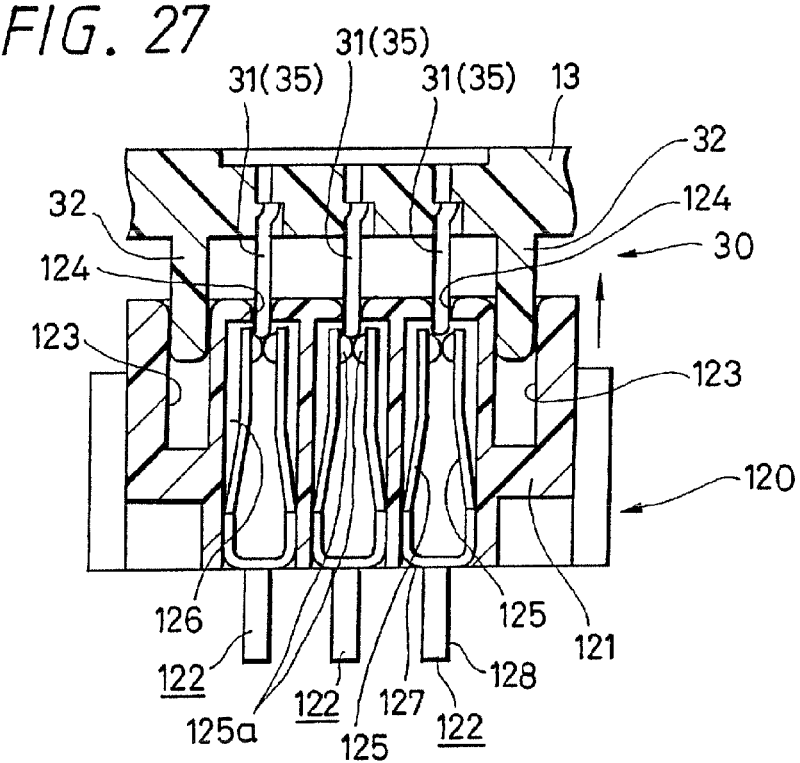
FIG. 27
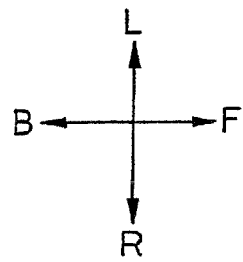
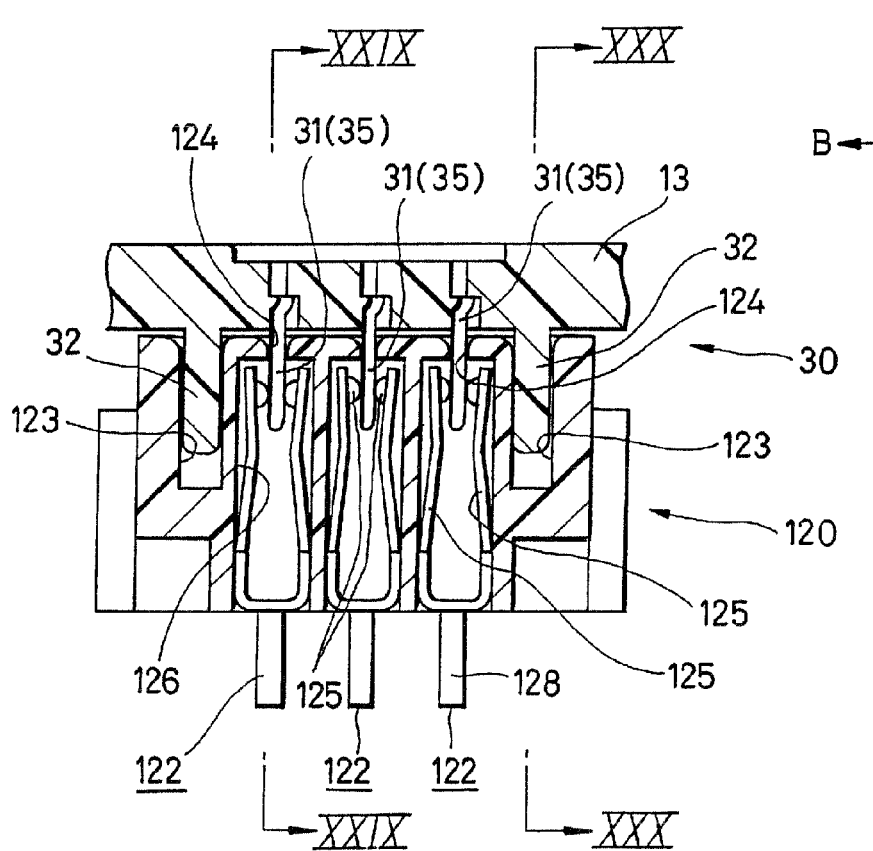
FIG. 28
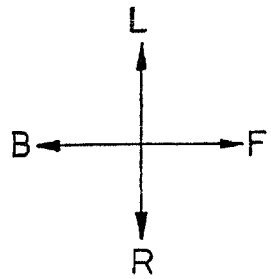

FIG. 31

Contact Resistance
Phosphor Bronze t = 0.2mm

Unit:mΩ

| | First Time | 100 Times | 500 Times | 1000 Times | 2000 Times | 3000 Times | 4000 Times | 5000 Times | 6000 Times | 7000 Times |
|---|---|---|---|---|---|---|---|---|---|---|
| Minimum Value | 7.04 | 7.02 | 7.21 | 7.35 | 7.86 | 7.35 | 8.03 | 8.05 | 7.78 | 8.94 |
| Maximum Value | 9.98 | 10.59 | 12.75 | 13.43 | 12.03 | 12.26 | 12.44 | 11.78 | 12.69 | 12.54 |
| Average Value | 8.654 | 8.741 | 10.129 | 10.129 | 10.338 | 9.613 | 9.540 | 9.539 | 9.809 | 10.317 |

Phosphor Bronze t = 0.15mm

| | First Time | 100 Times | 500 Times | 1000 Times | 2000 Times | 3000 Times | 4000 Times | 5000 Times | 6000 Times | 7000 Times |
|---|---|---|---|---|---|---|---|---|---|---|
| Minimum Value | 9.21 | 9.25 | 9.36 | 9.42 | 10.92 | 11.06 | 10.73 | 10.12 | 13.87 | 11.96 |
| Maximum Value | 11.89 | 11.99 | 17.86 | 17.48 | 19.11 | 19.52 | 18.32 | 17.49 | 18.61 | 21.60 |
| Average Value | 10.527 | 10.820 | 13.168 | 13.020 | 16.328 | 15.612 | 14.162 | 13.888 | 16.388 | 17.497 |

Beryllium Copper t = 0.2mm

| | First Time | 100 Times | 500 Times | 1000 Times | 2000 Times | 3000 Times | 4000 Times | 5000 Times | 6000 Times | 7000 Times |
|---|---|---|---|---|---|---|---|---|---|---|
| Minimum Value | 5.01 | 5.70 | 5.31 | 5.35 | 6.30 | 5.70 | 5.37 | 5.69 | 6.14 | 6.13 |
| Maximum Value | 9.40 | 6.35 | 8.41 | 9.25 | 8.68 | 9.77 | 9.12 | 9.87 | 8.19 | 9.35 |
| Average Value | 6.608 | 6.070 | 6.713 | 7.725 | 7.623 | 7.498 | 6.975 | 7.217 | 7.050 | 7.413 |

Beryllium Copper t = 0.15mm

| | First Time | 100 Times | 500 Times | 1000 Times | 2000 Times | 3000 Times | 4000 Times | 5000 Times | 6000 Times | 7000 Times |
|---|---|---|---|---|---|---|---|---|---|---|
| Minimum Value | 7.30 | 7.23 | 6.84 | 7.80 | 7.61 | 8.22 | 9.97 | 8.54 | 8.04 | 8.31 |
| Maximum Value | 11.90 | 11.03 | 10.69 | 10.76 | 11.21 | 13.89 | 12.72 | 13.80 | 13.03 | 13.40 |
| Average Value | 8.881 | 8.437 | 8.545 | 9.083 | 8.837 | 10.502 | 11.555 | 10.805 | 11.200 | 10.943 |

FIG. 32

Engaging Force
Phosphor Bronze t = 0.2mm                                                                                    Unit:N

| | First Time | 100 Times | 500 Times | 1000 Times | 2000 Times | 3000 Times | 4000 Times | 5000 Times | 6000 Times | 7000 Times |
|---|---|---|---|---|---|---|---|---|---|---|
| Minimum Value | 2.34 | 1.93 | 1.87 | 1.78 | 1.63 | 1.60 | 1.66 | 1058 | 1.50 | 1.34 |
| Maximum Value | 2.70 | 2.14 | 2.24 | 1.99 | 1.79 | 1.75 | 1.80 | 1.77 | 1.76 | 1.80 |
| Average Value | 2.470 | 2.043 | 2.023 | 1.877 | 1.687 | 1.690 | 1.717 | 1.643 | 1.653 | 1.580 |

Phosphor Bronze t = 0.15mm

| | First Time | 100 Times | 500 Times | 1000 Times | 2000 Times | 3000 Times | 4000 Times | 5000 Times | 6000 Times | 7000 Times |
|---|---|---|---|---|---|---|---|---|---|---|
| Minimum Value | 1.17 | 0.97 | 0.95 | 0.81 | 0.82 | 0.80 | 0.77 | 0.77 | 0.78 | 0.72 |
| Maximum Value | 1.31 | 1.18 | 1.06 | 0.86 | 0.91 | 0.90 | 0.84 | 0.88 | 0.90 | 0.82 |
| Average Value | 1.240 | 1.075 | 1.005 | 0.835 | 0.865 | 0.850 | 0.805 | 0.825 | 0.840 | 0.770 |

Beryllium Copper t = 0.2mm

| | First Time | 100 Times | 500 Times | 1000 Times | 2000 Times | 3000 Times | 4000 Times | 5000 Times | 6000 Times | 7000 Times |
|---|---|---|---|---|---|---|---|---|---|---|
| Minimum Value | 1.86 | 1.73 | 1.64 | 1.70 | 1.35 | 1.54 | 1.73 | 1.61 | 1.64 | 1.43 |
| Maximum Value | 1.99 | 1.80 | 1.95 | 1.96 | 1.63 | 1.93 | 1.92 | 1.72 | 1.71 | 1.54 |
| Average Value | 1.925 | 1.765 | 1.795 | 1.830 | 1.490 | 1.735 | 1.825 | 1.665 | 1.675 | 1.485 |

Beryllium Copper t = 0.15mm

| | First Time | 100 Times | 500 Times | 1000 Times | 2000 Times | 3000 Times | 4000 Times | 5000 Times | 6000 Times | 7000 Times |
|---|---|---|---|---|---|---|---|---|---|---|
| Minimum Value | 1.22 | 1.13 | 0.92 | 0.86 | 0.90 | 1.01 | 1.01 | 0.87 | 0.95 | 0.86 |
| Maximum Value | 1.28 | 1.23 | 1.12 | 0.91 | 1.04 | 1.06 | 1.15 | 1.03 | 0.96 | 0.96 |
| Average Value | 1.250 | 1.180 | 1.020 | 0.885 | 0.970 | 1.035 | 1.080 | 0.950 | 0.955 | 0.910 |

FIG. 33

Disengaging Force
Unit:mΩ

Phosphor Bronze t = 0.2mm

| | First Time | 100 Times | 500 Times | 1000 Times | 2000 Times | 3000 Times | 4000 Times | 5000 Times | 6000 Times | 7000 Times |
|---|---|---|---|---|---|---|---|---|---|---|
| Minimum Value | 0.37 | 0.43 | 0.51 | 0.64 | 0.54 | 0.64 | 0.77 | 0.58 | 0.70 | 0.69 |
| Maximum Value | 0.48 | 0.54 | 0.72 | 0.94 | 0.84 | 0.81 | 0.96 | 0.87 | 0.92 | 0.87 |
| Average Value | 0.423 | 0.467 | 0.623 | 0.773 | 0.723 | 0.747 | 0.837 | 0.753 | 0.807 | 0.800 |

Phosphor Bronze t = 0.15mm

| | First Time | 100 Times | 500 Times | 1000 Times | 2000 Times | 3000 Times | 4000 Times | 5000 Times | 6000 Times | 7000 Times |
|---|---|---|---|---|---|---|---|---|---|---|
| Minimum Value | 0.38 | 0.32 | 0.31 | 0.30 | 0.31 | 0.28 | 0.28 | 0.25 | 0.26 | 0.28 |
| Maximum Value | 0.41 | 0.33 | 0.34 | 0.32 | 0.33 | 0.33 | 0.30 | 0.33 | 0.35 | 0.32 |
| Average Value | 0.395 | 0.325 | 0.325 | 0.310 | 0.320 | 0.305 | 0.290 | 0.290 | 0.305 | 0.300 |

Beryllium Copper t = 0.2mm

| | First Time | 100 Times | 500 Times | 1000 Times | 2000 Times | 3000 Times | 4000 Times | 5000 Times | 6000 Times | 7000 Times |
|---|---|---|---|---|---|---|---|---|---|---|
| Minimum Value | 0.53 | 0.57 | 0.95 | 0.85 | 0.91 | 1.29 | 1.24 | 1.22 | 1.14 | 1.16 |
| Maximum Value | 0.55 | 0.58 | 0.99 | 1.38 | 1.10 | 1.33 | 1.28 | 1.27 | 1.29 | 1.19 |
| Average Value | 0.540 | 0.575 | 0.970 | 1.115 | 1.005 | 1.310 | 1.260 | 1.245 | 1.215 | 1.175 |

Beryllium Copper t = 0.15mm

| | First Time | 100 Times | 500 Times | 1000 Times | 2000 Times | 3000 Times | 4000 Times | 5000 Times | 6000 Times | 7000 Times |
|---|---|---|---|---|---|---|---|---|---|---|
| Minimum Value | 0.24 | 0.31 | 0.33 | 0.31 | 0.45 | 0.44 | 0.46 | 0.35 | 0.32 | 0.36 |
| Maximum Value | 0.26 | 0.32 | 0.37 | 0.42 | 0.53 | 0.51 | 0.48 | 0.39 | 0.45 | 0.46 |
| Average Value | 0.250 | 0.315 | 0.350 | 0.365 | 0.490 | 0.475 | 0.470 | 0.370 | 0.385 | 0.410 |

FIG. 37 — Type I (Charge-Complying-Type Video Camera) (Battery Charger)

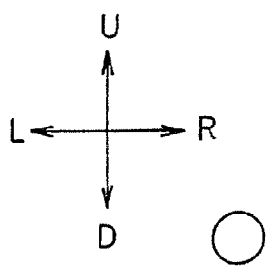
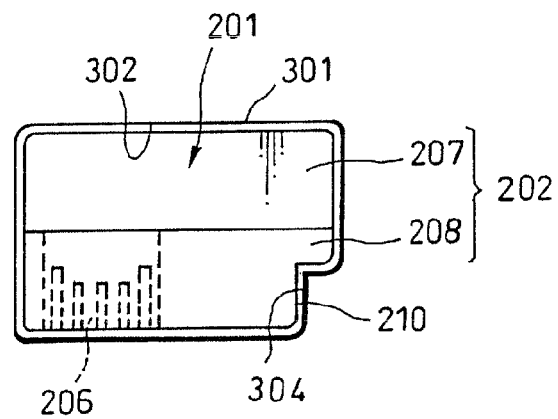
FIG. 52A
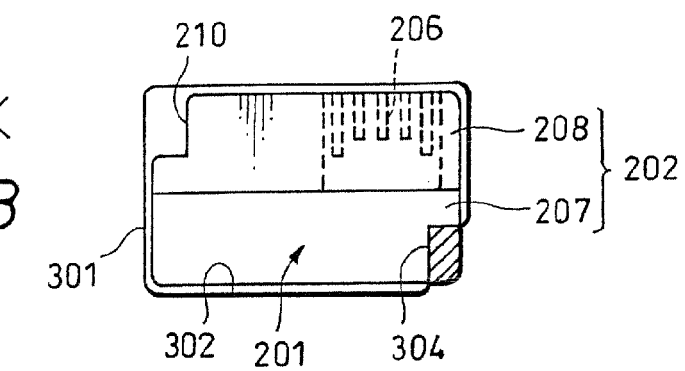
FIG. 52B
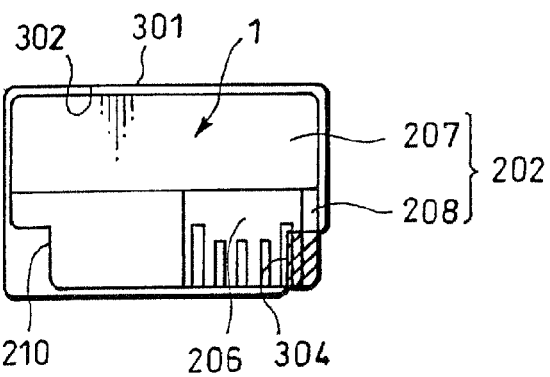
FIG. 52C
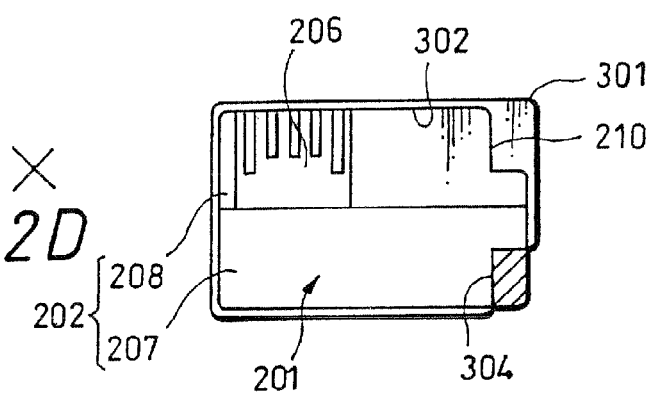
FIG. 52D

METHOD FOR PREVENTING ERRONEOUS LOADING OF COMPONENT-TO-BE-LOADED ON MAIN BODY SIDE APPARATUS, COMPONENT-TO-BE-LOADED AND BATTERY PACK

This is a continuation of application Ser. No. 12/940,227, filed Nov. 5, 2010, which is a continuation of application Ser. No. 11/586,799, filed Oct. 26, 2006, now U.S. Pat. No. 7,879,481 which is a divisional of application Ser. No. 10/381,394, filed Sep. 22, 2003, now U.S. Pat. 7,223,494 which was filed pursuant to 35 USC 371 as a National Phase Application of International Application PCT/JP02/07497, filed Jul. 24, 2002, which is entitled to the priority filing date of Japanese Applications 2001-222951, filed in Japan on Jul. 24, 2001 and 2001-263672, filed in Japan on Aug. 31, 2001, the entirety of which are incorporated herein by reference.

TECHNICAL FIELD

The present invention relates to a method for preventing erroneous loading of a component-to-be-loaded that has a terminal aimed for electric contact, a component-to-be-loaded and a battery pack.

BACKGROUND ART

As a component-to-be-loaded that is aimed for electric contact with a main body apparatus, there is provided a battery pack that is loaded on a video camera.

Such a battery pack can be loaded on a video light, a battery charger and the like other than the video camera, and is in need of aiming for electric contact with these appliances all of which are provided with a terminal of the same form.

Additionally, there are plural-types of batteries based on the difference of capacity and further, as a component-to-be-loaded having a terminal of the same form that is similar to the battery pack, there are, for example, a dry cell pack, a DC plate and the like. By the way, the DC plate is a component-to-be-loaded that has an outer form like the battery pack to be loaded on a battery loading portion, has a cord for connecting to a battery charger and supplies DC electric power to a main body apparatus via this component-to-be-loaded.

Since the main body side apparatus and the component-to-be-loaded are each provided with a terminal of the same form, they are capable of being loaded on each other.

When a dry cell pack is loaded on the battery charger, however, a dry cell ends up being charged by the battery charger, which should be avoided. Moreover, there is a video light dedicated to high capacity that permits loading thereon of only a battery pack with high capacity. A battery pack having low capacity or a battery pack having standard capacity should be avoided from being loaded on such video light dedicated to high capacity.

With regard to a similar component-to-be-loaded with a terminal of the same form, whether or not loading is permitted is determined by the main body side apparatus that is loaded therewith.

As determiners whether or not to permit loading of the similar component-to-be-loaded, the main body side apparatus and the component-to-be-loaded have conventionally been respectively provided with a concave engaging portion and a convex engaging portion, so that the combination of the former and the latter determines whether or not to permit loading of the similar component-to-be-loaded.

However, as mentioned above, in a conventional main body side apparatus and component-to-be-loaded provided with the concave engaging portion and the convex engaging portion, there has been a problem in which terminals of the two are brought into contact with each other while the component-to-be-loaded is in the state of not completely loaded on the main body side apparatus, that is, in the halfway stage of being loaded.

Particularly, when the component-to-be-loaded is forcedly (carelessly) loaded on the main body side apparatus by being tilted slantingly from the regular loading orientation so that both terminals themselves are opposed to each other, both the terminals ended up being brought into contact with each other.

Then, should a battery pack with different capacity, for example, be loaded on the main body side apparatus, there flows a large amount of current, which incurs the problem such that the main body side apparatus malfunctions and is damaged.

In addition, in recent years as the main side apparatus has become compact, there is a demand that component-to-be-loaded be also compact. However, when the concave engaging portion and the convex engaging portion are reduced in form and in size as well, the possibility is very high that component-to-be-loaded that should not be capable of being loaded under regular circumstances are erroneously loaded on the main body side apparatus due to changes in form and deformation. In case erroneous loading is committed, there is a high possibility that terminals themselves are brought into contact with each other thereby incur a problem that leads to some kinds of troubles.

DISCLOSURE OF THE INVENTION

Therefore, an object of the present invention is to surely prevent electric disturbance from occurring to the main side body apparatus and/or component-to-be-loaded by preventing terminals from contacting with each other even when a similar component-to-be-loaded is erroneously loaded on the main side body apparatus by any chance.

In order to solve the above-mentioned problems, the method for preventing erroneous loading of the component-to-be-loaded on the main body side apparatus of the present invention is such that the main body side apparatus has a main body side terminal while the component-to-be-loaded has a component-to-be-loaded side terminal that joins with the main body side terminal, with a discriminating tab being provided in the vicinity of the component-to-be-loaded side terminal of the component-to-be-loaded and a blocking portion being provided in the vicinity of the main body side terminal of the main body side apparatus to determine whether or not its loading is permitted based on the combination of concave and convex engagement with respect to the above-mentioned discriminating tab, and when loading is not permitted by interference between the blocking portion and the above-mentioned discriminating tab, an electric connection between the main body side terminal and the component-to-be-loaded side terminal is not to be established.

In addition, the component-to-be-loaded of the present invention includes the component-to-be-loaded side terminal to join with the main body side terminal provided in the main body side apparatus, and the discriminating tab in the vicinity of the component-to-be-loaded terminal to determine whether or not its loading is permitted based on the combination of concave and convex engagement with respect to the blocking portion provided in the vicinity of the main body side terminal of the main body side apparatus, and when loading is not permitted by interference between the blocking portion and the discriminating tab, an electric connection between the main body side terminal and the component-to-be-loaded side terminal is not to be established.

Accordingly, in the method for preventing erroneous loading of the component-to-be-loaded on the main body side apparatus and the component-to-be-loaded according to the present invention, in case the component-to-be-loaded that can not be loaded under regular circumstances is erroneously loaded on the main body side apparatus, since the discriminating tab and the blocking portion are provided in the vicinity of the terminals, it is possible to prevent the terminals from contacting with each other as well as to surely prevent electrical disturbance of the main body side apparatus and/or the component-to-be-loaded.

In addition, the battery pack of the present invention is a battery pack that is loaded on an electronic apparatus with the battery pack being slid with respect to the electronic apparatus having a battery loading portion, and includes a substantially square-pole-like battery case and a battery terminal provided on one end surface thereof in the sliding direction with an erroneous loading prevention groove being formed on one end surface extending in the sliding direction other than both the end surfaces in the sliding direction of the battery case.

Therefore, according to the battery pack of the present invention, since the form seen from the sliding direction is not symmetry at multiple points, it is possible to specify unique orientation of the battery pack with respect to the battery loading portion on the side of the electronic apparatus. As a result, it is impossible to insert the battery pack into the battery loading portion when the battery pack is in different orientation from the regular orientation, with the result that the erroneous loading of the battery pack can be prevented.

Further, such being the case, since the battery pack is inserted into the battery loading portion with the orientation thereof being in the regular orientation, it is possible to prevent the trouble in which a terminal on the side of the electronic apparatus and a wrong terminal themselves are brought into contact with each other.

BRIEF DESCRIPTION OF DRAWINGS

FIG. 2 is a front view of a battery loading portion seen from the right direction.

FIG. 3 is an enlarged cross-sectional view of the battery loading portion taken along the line III-III in FIG. 2.

FIG. 27 is a diagram showing the state in which a contact portion is about to contact with a contact piece in the halfway stage of joining.

FIG. 28 is a diagram showing the finished state of joining.

FIG. 31, together with FIGS. 32, 33, shows the results of examining materials of a terminal piece and a terminal member as well as plating thereof, and this figure is a diagram showing result tables in relation to contact resistance.

FIG. 32 is a diagram showing result tables in relation to engagement force.

FIG. 33 is a diagram showing result tables in relation to disengagement force.

FIG. 52 is a front view of the battery pack and the battery loading portion for explaining the relations between the two, with the former having been loaded or about to be loaded on the latter.

BEST MODE FOR CARRYING OUT THE INVENTION

Figure 1:
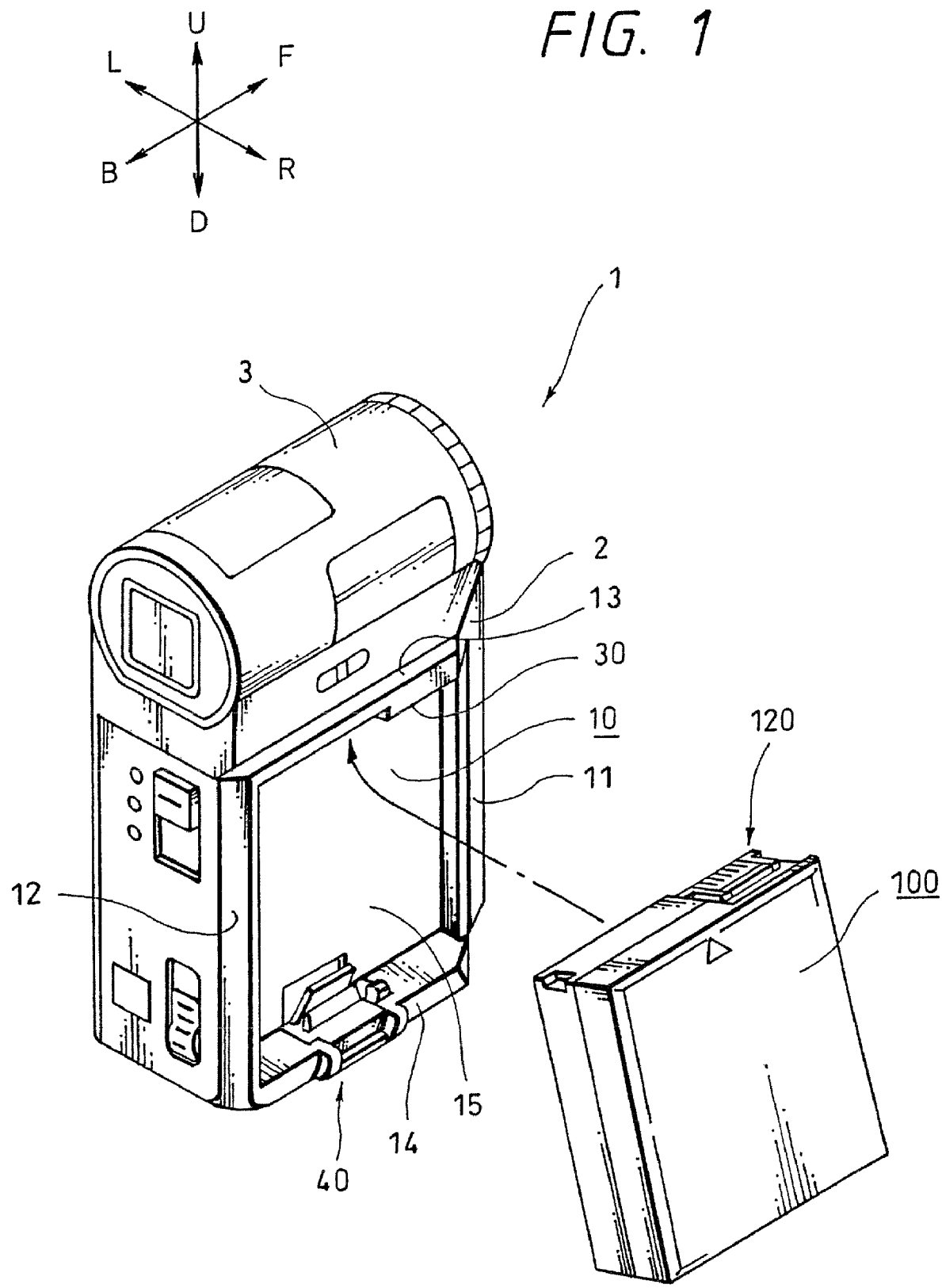
FIG. 1 is a perspective view showing the state immediately before a battery pack is loaded on a video camera according to the present invention.

Hereinafter, a method for preventing a component-to-be-loaded from being erroneously loaded on a main body side apparatus, a component-to-be-loaded and a battery pack will be explained in detail according to embodiments illustrated in the attached drawings.

In addition, the embodiments shown in the drawings are such that the present invention is applied to the structure of how the battery pack is loaded in a video camera, wherein ⌊video camera⌋ corresponds to ⌊main body side apparatus⌋ described in the scope of claim, and ⌊battery pack⌋ corresponds to ⌊component-to-be-loaded⌋ described in the scope of claim, respectively. In addition, ⌊video light⌋, ⌊battery charger⌋ to be mentioned later on correspond to ⌊main body side apparatus⌋, and ⌊dry cell pack⌋ corresponds to ⌊component-to-be-loaded⌋ described in the scope of claim, respectively.

Further, a video camera to be explained in the following is a camera of the type which has a lens body tube positioned at its upper portion of the camera main body when it is in an ordinary state for use with a battery pack removably loaded on the right side surface. To this end, also in the following, an explanation will be given with this direction as a standard, which means that the U direction, the D direction, the L direction, the R direction, the F direction, the B direction which are each indicated by an arrow mark in each of the drawings respectively mean the upper direction, the lower direction, the left direction, the right direction, the front direction and the back direction. Furthermore, the orientation (directionality) of the battery pack is not originally unique, though in order to explain the case where the battery pack is to be loaded on the above-mentioned video camera, an explanation will be given of the battery pack with the same orientation (directionality).

A video camera 1 comprises a rectangular solid-like camera main body 2, a lens body tube 3 provided on the upper portion of the camera main body 2, a display panel provided on the left surface of the camera main body 2 (not shown in figures) and the like.

In addition, on the right surface of the camera main body 2 is provided a battery loading portion 10 that is surrounded by four frame bodies (a front frame body 11, a back frame body 12, an upper frame body 13, a lower frame body 14) (refer to FIGS. 1 and 2).

The battery loading portion 10 forms a rectangle when seen from the front, and is formed to be slightly larger than the front projection form of a battery pack 100. Further, small ribs 16, 16, . . . extending in the right and left directions are respectively provided at positions respectively shifted to the upper end and lower end of an inner surface (back surface) 11a of the front frame body 11 and an inner surface (front surface) 12a of the back frame body 12, though the amount of projections of the small ribs is small and the amount of projections is formed to be slightly larger as the ribs near toward the bottom surface 15 of the battery loading portion, that is, formed to taper off. The interval between the small ribs 16,16 opposing to each other at the bottom surface 15 is formed to be approximately equal to or slightly smaller than the front and back, and width, dimensions of the battery pack (refer to FIG. 3).

On the inner surface 13a side of the front portion of the upper frame body 13 constituting the battery loading portion, a terminal 30 (hereinafter referred to as "main body side terminal") is provided for connecting to a terminal (hereinafter referred to as "pack side terminal") 120 of the above-mentioned battery pack 100, and a lock mechanism 40 for holding the battery pack 100 in the battery loading portion 10 is provided at the center of the lower frame body 14 (refer to FIG. 1).

For a start, the battery pack 100 to be used by the video camera 1 will be explained.

Figure 4:
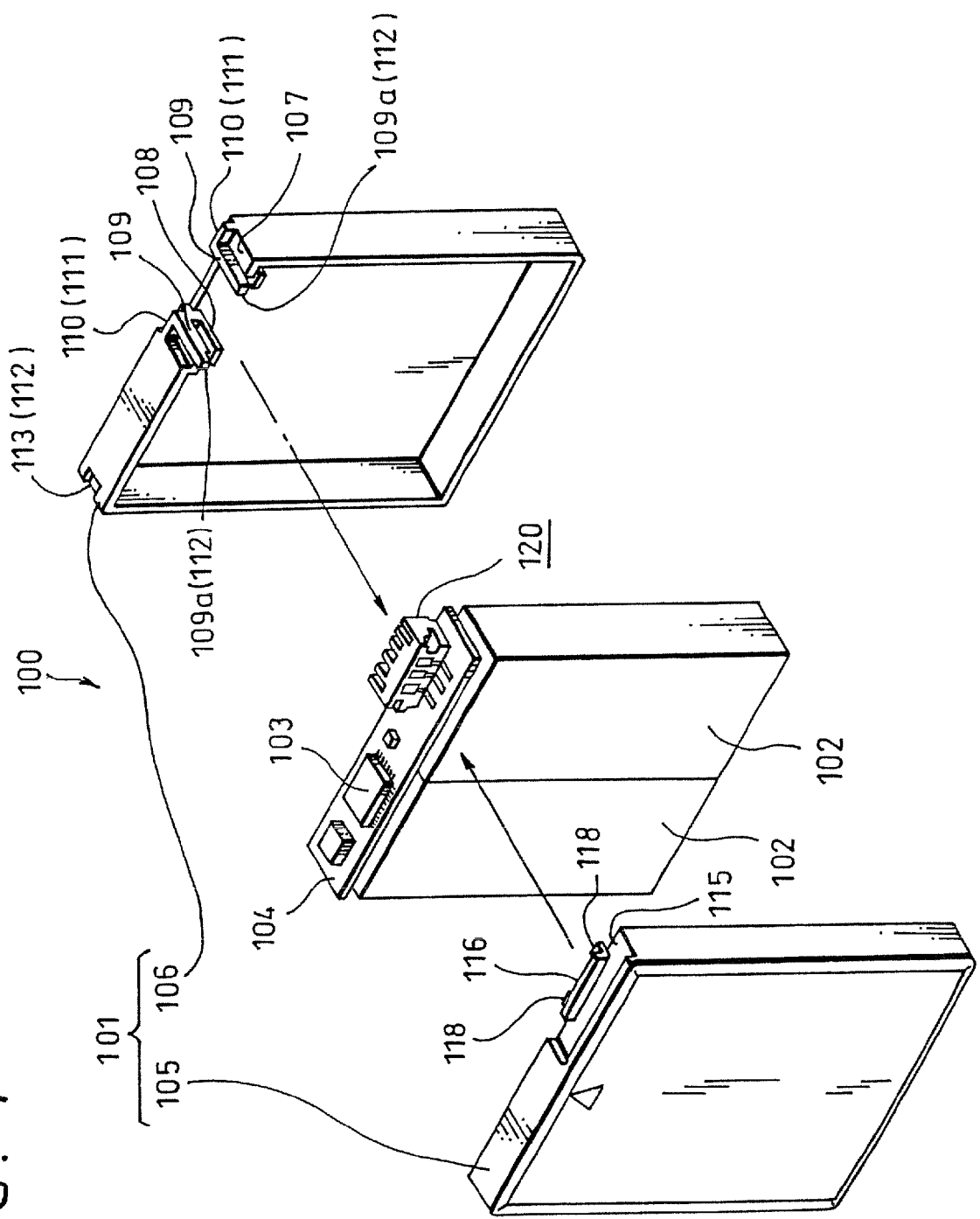
FIG. 4 is a perspective view of the battery pack that is exploded.
Figure 5:
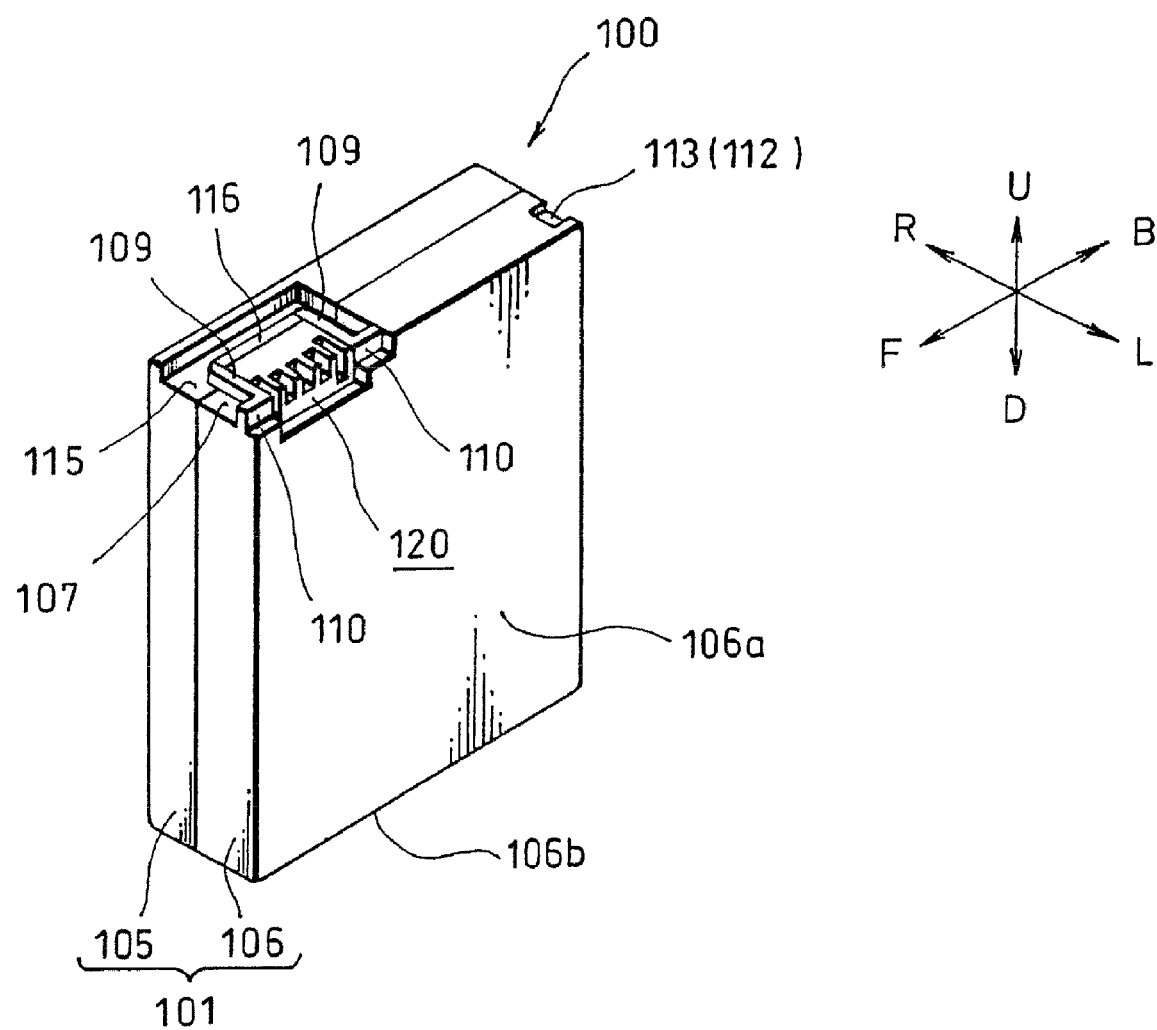
FIG. 5 is a perspective view of the battery pack showing the whole thereof.

The battery pack 100 includes a rectangular solid-like battery case 101, battery cells 102, 102 to be housed in the battery case 101, a substrate 104 with an IC chip 103 mounted thereon for computing and storing a residual quantity of the battery pack and the like, and a battery side terminal 120 to be attached to the substrate 104 and for connecting to the main body side terminal 30 (refer to FIG. 4).

Here, the battery pack 100 has plural kinds of battery packs mainly because capacities thereof are different, and those shown in FIG. 1, FIG. 3 and FIG. 9, FIG. 13 and FIG. 16 belong to the battery pack of the standard type that is the smallest (thin in thickness) in outward form of the plural kinds of the battery packs 100.

Then, the battery case is comprised of a front surface case 105 and a back surface case 106 (refer to FIG. 4), and the back surface cases 106 are the same in size in plural numbers of the types of the battery packs 100, though the front surface cases 105 are different in size (thickness) in the battery packs 100 (refer to FIGS. 37 through 40).

On the front portion of the upper surface of the back surface case 106, a concave 107 that is a notch lower than the other portion is formed, and a rectangular cutaway 108 that opens to the front surface side (right direction) and the back surface side (left direction) is formed at the concave 107, with the above-mentioned battery side terminal being slid from the front surface side (right direction) to be attached to the rectangular cutaway 108. The upper surface of the battery side terminal 120 that is attached to the rectangular cutaway 108 is the same in height as the other portion except the concave 107 (refer to FIG. 9).

At the front and back side edges of the rectangular cutaway 108 of the back surface case 106, ribs (hereinafter referred to as [terminal positioning rib]) 109, 109 projected upward while extending in the right and left directions are respectively formed, and the left ends of the terminal positioning ribs 109, 109 that don't extend to as far as a back surface 106a of the back surface case 106 are formed at positions shifted slightly to the right direction from the back surface case 106a with the upper surface of these two terminal positioning ribs being the same in height as the other portion except the upper surface of the battery side terminal and the concave 107 of the back surface case 106 (refer to FIG. 7).

Further, the interval between the two terminal positioning ribs 109, 109 is formed to be approximately equal to the dimension in the front and back direction of the above-mentioned battery side terminal 120, and the two terminal positioning ribs extend approximately in the right direction from the right side edge portion of the attached battery side terminal, and small projecting bars 110, 110 respectively extending in opposite directions to each other (front and back direction) are integrally formed at the left end of the battery side terminal 120. Convex portions such as the small projecting bars 110, 110 and the above-mentioned terminal positioning ribs 109, 109 that are formed in the vicinity of the battery side terminal 120 are to serve as discriminating tabs 111, 111 . . . for discriminating the kind of the battery pack 100, which will be described later on (refer to FIG. 7).

A right end portion 109a of the above-mentioned terminal positioning rib 109 overhang the back surface case 106 side when the front surface case 105 is combined with the back surface case 106, and the right end portion 109a of the terminal positioning rib 109 becomes one of upper side portions-to-be-locked 112 when the battery pack 100 is loaded on the battery loading portion 10 of the camera main body 2, which will be described later on (refer to FIG. 8).

Figure 8:
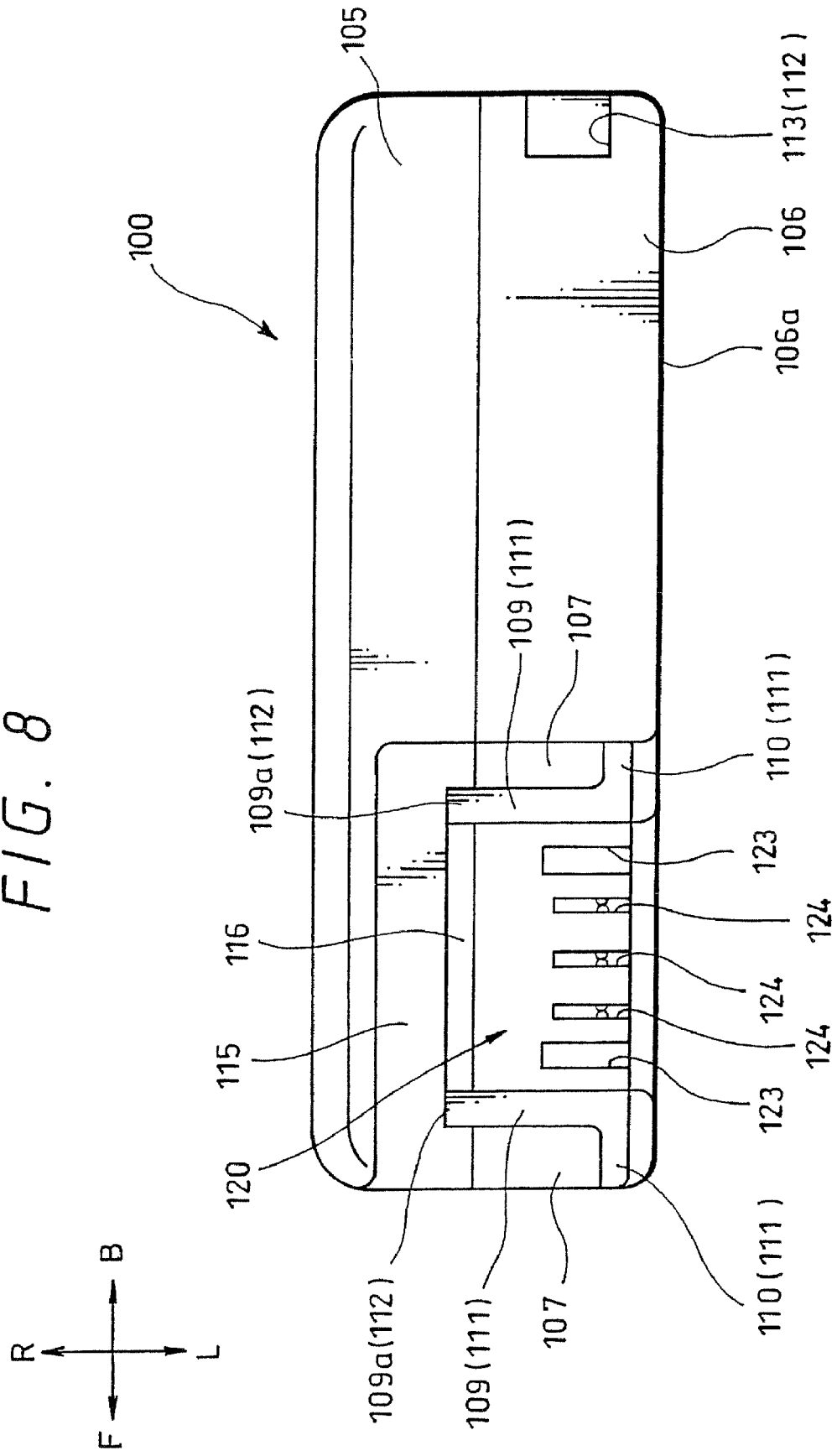
FIG. 8 is an enlarged view of the battery pack seen from the upper direction.

At the back side corner portion of the upper surface of the back surface case 106, a comparatively small concave portion 113 that opens to the upper and back directions, and such small concave portion 113 becomes one of the upper side portions-to-be locked 112 when the battery pack 100 is loaded on the battery loading portion 10 (refer to FIG. 8).

Figure 6:
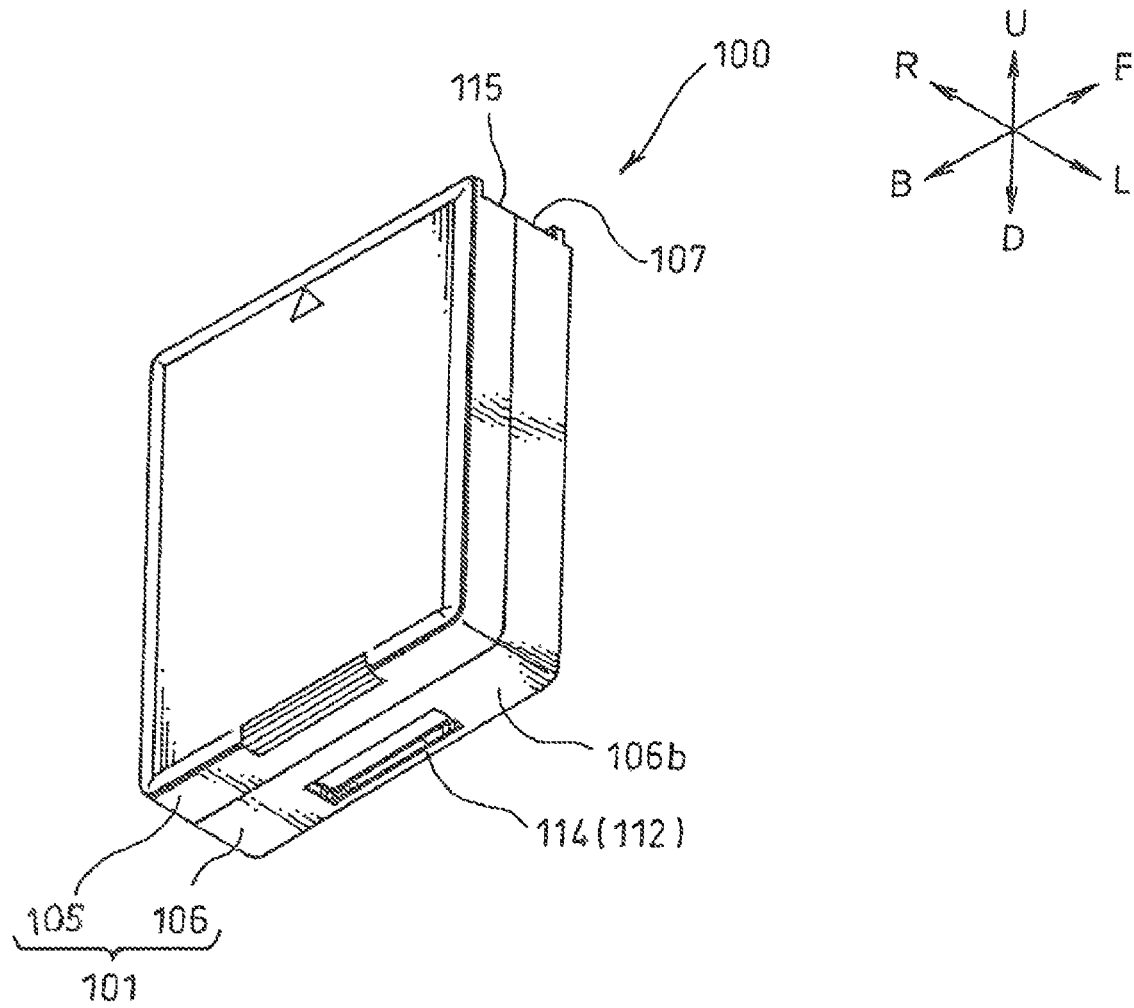
FIG. 6 is a perspective view of the battery pack showing the whole thereof seen from the direction different from that of FIG. 5.

Further, on a lower surface 106b of the back surface case 106 is formed a concave bar groove-to-be-locked 114 extending in the front and back direction, which a lock pawl 41 of the rock mechanism 40 on the main camera body 2 side is to lock (to be described later on), and the groove-to-be-locked 114 serves as a lower side locking portion 112 of the battery pack 100 (refer to FIG. 6).

Figure 15:
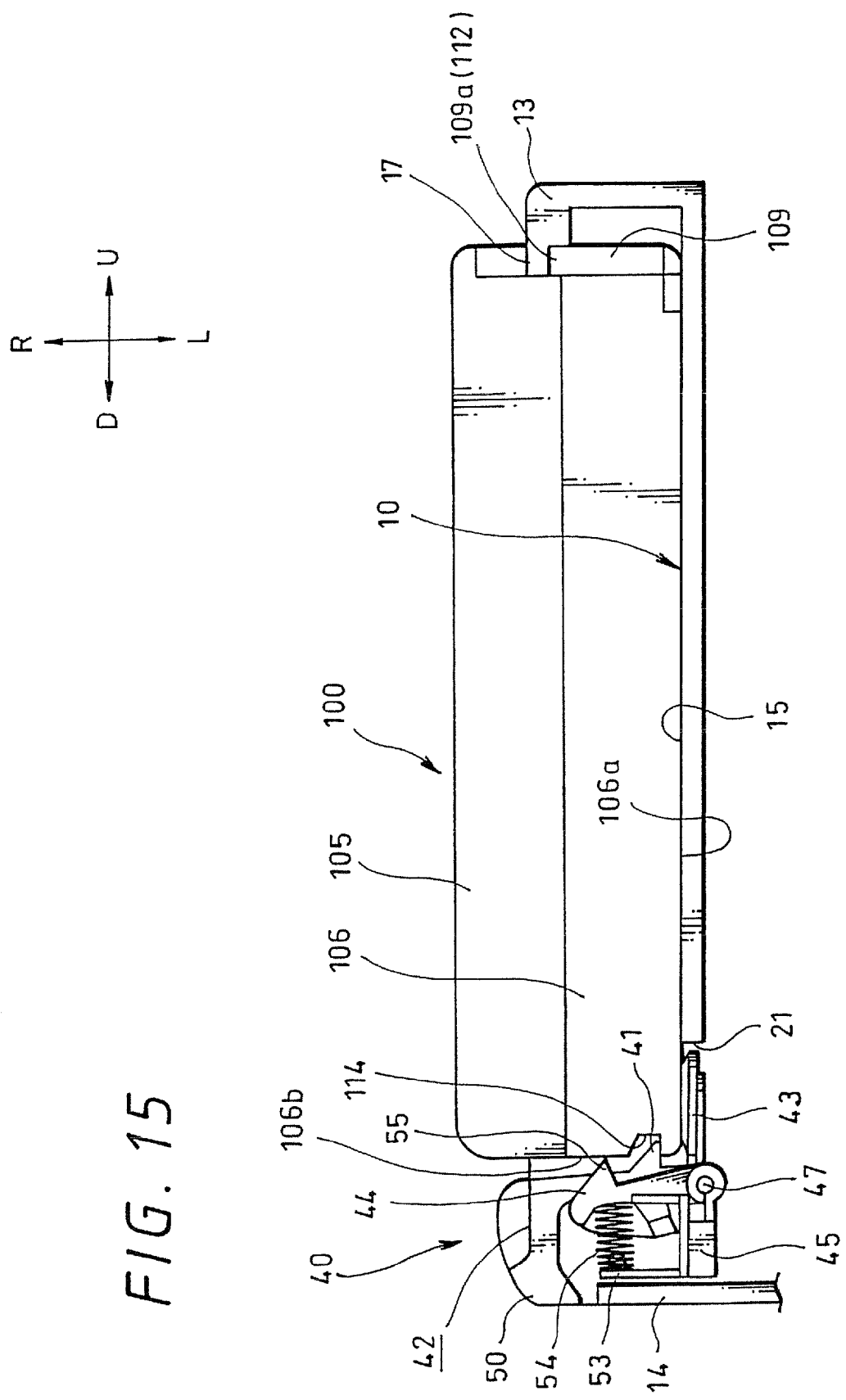
FIG. 15 is a diagram showing the battery pack in the finished stage of being loaded.

In this manner, by providing the portions-to-be-locked 112 (the right end portion 109a of the terminal positioning rib, the concave portion 113 and the groove-to-be-locked 114) in various portions of the battery pack side in the back surface case 106, that is, one component, the accuracy of the position of the battery pack 100 at a time of it being loaded on the battery loading portion 10 can be improved (refer to FIG. 15).

Namely, loading of the battery pack 100 on the battery loading portion 10 is performed as the back surface 106a (left surface) of the back surface case 106 comes in contact with a bottom surface 15 (refer to FIG. 15), and at the same time, as the portions-to-be-locked 112 in various portions of the battery pack side (the right end portion 109a of the terminal positioning rib, the concave portion 113 and the locked groove 114) become locked by corresponding locking portions (overhang portion 17 to be described later on, a small convex portion 20, the lock pawl 41) of the battery loading portion 10 side. If the plurality of portions-to-be-locked 112, 112, . . . are provided in different component such as in, for example, the back surface case 106 and the front surface case 105, when the back surface case 106 and the front surface case 105 are assembled inaccurately, there occurs play in the locking state as well as a problem with the coupling state between the battery side terminal and the main body side terminal 30.

Then, with formation of the above-mentioned portions-to-be-locked 112 for positioning concentrated in one part (back surface case 106) as in the case of the battery pack 100, the accuracy of the position of the battery pack 100 in its loaded state can be improved, which makes it possible for the accuracy of the coupling between the back surface case 106 and the front surface case 105 to be not so precise.

Figure 7:
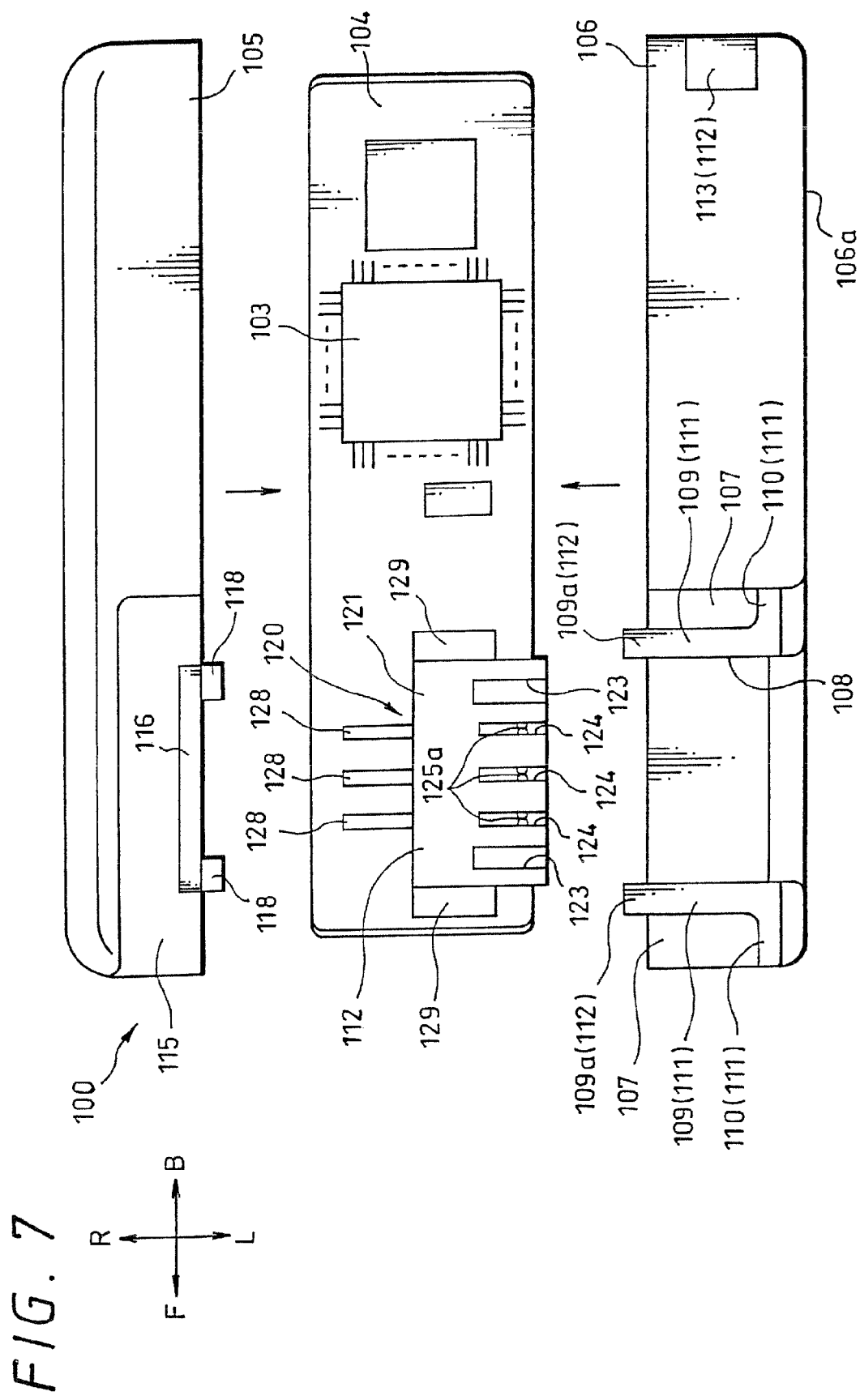
FIG. 7 is an enlarged view of the battery pack seen from the upper direction after being exploded.
Figure 9:
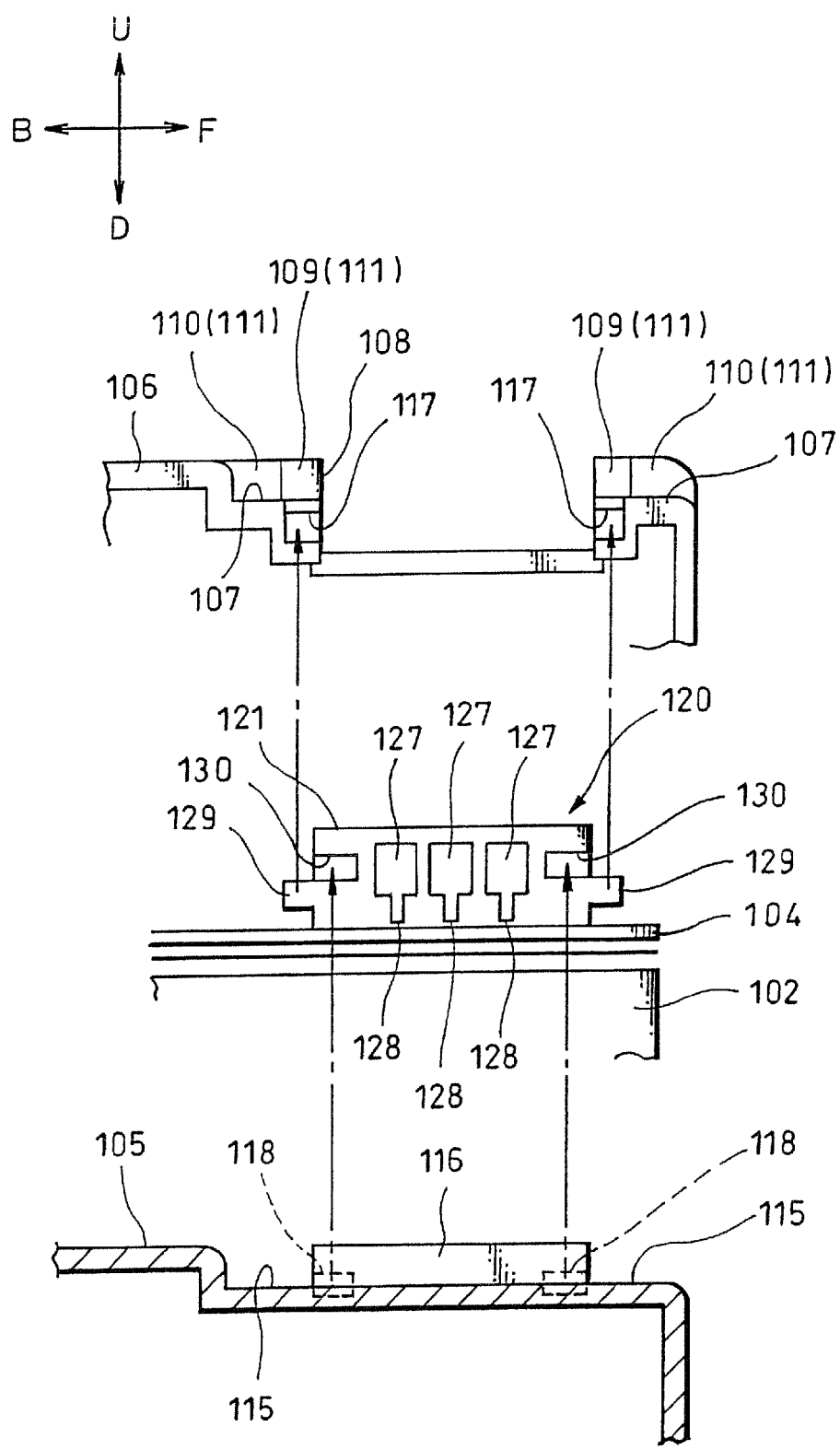
FIG. 9 is an enlarged diagram in which the portion of a battery side terminal is exploded, and respective portions are shifted in the upper and lower directions and are seen from the right direction.

In addition, in the region that is an upper front portion of the front surface case 105 and corresponds to the above-mentioned battery side terminal 120, a recess portion 115 that is approximately the same in height as the concave portion 107 of the back surface case 106 is formed, and at the left side edge of the recess portion 115, there is formed a terminal pressing rib 116 for pressing the battery side terminal 120 from the right direction (refer to FIGS. 7 through 9).

The length in the front and back direction of the terminal pressing rib 116 is formed to be approximately the same as the interval between the two terminal positioning ribs 109, 109 of the above-mentioned back surface case 106, that is, almost the same as the dimension in the front and back direction of the battery side terminal 120, and as a result, when the front surface case 105 is assembled to the back surface case 106, the terminal pressing rib 116 is positioned between the above-mentioned terminal positioning ribs 109, 109 and presses the battery side terminal 120 from the left direction, with the two terminal positioning ribs 109, 109 of the back surface case 106 slightly projected more rightward than the terminal pressing rib 116 serving as the portions-to-be-locked 112, 112 (refer to FIG. 8).

With the battery pack 100 of a standard capacity type, two rectangular-solid-like battery cells 102, 102 are housed in a battery case aligned one before the other, and the above-mentioned substrate 104 is attached on the upper portion thereof, with the above-mentioned battery side terminal 120 mounted on the front portion and the above-mentioned IC chip 103 mounted on the back portion, of the substrate 104 (refer to FIG. 4).

In this manner, since the battery side terminal 120 is provided at a position shifted in one direction with respect to the battery pack 100, it becomes possible to provide a comparatively large space at a portion on the opposite side thereof, which makes is possible to arrange therein electronic portions such as the IC chip 103 and the like to thereby improve efficient us of the space. Specifically, when the rectangular-solid-like battery cells 102 are arranged in the battery case 101, there occurs no dead space, so that the battery cells, 102, 102 can be effectively arranged within the battery pack 100. Though it is difficult to secure a space to arrange the battery side terminal 120, the IC chip 103 on the substrate 104 and the like which jut out from the battery cell, effective use of the space can be carried out by arranging the battery side terminal 120 at the shifted position with respect to the battery pack 100 as mentioned above (refer to FIGS. 4 and 7).

In addition, since the battery side terminal 120 is provided at the shifted position with respect to the battery pack, erroneous loading of the battery pack 100 on the camera main body 2 can be prevented.

Meanwhile, detailed forms of the battery side terminal 120 and the rectangular cutaway 108 that is a receiving side of the battery side terminal 120 and the method of assembling the both will be described in detail later on.

Next, the battery loading portion 10 of the camera main body 2 will be explained in detail.

The dimension of the battery loading portion 10 of the camera main body 2 from the top to the bottom is formed to be slightly larger than the thickness (thickness in the left and right direction) of the back surface case 106 of the above-mentioned battery case 101. As a result, in the state in which the battery pack 100 is loaded on the battery loading portion 10, the back surface case 106 is positioned inside the battery loading portion 10, and almost all, the portion of the front surface case 105 juts out from the camera main body 2 (refer to FIGS. 3 and 15).

A main body side terminal 30 is provided at a position opposed to the above-mentioned main body side terminal 120, that is, the corner portion between the inner surface (lower surface) of the upper frame body 13 and the bottom surface 15, or a position on the diagonally upper front side (refer to FIG. 10).

In a region corresponding to the position where the above-mentioned main body side terminal 30 is provided, the region being an opening side edge (right side edge) of an inner surface 13a of the upper frame body 13, an over-hang portion 17 projecting in the lower direction is formed, with the dimension between the over-hang portion 17 and the bottom surface 15 of the battery loading portion 10 being formed to be the same as that between the back surface 106a of the above-mentioned back surface case 106 and the right end portion of the terminal positioning rib 109 (refer to FIG. 15)

As a result, when the battery pack 100 is loaded on the battery loading portion 10, and the right end portion 109a of the terminal positioning rib 109 is locked by the over-hang portion 17, there is no play between the two. Consequently, it is possible for locking to be carried out in the state in which no play occurs in the region on the front side of the upper portion of the battery pack 100 (refer to FIG. 15).

From the back portion of the over-hang portion 17 toward the bottom surface 15 of the battery loading portion (left direction) a projecting bar (hereinafter referred to as ⌊a blocking projecting bar⌋) 18 is integrally formed, and the tip portion of the blocking projecting bar 18 extends to a position properly apart from the bottom surface 15 (refer to FIG. 10) so that it does not interfere with the above-mentioned discriminating tab 111 of the back surface case 106 of the above-mentioned battery pack 100.

Such blocking projecting bar 18 and a small projecting portion in the vicinity of the main body side terminal 30 to be described later on serve as a blocking portion 19 for determining whether or not the battery pack 100 is to be loaded. Meanwhile, since the above-mentioned blocking portion 19 is made not to interfere with the discriminating tab 111 of the battery pack 100, loading of the battery pack 100 on the battery loading portion 10 is permitted, though in an apparatus, for example a video light 150 (the battery pack 100 with low capacity is not to be loaded thereon) for loading such battery pack 100, there is a case where loading of the battery pack is not permitted due to difference in capacity of the battery pack 100.

On an occasion such as this, it is designed such that the above-mentioned blocking portion 19 extends in the vicinity of the bottom surface 15 of the battery loading portion 10 to thereby interfere with the above-mentioned discriminating tab 111, with the result that loading of the battery pack 100 is blocked. Whether or not to permit loading of such battery pack 100 is exercised based on the forms of and positional relations between the discriminating tab 111 of the above-mentioned battery pack 100 side and the above-mentioned blocking portion 19, which will be described in detail later on.

At a position corresponding to the small convex portion 113 of the above-mentioned back surface case 106, the position being a corner portion between the back side of the inner surface (lower surface) 13a of the upper frame body 13 of the battery loading portion 10 and an inner surface (front surface) 12a of the back frame body 12 is formed a small convex portion 20 that exactly engages with the small concave portion 113 (refer to FIG. 10), and the position at which the small convex portion 20 is formed from the bottom surface 15 of the battery loading portion coincides with the position at which the above-mentioned small concave portion 113 is formed from the back surface 106a of the back surface case 106. As a result, when the battery pack 100 is loaded on the battery loading portion 10, locking of the battery pack in the back side region of the upper portion is performed without any play.

A rectangular aperture (hereinafter referred to as ⌊a push-up plate disposition aperture⌋) 21 is formed at the lower center of the bottom surface 15 of the battery loading portion 10, and there is provided a cutaway portion (hereinafter referred to as ⌊a lock lever disposition aperture⌋) 22 continuing from the above-mentioned push-up plate disposition aperture 21 on the inner surface (upper surface) of the lower frame body 14 (refer to FIG. 2).

Figure 11:
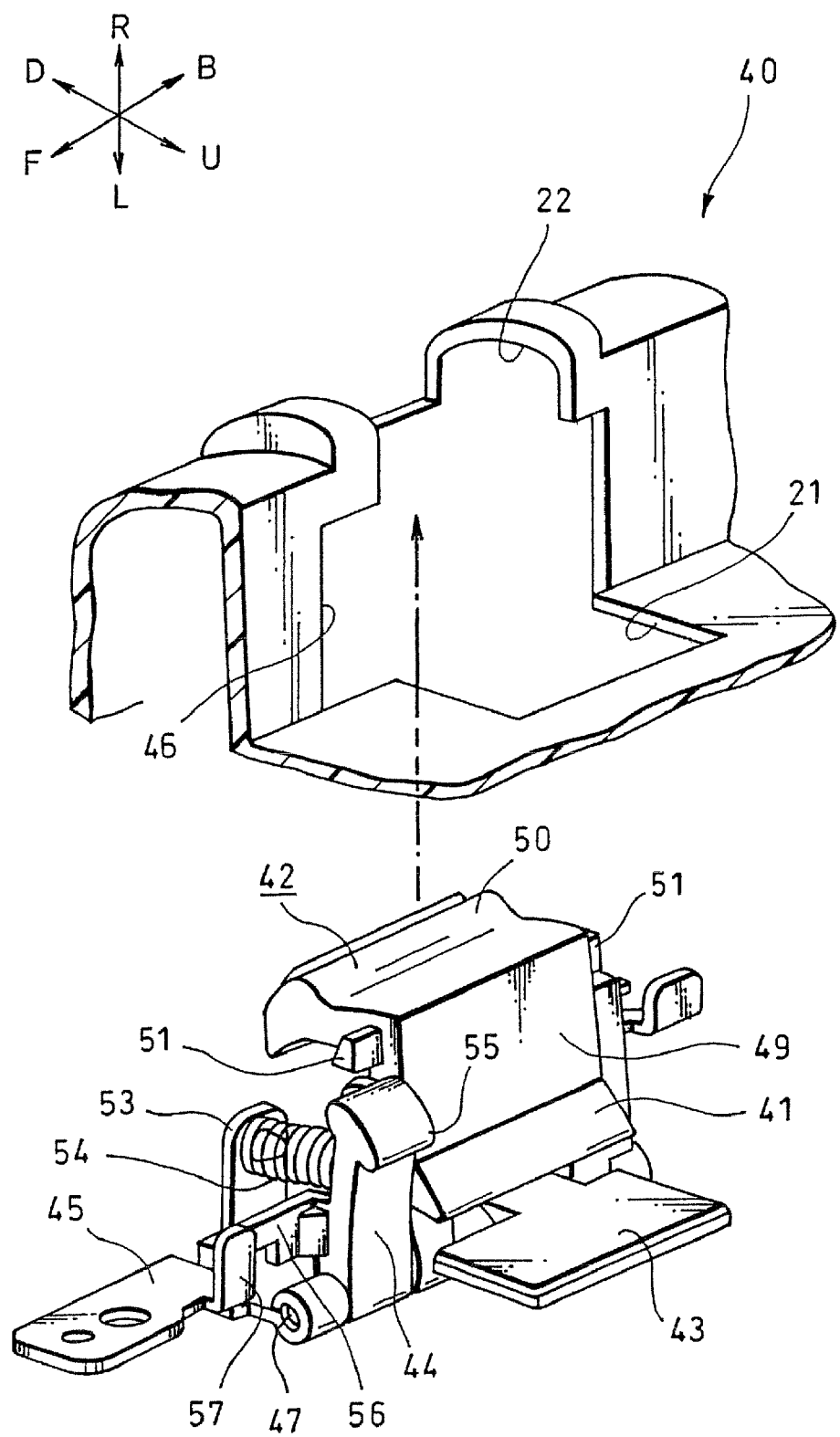
FIG. 11 is an enlarged perspective view of a lock mechanism that is in the state of being disassembled from the battery loading portion.
Figure 12:
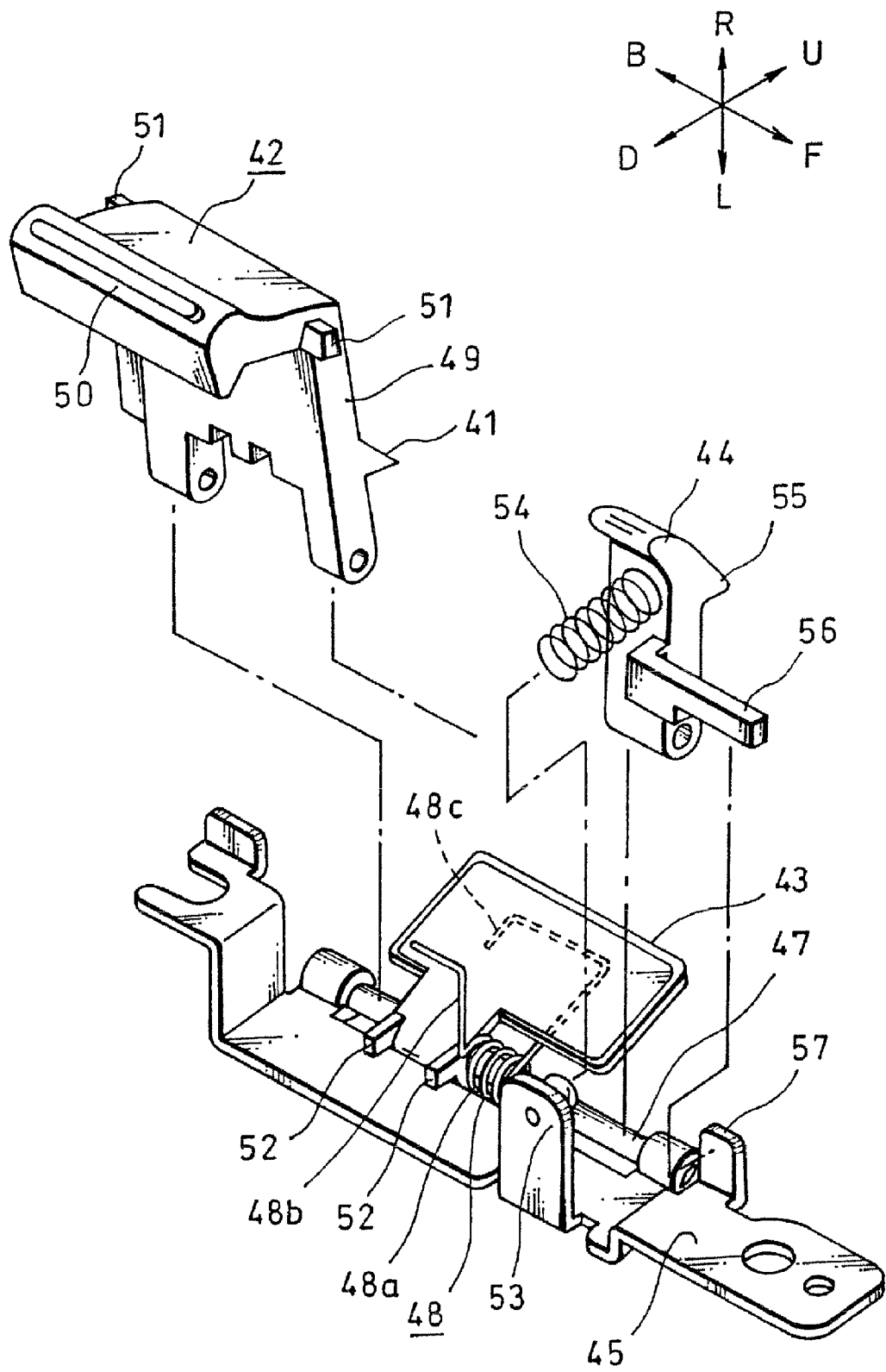
FIG. 12 is an enlarged perspective view of the lock mechanism after being disassembled.

The lock mechanism 40 comprises a lock lever 42 having the lock pawl 41 that engages with the groove-to-be-locked 114 formed on the lower surface of the battery pack 100, a push-up plate 43 for pressing a bottom surface 106a of the battery pack 100 in the direction in which is disengaged, a jump-out prevention lever 44 for preventing the battery pack 100 from jumping out when locking is released by the above-mentioned lock lever 42, and these lock lever 42, push-up plate 43 and jump-out prevention lever 44 are rotatably supported on the same shaft by a base plate 45 on the inside of the corner portion between the lower frame body 14 and the bottom surface 15 (refer to FIGS. 11 and 12).

Then, the base plate 45 is housed inside of and fixed to the lower frame body 14, and the above-mentioned lock lever 42 is disposed in an above-mentioned lock lever disposing aperture 22 of the lower frame body 14, the push-up plate 43 in a push-up plate disposition aperture 21, the jump-out protection lever 44 in a rectangular-like cutaway (hereinafter refer to as ⌊jump-out protection lever disposing aperture⌋) 46 that is formed continuous from the aperture 22, respectively (refer to FIG. 11).

In addition, a coil portion 48a of a helical torsion spring 48 is fit around a rotation shaft 47 that rotatably supports the lock lever 42, the push-up plate 43 and the jump-out protection lever 44, with one arm portion 48b acting on the lock lever 42 and the other arm portion 48c acting on the push-up plate 43 to thereby rotatably urge the lock lever 42 in the upward direction and urge the push-up plate 43 in the right direction (refer to FIG. 12).

The lock lever 42 lends itself an appearance such that the whole thereof is an L-letter lying on its side, with an upper surface piece 49 being formed to become a portion of the inner surface (upper surface) of the above-mentioned lower frame body 14, a cross-sectional triangle-like lock pawl 41 being formed in the front and back direction, extending to a position that is shifted to the center of rotation of the upper surface piece 49, and an operation portion 50 being formed at the lower portion of the right side surface for operating the lock lever 42 (refer to FIGS. 11 and 12).

Then, the lock pawl 41 is formed such that it is slightly shifted in the right direction (front side) from the bottom surface 15 of the battery loading portion 10, with the distance from the bottom surface 15 being equal to the distance from the bottom surface 106a of the groove-to-be-locked 114 of the above-mentioned battery pack 100 so that the battery pack 100 is resultantly pressed against the bottom surface 15 of the battery loading portion 10 when the lock pawl 41 engages with the groove-to-be-locked 114 (refer to FIG. 15).

In addition, on both the left and right side portions of the upper surface piece 49 of the lock lever 42 there are respectively formed small projections 51,51 that contact with edge portions of the lock lever disposing aperture 22 of the lower frame body 14, and with the projections 51, 51 colliding from the inside with the edge portions of the above-mentioned lock lever disposing aperture 22, rotational urging by the above-mentioned helical torsion spring 48 is blocked. In such a state the upper surface of the upper surface piece 49 is flush with the upper surface of the lower frame body 14.

The push-up plate 43 has small pieces 52, 52 projecting in the lower direction from the center of rotation integrally formed, and with the contact of small pieces 52, 52 with the above-mentioned base plate 45, rotational urging by the above-mentioned helical torsion spring 48 is blocked. In such a state the push-up plate 43 is in the state of projecting in the right direction from the push-up plate disposition aperture 21 (refer to FIG. 12).

The jump-out prevention lever 44 has a helical compression spring 54 provided in compressed form between the lower surface of a rotational end portion and a protruding piece 53, and the jump-out prevention lever 44 is thereby rotatably urged in the upper direction like the above-mentioned look lever 42 is (refer to FIGS. 13 through 16). By the way, in FIGS. 13 through 16, the above-mentioned battery side terminal 120 and the main body side terminal 30 are omitted.

The jump-out prevention lever 44 has a pawl portion 55 formed at the rotational end, that projects in the upper direction, and there is integrally formed a rotation blocking piece 56 at the base end portion thereof, that projects in the forward direction. With the collision of the rotation blocking piece 56 with a restraining piece 57 formed in the base plate 45, rotational urging by the above-mentioned helical compression spring 54 is blocked. In such a state, the above-mentioned pawl portion 55 projects in the upper direction from the upper surface of the lower frame body 14 (refer to FIGS. 13 through 16).

In addition, the pawl portion 55 of the jump-out prevention lever 44 is formed more rightward than the lock pawl 41 of the lock lever 42 (refer to FIGS. 13 through 16).

Figure 13:
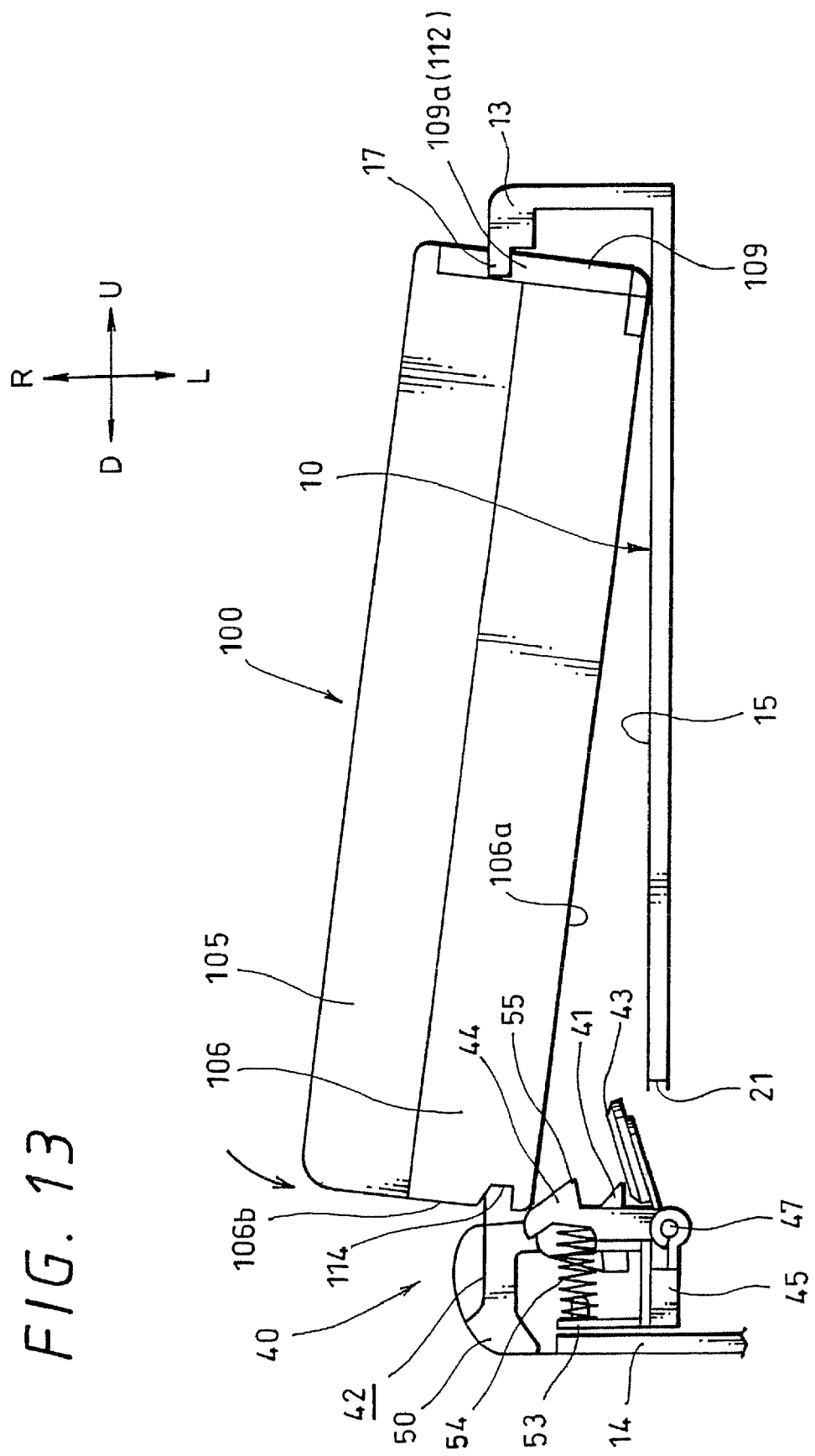
FIG. 13 is an enlarged diagram in which a portion of the appearance that the battery pack is loaded on or disengaged from the battery loading portion as in the cases of FIGS. 14 through 16 is cut off and which is seen from the front direction, though this figure shows an initial loading stage.
Figure 16:
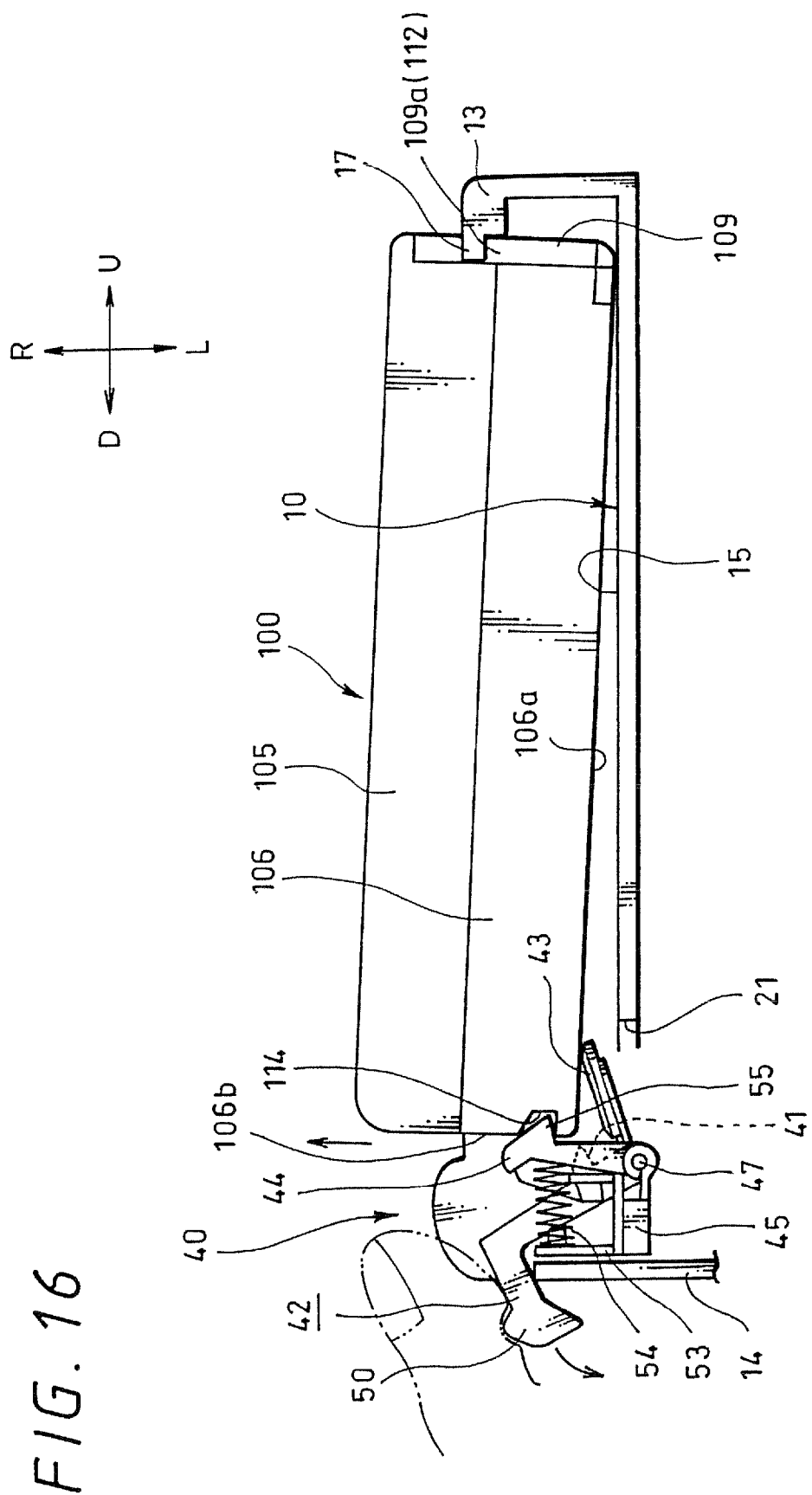
FIG. 16 is a diagram showing the appearance of the battery pack being disengaged and a part of the battery pack being in the state of being floated by a jump-out-prevention lever.

In this manner, when the battery pack 100 is not in the state of being loaded on the battery loading portion 10, the lock pawl 41 of the lock lever 42 and the lock portion 55 of the jump-out prevention lever 44 projects in the upper direction from the upper surface of the lower frame body 14, and the push-up plate 43 is in the state of projecting in the right direction from the bottom surface of the battery loading portion 10 (refer to FIG. 13 or FIG. 16).

Then, when the battery pack 100 is about to be loaded on the battery loading portion 10, a procedure will be carried out in the following manner, and the loaded battery pack 100 is held in a locked state within the battery loading portion 10 by the above-mentioned lock mechanism.

First of all, the battery pack 100 is inserted in the battery loading portion 10 with the upper portion thereof being tilted, and the battery side terminal 120 (including the terminal positioning rib 109 of the back surface case 106 and the terminal pressing rib 116 of the front surface case 105) is slid into the inside of the over-hang portion 17 of the battery loading portion 10. Then as mentioned before, since the discriminating tab 111 on the side of the battery pack 100 does not interfere with the member (blocking portion 19) on the side of the battery pack 100, the battery side terminal 120, the terminal positioning rib 109 and the terminal pressing rib 116, of the battery pack 100 can be slid deep into the over-hang portion 17 (refer to FIG. 13).

At this time, terminal members 122, 122, 122 of the above-mentioned battery side terminal 120 and three terminal pieces 31, 31, 31 of the main body side terminal 30, not shown, are separately joined with each other.

In addition, as will be described in detail later on, by having the discriminating tab 111 on the side of the battery pack 100 and the blocking portion 19 on the side of the battery loading portion 10 formed so as to interfere with each other, the above-mentioned battery side terminal 120 can not be slid deep into the over-hang portion 17 of the battery loading portion 10. Therefore, the terminal member 122 of the battery side terminal 120 and the terminal piece 31 of the main body side terminal 30 are intended not to join with each other.

Moreover, if the battery pack 100 is forced to be loaded on the battery loading portion 10 even when the blocking portion 19 of the loading portion 10 and the discriminating tab 111 of the battery pack 100 interfere with each other, there will be a remote possibility in which the battery pack can be loaded thereon as a result of bending of the upper frame body 13 of the battery loading portion 10 as the above-mentioned discriminating tab 111 presses the blocking portion 19.

On such an occasion, however, since the blocking portion 19 and the discriminating tab 111 are formed in the vicinity of both the terminals 120, 30, the main body side terminal 30 retreats in the direction toward which it is pressed, with the result that both of the terminals do not join with each other. Consequently, the terminal piece 31 and the terminal member 122 do not come in contact with each other and thereby the electric contact can be avoided.

Figure 14:
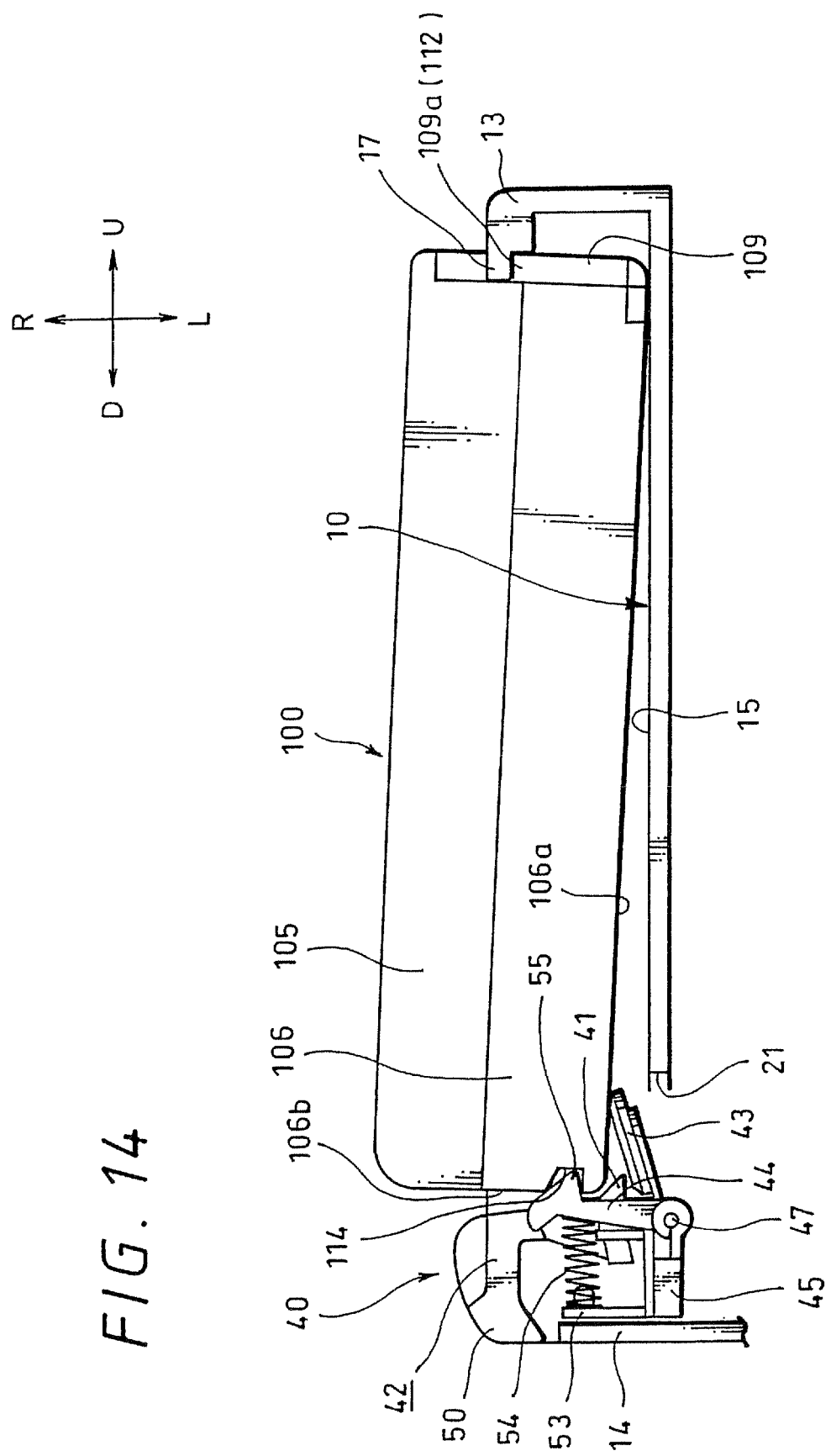
FIG. 14 is a diagram showing the battery pack in the halfway stage of being loaded.

Next, with the upper portion of the battery pack 100 (the portion of the battery side terminal 120, which is locked by the over-hang portion 17) as a rotation fulcrum, the lower portion of the battery pack 100 is rotated leftward so that it is loaded on the battery loading portion 10 (refer to FIGS. 14 and 15).

At this time, after the pawl portion 55 of the jump-out protection lever 44 of the above-mentioned lock mechanism 40 is kicked downward by the lower left side of the battery pack 100, the pawl portion 55 engages with the groove-to-be-locked 114 (refer to FIG. 14).

Further, as the lower portion of the battery pack 100 is pressed against the battery pack 100, the pawl portion 55 of the above-mentioned jump-out prevention lever 44 is kicked by the edge portion of the groove-to-be-locked 114 and at the same time, the lock pawl 41 of the lock lever 42 is kicked by the lower left side edge portion (bottom surface side corner portion) and then, the lock pawl 41 engages with the groove-to-be-locked 114 to thereby complete loading of the battery pack 100 (refer to FIG. 15).

In addition, prior to the lock pawl 41 engaging with the groove-to-be-locked 114, the lower surface 106a of the battery pack 100 rotates the push-up plate 43 in the left direction so that the lower surface 106a of the battery pack 100 is to approximately contact face to face with the lower surface 15 of the battery loading portion 10 (refer to FIG. 15).

Then, the rotations of these lock lever 42, jump-out protection lever 44 and push-up plate 43 are performed against the spring force of the above-mentioned helical torsion spring 48 or helical compression spring 54.

At this time the terminal member 122 of the battery side terminal 120 joins with the terminal piece 31 of the main body side terminal 30 and at the same time, the right end portion 109a (portion-to-be-locked 112) of the terminal positioning rib 109 provided on the upper portion of the battery pack 100 engages with the over-hang portion 17, with the concave portion 113 (portion-to-be-locked 112) of the battery pack 100 engaging with the small convex portion 20 of the battery loading portion 10.

As a result, on the upper portion of the battery pack 100, the right end portion 109a (portion-to-be-locked 112) of the terminal positioning rib 109 and the over-hang portion 17, and the small concave portion 113 (portion-to-be-locked 112) and the small convex portion 20 engage, with each other, respectively while the lock pawl 41 and the groove-to-be-locked 114 engage with each other at the lower portion of the battery pack 100 so that the battery pack 100 is held in the battery loading portion 10 (refer to FIG. 15).

The lock pawl 41 of the lock lever 42 and the pawl portion 55 of the jump-out protection lever 44 press the battery pack 100 in the upward direction to thereby press the battery pack 100 against the upper frame body 13 so that positioning thereof in the up and down direction is performed (refer to FIG. 15).

As a result, the battery side terminal 120 is pressed against the main body side terminal 30 so that the stable joining state between the terminal member 122 and terminal piece 31 is maintained. Particularly, the battery side terminal 120 and the main body side terminal 30 are provided at positions shifted in the forward direction relative to the battery pack 100 and also, since the jump-out prevention lever 44 is provided at a position shifted in the forward direction from the middle portion of the front and back direction, that is, the jump-out prevention lever 44 is provided at a position opposed to both the terminals 120, 30, the battery pack 100 is pressed upward by the pawl portion 55 so that the stable joining state between the terminal member 122 and the terminal piece 31 can be ensured (refer to FIG. 2).

Further, since the battery pack 100 has the lower portion thereof pressed in the right direction by the push-up plate 43, which is to be blocked by the engagement between the lock 41 and the groove-to-be-locked 114, positioning in the loading direction (left and right direction) of the battery pack 100 is performed and furthermore, since the battery pack 100 is regulated by the small ribs 16, 16 that are formed on the inner surface (back surface) 11a of the front frame body 11, and on the inner surface (front surface) 12a of the back frame body 12, positioning thereof in the front and back direction is performed (refer to FIG. 3).

The battery pack 100 having been loaded on the battery loading portion 10 of the camera main body 2 in such a manner will be unloaded in the following way.

That is, first of all, lock disengagement of the lock mechanism by pressing the operation portion 50 by hand or finger is performed (refer to FIG. 16.).

When the lock lever 42 is operated, it is rotated in the lower direction against the spring force of the helical torsion spring 48 and thereby disengaged from the groove-to-be-locked 114 of the battery pack 100.

When the lock pawl 41 is disengaged from the battery pack 100, the lower portion of the battery pack 100 is pressed in the left direction by the push-up plate 43 and lifts from the bottom surface 15 of the battery loading portion 10 (refer to FIG. 16).

At this time, when the lower portion of the battery pack 100 slightly floats from the bottom surface 15, the pawl portion 55 of the jump-out prevention lever 44 engages with the groove-to-be-locked 114. As a result, although the battery pack 100 floats from the battery loading portion 10, since the pawl portion 55 of the jump-out prevention lever 44 is caught by the groove-to-be-locked 114, the battery pack 100 does not jump out inadvertently. Particularly, when the video camera 1 is oriented in the above-mentioned direction (direction in which shooting ordinarily is performed), even if the locking of the battery pack 100 is disengaged, the pawl portion 55 of the jump-out prevention lever 44 is caught by the groove-to-be-locked 114 so that the battery pack 100 is not disengaged from the battery loading portion 10, with the result that the battery pack 100 can be prevented from dropping therefrom.

Next, by having the battery pack 100 whose lower portion is lifting gripped and pulled out by hand in the direction in which it is being disengaged (right direction), the battery pack 100 is easily disengaged from the battery loading portion 10 because of disengagement between the pawl portion 55 of the jump-out prevention lever 44 and the groove-to-be-locked 114.

Next, the battery side terminal 120 and how it is assembled to the battery pack 100 will be explained in detail.

Figure 17:
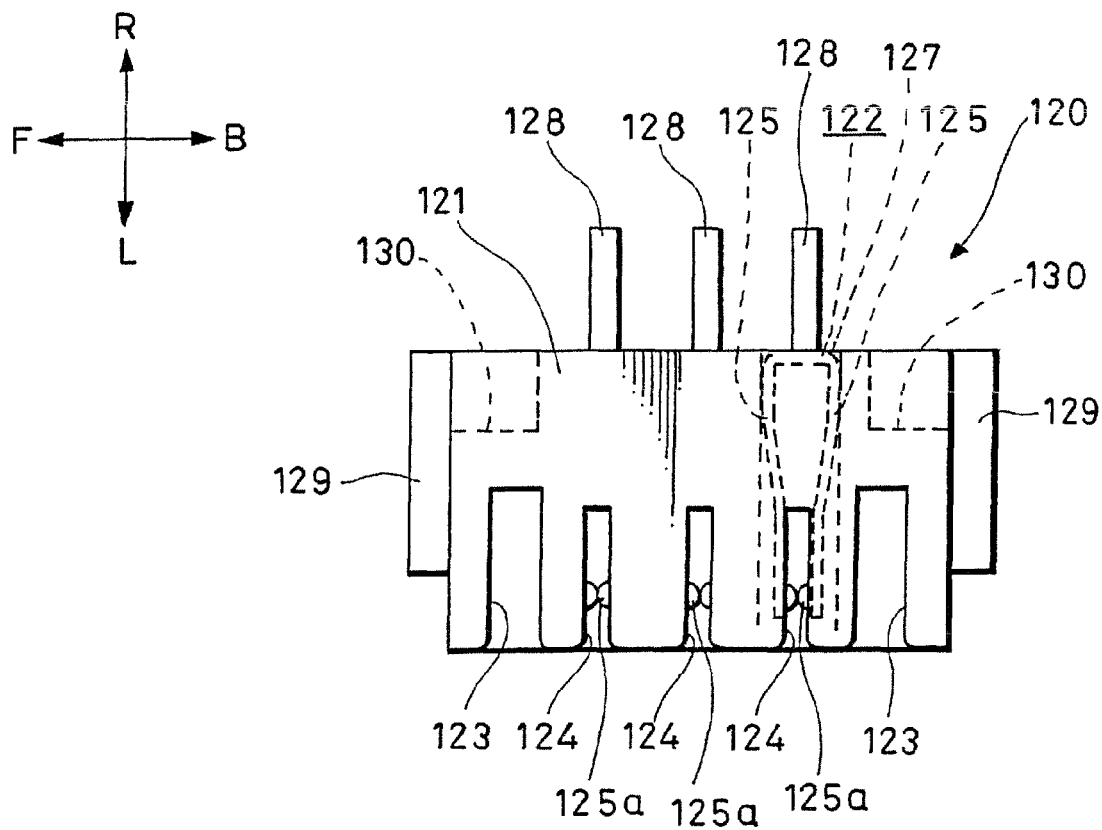
FIG. 17 is an enlarged view of the battery side terminal seen from the upper direction.
Figure 18:
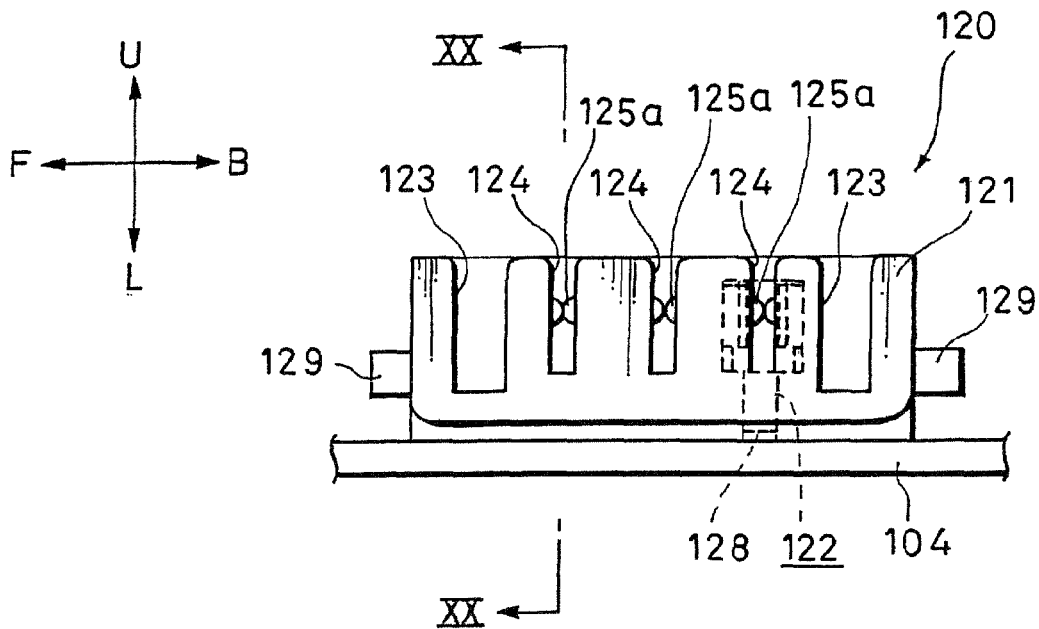
FIG. 18 is an enlarged view of the battery side terminal seen from the left direction.
Figure 19:
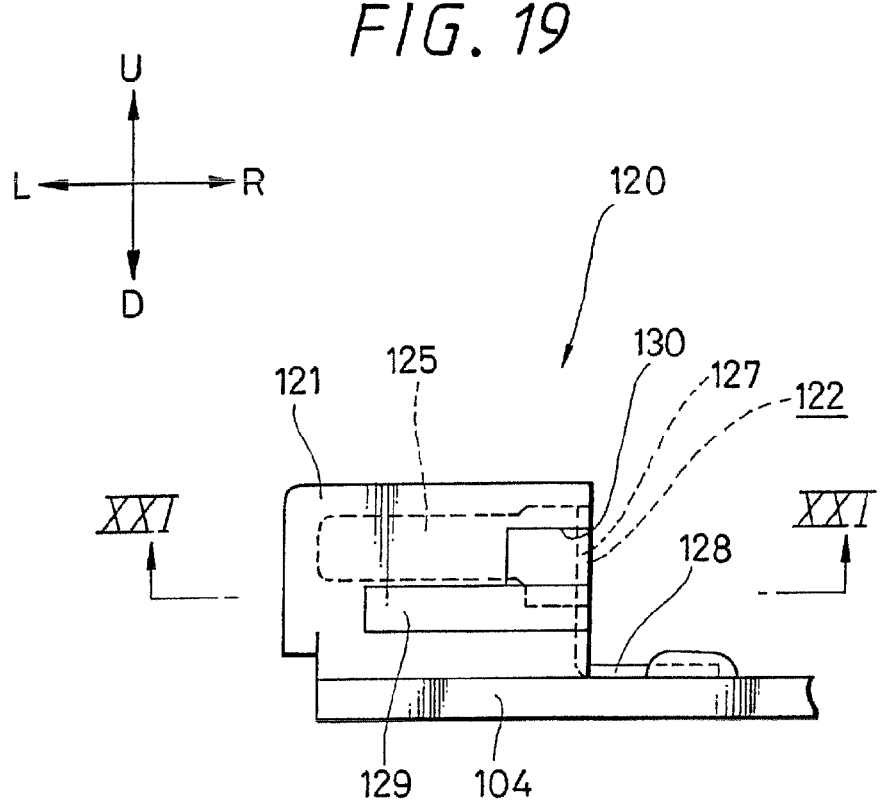
FIG. 19 is an enlarged view of the battery side terminal seen from the back direction.

As mentioned above, the battery side terminal 120 is comprised of a terminal case 121 and the terminal members 122, 122, 122 that are provided therein by insert molding, and the terminal case 121 lends itself a flat cubic solid block-like appearance with five grooves 123, 123, 124, 124, 124 opening upward as well as leftward being formed (refer to FIGS. 17 through 19).

Of the above-mentioned five grooves, two grooves 123, 123 on the front side and back side are larger in width than other three grooves 124, 124, 124 and formed larger in length and depth than the other three grooves 124, 124, 124 and serve as guide grooves for positioning, as will be described later on, with respect to the main body side terminal 30 (refer to FIGS. 17 through 19).

In addition, the median three grooves 124, 124, 124 of the above-mentioned five grooves serve as terminal disposition grooves 124, 124, 124 with a pair of contact pieces 125 being arranged to face each other in each of the grooves 124, and a housing space 126 for housing the above-mentioned contact pieces 125, 125 is formed inside of the terminal disposition grooves 124, 124, 124 (refer to FIGS. 17 and 18). By the way, only one terminal member 122 is illustrated by broken line in FIG. 17 and FIG. 18, and the other two terminal members 122, 122 are omitted.

Further, chamfering process such as an R corner, taper corner of the like are applied to the opening side edges of these guide grooves 123, 123 and terminal disposition grooves 124, 124. As a result, as will be described later on, guide pieces 32, 32 of the main body side terminal 30 and the terminal pieces 31, 31, 31 are easily inserted into these respective grooves 123, 123, 24, 124, 124 (refer to FIGS. 26 through 28).

Figure 21:
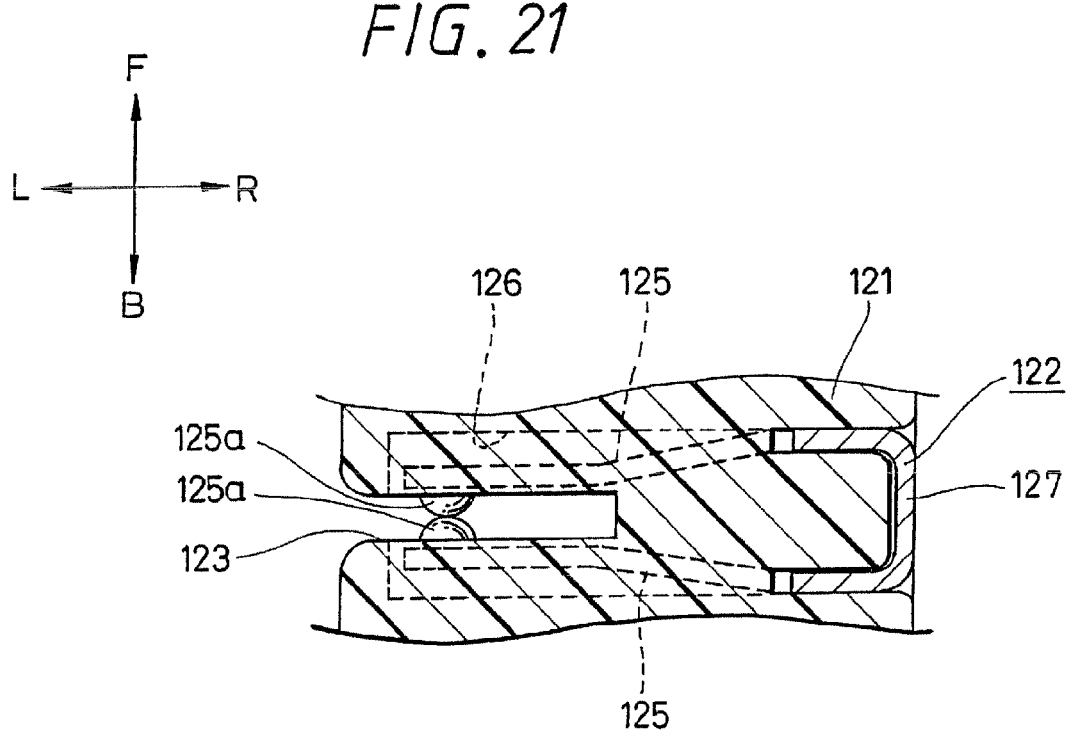
FIG. 21 is an enlarged cross-sectional view of the battery side terminal taken along the line XXI-XXI in FIG. 19.
Figure 22:
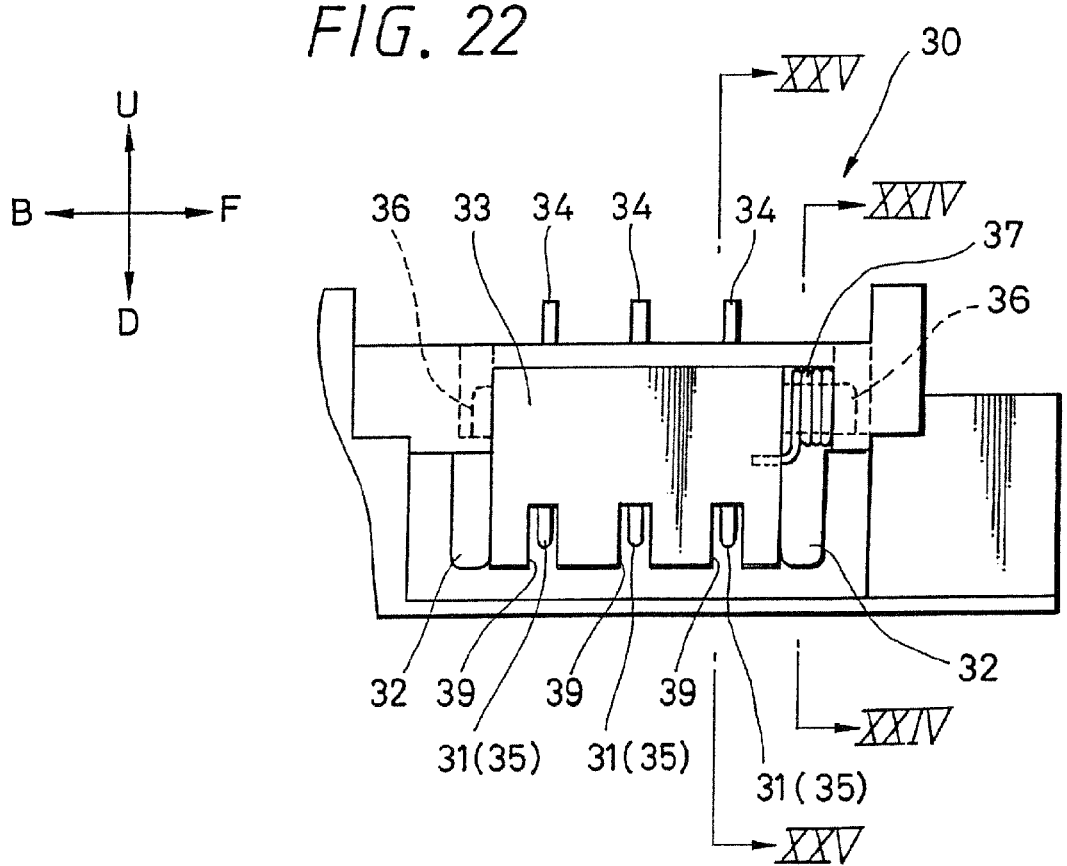
FIG. 22 is an enlarged view of a main body side terminal seen from the left direction.

The respective terminal members 122 of the battery side terminal 120 are integrally formed of the contact pieces 125, 125 facing each other, a base piece 127 connecting one contact piece 125 with the other 125, and a lead piece 128 that is soldered to the substrate 104 arranged in the battery case 101 and extends from the base piece 127 in the direction opposite to the contact pieces 125, 125 (refer to FIGS. 21 and 22).

The contact pieces 125, 125 have the base potions thereof embedded in the above-mentioned terminal case 121, and hemispherical contact convex portions 125a, 125a projecting in the direction in which they are nearing each other are formed at the tip portions thereof, the two contact convex portions 123a, 125a being in the state of contacting with each other without pressure being applied to the both (so-called zero-contact state). When the terminal disposition grooves 124, 124, 124 of the battery side terminal 120 are looked at, only the two contact convex portions 125a, 125a can be seen (refer to FIGS. 20 and 21).

Therefore, when a contact portion 35 is inserted in the terminal disposition groove 124, it contacts with only the contact convex portions 125a, 125a. From whichever of two directions (left and right direction and upper to lower direction) the contact portion 35 is inserted in the terminal disposition groove 124, since the spring characteristics of the contact pieces 125, 125 are the same, the contact stability between both of the terminals 120 and 30 can resultantly be ensured. Of course, this effect is limited to the case where attention is focused on only the structure of the terminal, though only insertions from the back left and right directions have been practiced with respect to the loading of the battery pack 100 on the video camera 1 in the above-mentioned embodiments.

Figure 20:
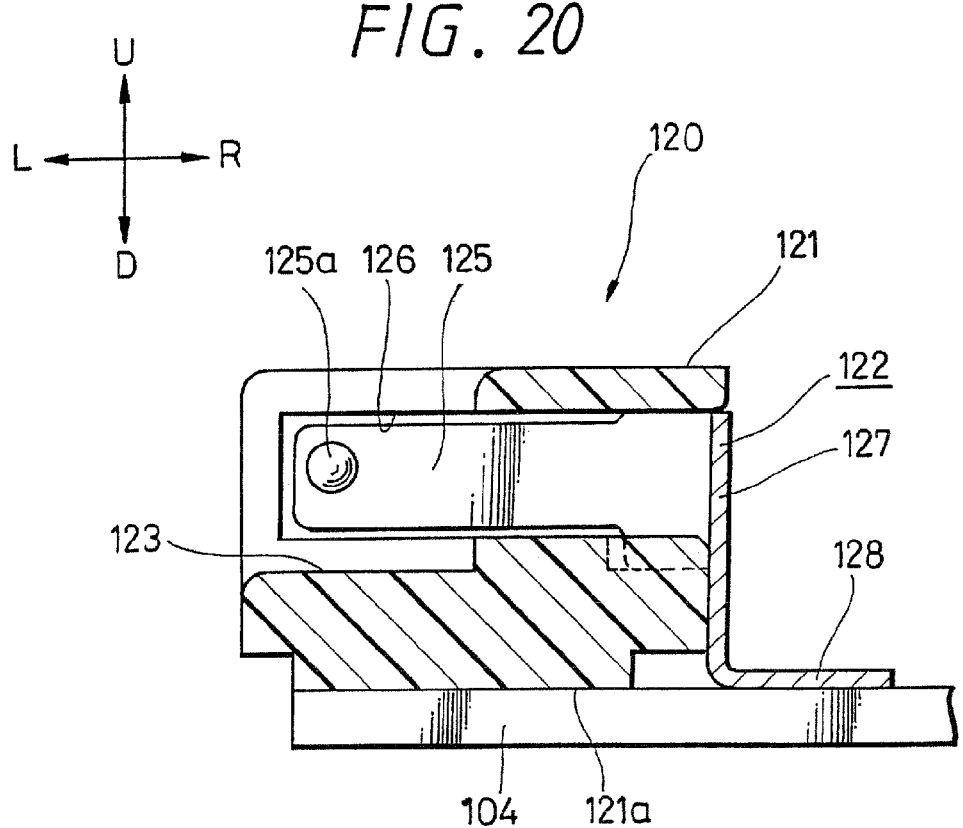
FIG. 20 is an enlarged cross-sectional view of the battery side terminal taken along the line XX-XX in FIG. 18.

The base piece 127 is exposed at a position where it is attached to the right side surface of the terminal case 121, and the lead piece 128 is bent at right angles and extended in the right direction from the lower edge of the base piece 127 to be approximately flush with a bottom surface 121a of the terminal case 121 (refer to FIGS. 20 and 21).

On the front and back both side surfaces of the terminal case 121 are formed slide convex portions 129, 129 extending in the left and right direction, and the slide convex portions 129, 129 are the front and back both side edges of the rectangular cutaway 108 of the above-mentioned back surface case 106 and slide-engage with slide grooves 117, 117 formed on the lower side of the terminal positioning rib 109 so that the battery side terminal 120 is supported to the back surface case 106 (refer to FIG. 9).

The left ends of the slide grooves 117, 117 of the back surface case 106 are blocked up so that leftward positioning of the battery side terminal 120 is performed when it is slide-engaged therewith. That is to say, the position from the back surface 106a of the back surface case 106 to the battery side terminal is regulated.

There are formed cut grooves 130, 130 that are respectively the corner portions between the right side surface and front side surface and between the right side surface and back side surface and contiguous to the upper side of the above-mentioned slide convex portions 129, 129, and the cut grooves 130, 130 are to be engaged with projections 118, 118 provided leftward from the front and back end portions of the above-mentioned terminal pressing rib 116 (refer to FIG. 9).

Then, such battery side terminal 120 has three lead pieces 128, 128, 128 soldered at predetermined positions (front side left corner portion) of the above-mentioned substrate 104 and mounted on the front side corner portion of the substrate 104 (refer to FIGS. 4 and 7). In addition, electronic portions such as an IC chip 103 and the like are mounted on backside predetermined positions of the substrate 104, where the battery side terminal 120 is not mounted on (refer to FIG. 7).

Therefore, the battery cells 102, 102 are combined with each other in the front-to-back aligned state, and the above-mentioned substrate 104 on which the above-mentioned battery side terminal 120, IC chip 103 and the like have been mounted is attached on the upper portion of the battery cells 102, 102 (refer to FIG. 4).

Next, the battery cells 102, 102 on which such substrate 104 had been attached is inserted in the back surface case 106 from the right direction thereof. At this time, the battery side terminal 120 is slide-inserted in the rectangular cutaway 108 of the back surface case 106 from the right direction (refer to FIG. 7).

Then, as mentioned above, the slide convex portions 129, 129 of the battery side terminal 120 are inserted in the slide grooves 117, 117 of the back surface case 106 (refer to FIG. 7).

Finally, both are combined with each other by joining the front surface case 105 with the back surface case 106 to thereby cover the battery cells 102 (refer to FIG. 8).

At this time, the projections 118, 118 of the front case 105 are engaged with the cut grooves 130, 130 of the back surface case 106, and at the same time, the terminal pressing rib 116 presses the right surface of the terminal case 121 to thereby cover the base pieces 127, 127, 127 (FIG. 9) of the terminal member 122, which are exposed from the right surface thereof. Then, positioning in the left and right direction of the battery terminal 120 is performed with the battery terminal 120 held between the back surface case 106 and the front surface case 105.

The combination of the front surface case 105 and the back surface case 106 is performed in the state in which the opening peripheral edges of the both are joined with each other by ultrasonic welding. In addition, the both may be bonded with each other with adhesives instead of ultrasonic welding.

As just described, the battery pack 100 can be composed of three portions in such a manner that the back surface case 106, the battery cell 102 (including the battery side terminal 120, the substrate 104 and the like), the front surface case 105 are assembled thereto from one direction.

Next, the combination of the main body side terminal 30 and the above-mentioned battery side terminal 120 will be explained in detail.

Figure 23:
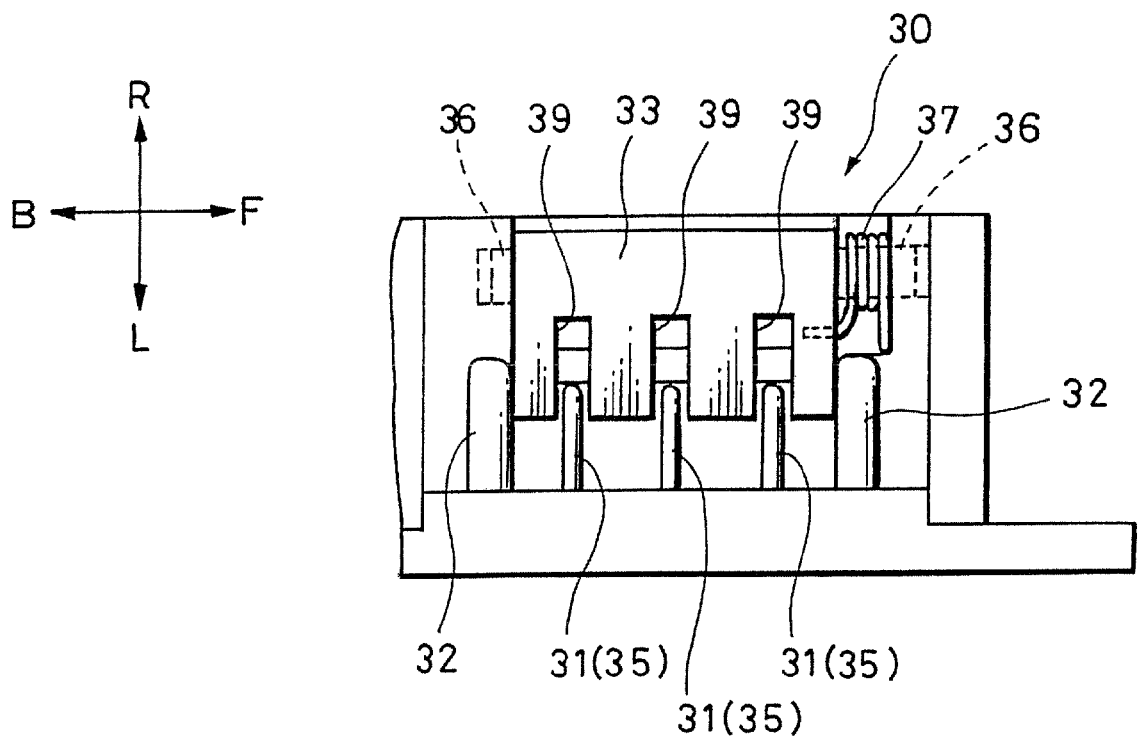
FIG. 23 is an enlarged view of the main body side terminal seen from the lower direction.

First of all, the main body side terminal 30 is provided at the above-mentioned position (front portion bottom surface side corner), and comprises three terminal pieces 31, 31, 31 provided to project from the bottom surface 15 and the inner surface 13a of the upper frame body 13, the two guide pieces 32, 32 provided to sandwich these terminal pieces 31, 31, 31 from the front and back directions and a protection plate rotatably provided on the upper frame body 13 so as to cover the upper space of the respective terminal pieces 31, 31, 31 (refer to FIGS. 22 and 23).

The terminal piece 31 is a rectangular flat plate seen from the front and back direction with the upper edge and left edge thereof being embedded in the upper frame body 13, and a lead portion 34 is provided to project from the upper frame body 13 (refer to FIG. 24), the portion (down edge and right edge) exposed from the upper frame body 13 serving as the contact portion 35 held between the contact pieces 125, 125 of the above-mentioned battery side terminal 120, and the end side edge thereof have been chamfered.

Three of the terminal pieces 31, 31, 31 are formed at the same interval as that of the terminal disposition grooves 124, 124, 124 of the above-mentioned battery side terminal 120, and the thickness of each of the terminal piece 31 is formed into approximately a half of the width of the terminal disposition groove 124 formed in the above-mentioned battery side terminal 120 (refer to FIGS. 22 and 23).

Figure 24:
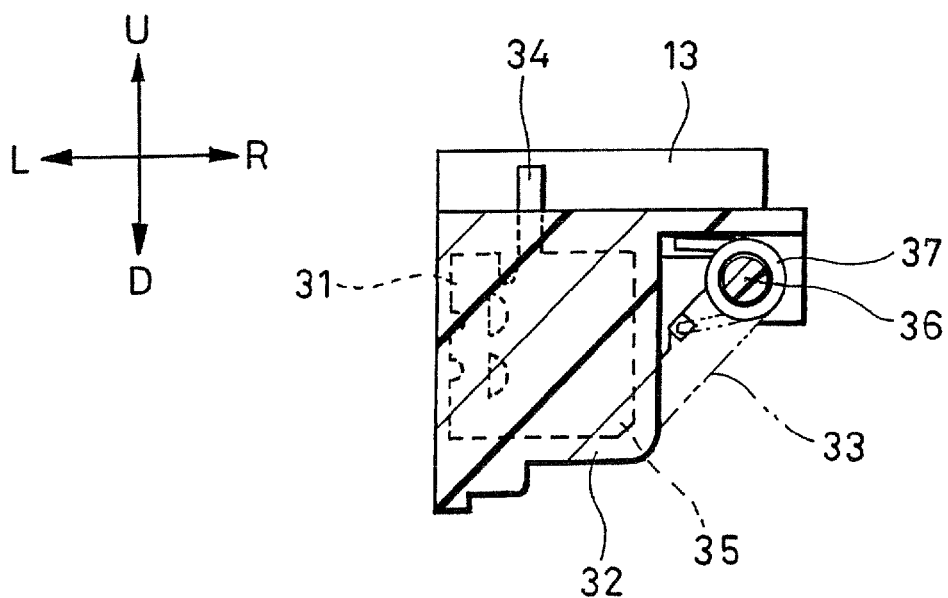
FIG. 24 is an enlarged cross-sectional view of the main body side terminal along the line XXIV-XXIV in FIG. 22.

The guide piece 32 is of a rectangular shape similar to that of the above-mentioned terminal piece 31 when seen from the front and back direction, and is integrally formed together with the upper frame body 13 and the bottom surface 15 of the battery loading portion (refer to FIG. 24).

In addition, the guide terminals 32, 32 are larger than the contact portion 35 of the terminal piece 31 when seen from the front and back direction, and the plate thickness thereof is formed to be thicker than the terminal piece 31. Further, the guide terminals 32, 32 are formed at the same internal positions as that of the guide grooves 123, 123 formed in the above-mentioned battery terminal 120, and the plate thickness of each of the guid pieces 32, 32 is formed to be slightly smaller than the width of the guide grooves 123, 123 of the terminal case 121 of the above-mentioned battery side terminal 120 with the end side edge thereof being chamfered (refer to FIG. 23).

Figure 26:
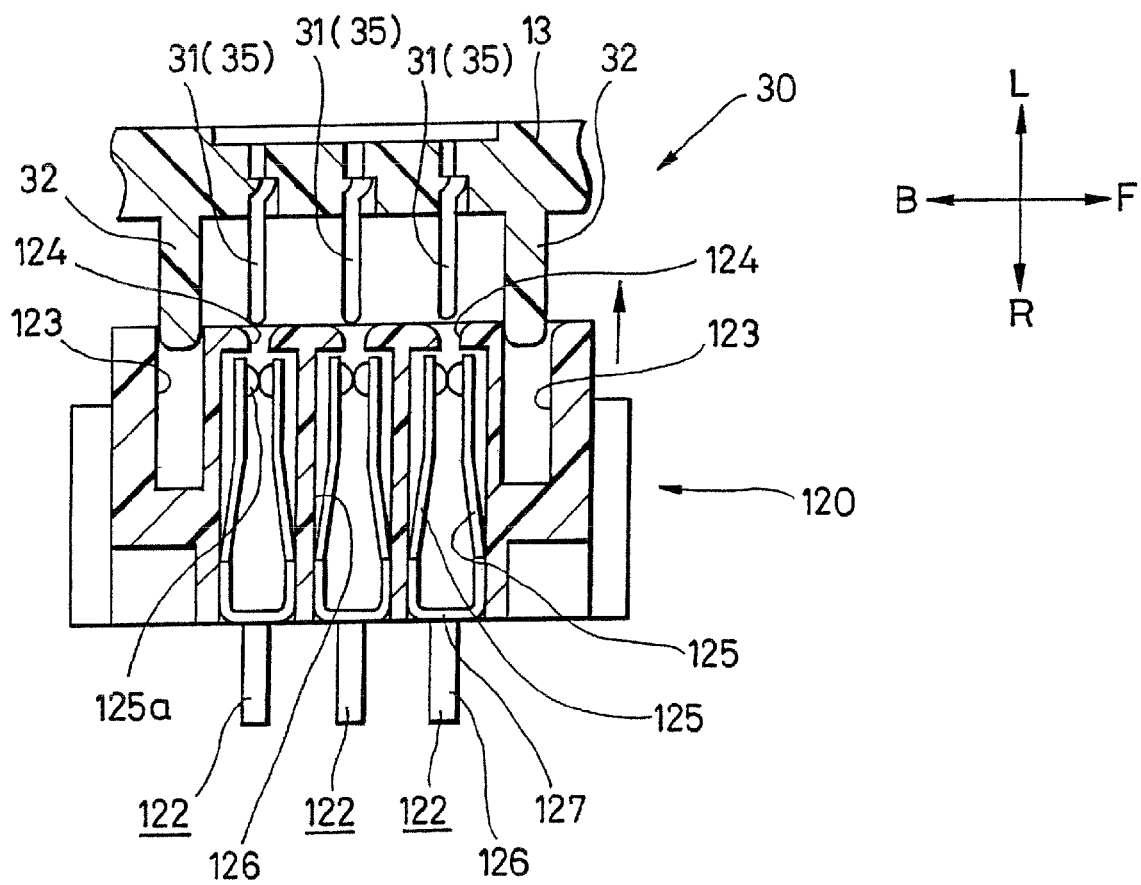
FIG. 26 is an enlarged cross-sectional view of a battery side terminal and the main body side terminal showing how the two join with each other; and this figure shows an initial joining stage in which a guide piece is in the state of being about to enter into a guide groove.

As described above, since the guide piece 32 is formed to be larger than the contact portion 35 of the terminal piece 31, when the main body side terminal 30 is about to be combined with the battery side terminal 120, the guide is made to enter into the guide groove 123 of the guide piece 32 earlier than the contact portion 35 enters into the terminal groove 124 (refer to FIG. 26).

Figure 25:
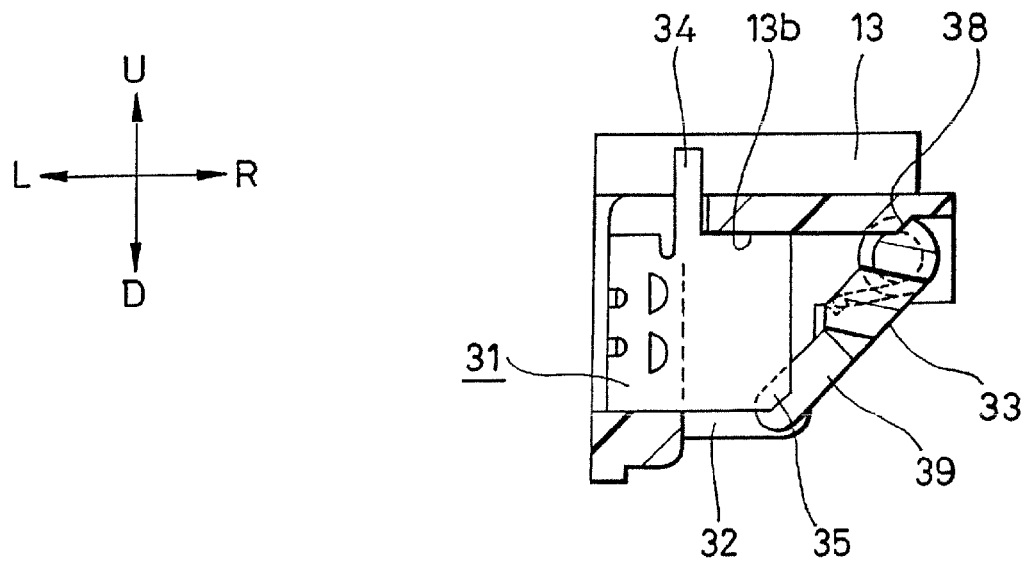
FIG. 25 is an enlarged cross-sectional view of the main body side terminal along the line XXV-XXV in FIG. 22.

The protection plate 33 is supported to the position closer to the opening side edge (right side edge) of the front end portion of the inner surface (undersurface) of the upper frame body 13 for freely rotating in the up and down direction (refer to FIGS. 24 and 25).

To be concrete, at the front end portion of the inner surface (lower surface) of the upper frame body 13 is formed a convex-like protection frame housing 13b, and at the front and back both side edges of the protection plate 33 are integrally formed support shaft projecting portions 36, 36 for rotatably engaging with the right end both side portions of the above-mentioned protection plate housing portion 13b, and a coil spring 37 is arranged around the front side support shaft projecting portion 36. The protection plate 33 is urged in the counterclockwise direction when seen from the backward direction (refer to FIGS. 24 and 25).

Figures 10A, 10B:
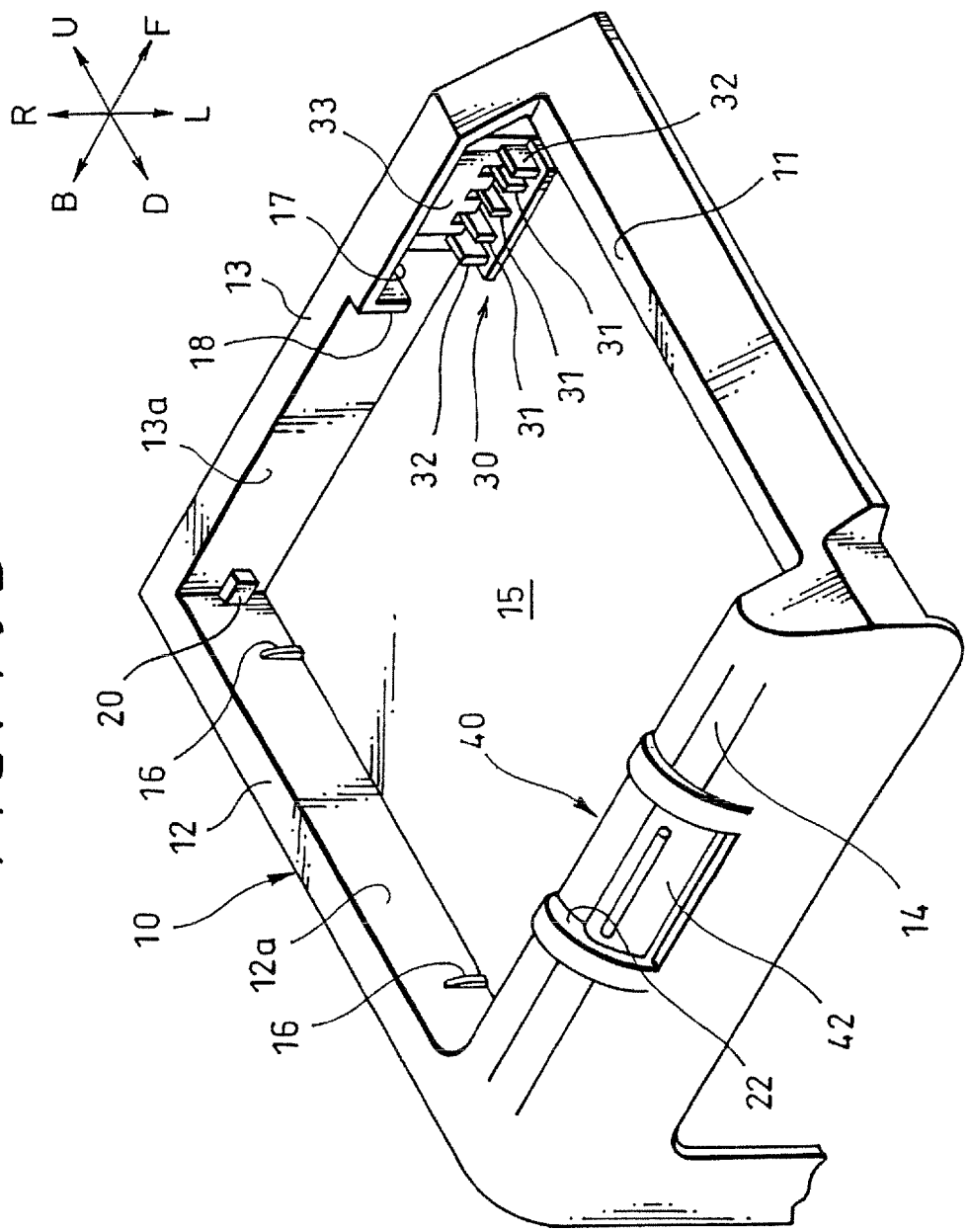
FIG. 10 is an enlarged perspective view of the battery loading portion, wherein (a) shows the state of a protection plate of the main body side terminal being rotated while (b) shows the state of the protection plate of the main body side terminal being not rotated.
Figure 29:
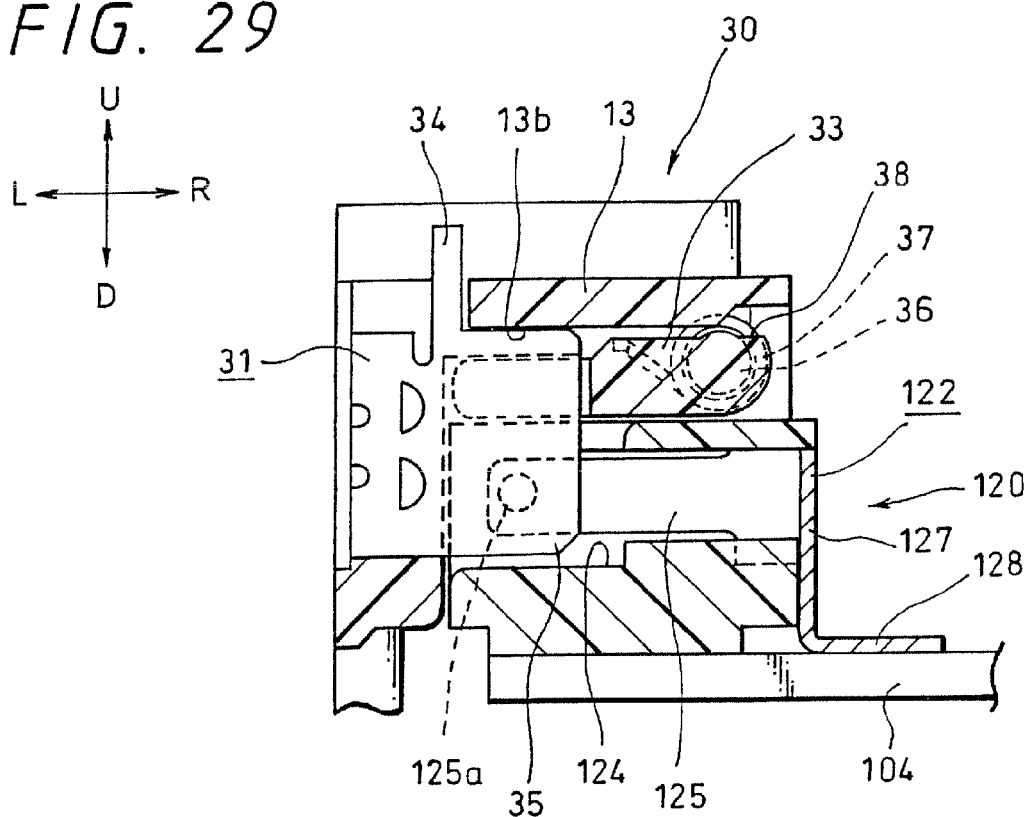
FIG. 29 is an enlarged cross-sectional diagram taken along the line XXIX-XXIX in FIG. 28.
Figure 30:
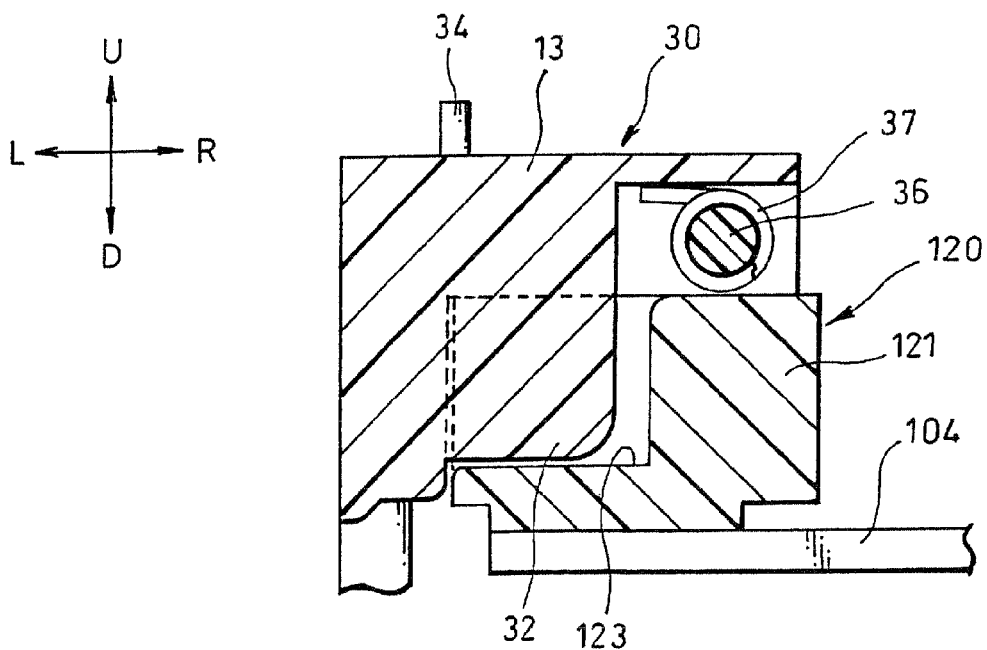
FIG. 30 is an enlarged cross-sectional diagram taken along the line XXX-XXX in FIG. 28

At a rotation fulcrum portion of the protection plate 33 are provided rotation blocking portions 38, 38 (only one is shown in the figures) that are in contact with the upper frame body 13 for blocking the above-mentioned counterclockwise rotation, and the protection plate becomes a rotational end of the counterclockwise direction side thereof when the rotational end thereof is oriented in the left oblique downward direction (substantially 45° degrees) (refer to FIGS. 10(a), 24, and 29). In addition, the rotational end of the clockwise direction side of the protection plate 33 is at a position where it is housed in the protection plate housing portion 13b of the upper frame body 13, or approximately in a horizontal position (refer to FIG. 10(b)).

The protection plate 33 in the front and back direction is slightly smaller in size than the distance between the above-mentioned two guide pieces 32, 32 and is made to always rotate between the two guide pieces 32, 32. At the position corresponding to the above-mentioned terminal piece 31 are formed slits 39, 39, 39 that open to the rotational end side edge. As a result, when the protection plate 33 is rotated upward, the respective terminal pieces 31, 31, 31 are inserted in these slits 39, 39, 39 to permit the protection plate 33 to rotate, with the terminal pieces 31, 31, 31 being exposed at the time of rotation (refer to FIGS. 10, 22, and 23). By the way, FIG. 10(a) shows the state in which the protection plate has been rotated, and FIG. 10(b) shows the state in which the protection plate is not rotated.

Then, when external force is not applied to the protection plate 33, at the rotational end in the counterclockwise direction of the protection plate 33, the corner portions between the two guide pieces 32, 32 are in the state in which they cover the both side ends of the rotational end edges of the protection plate 33 (refer to FIG. 25). In addition, in this state, the corners of the contact portions 35, 35, 35 of the above-mentioned respective terminals 31, 31, 31 are in the state of engaging with the above-mentioned slits 39, 39, 39 (refer to FIG. 25).

Then, as will be described later in detail, when the battery pack 100 is loaded on the battery loading portion 10, the terminal case 121 of the battery side terminal 120 presses the above-mentioned protection plate 33 to thereby rotate in the clockwise direction against the spring force of the helical torsion spring 37 and ends up being positioned in the protection plate housing portion 13b of the upper frame body 13 (refer to FIG. 29).

As a result, the contact portions 35. 35. 35 of the main body terminal 30 are exposed and enter relatively into the terminal disposition grooves 124, 124, 124 of the terminal case 121 to thereby be held between the pair of contact pieces 125, 125, and the electrical contact is established (refer to FIG. 28).

In this manner, when the protection plate 33 is in the state in which it is not subjected to external force, since the protection plate 33 is in the state of covering the contact portions 35, 35, 35, the contact portions are not exposed to thereby prevent foreign materials from attaching thereto (refer to FIG. 25).

In addition, when any kind of collision occurs on the portion of the main body terminal 30, for example, such as when the battery pack 100 is loaded in a wrong orientation (erroneous loading), there is a possibility that a member other than the battery terminal 120 may collide with the main body side terminal 30.

Even on such an occasion, since the guide pieces 32, 32 are formed to be larger than the contact portions 35, 35, 35, the external force acts mainly on the guide pieces 32, 32, but not on the contact portions 35, 35, 35 to thereby prevent the contact portions 35, 35, 35 from being deformed.

Further, when comparatively small foreign materials collide with the main body side terminal 30, since they collide with the protection plate 33 prior to colliding with the terminal piece 31 (contact portion 35) due to the presence of the above-mentioned protection plate 33, the external force is alleviated so that the contact portion 35 is not directly subjected to large external force.

Furthermore, as described above, since the protection plate 33 is provided in the state of being held between the two guide pieces 32, 32, when external force with a front and back directional element is applied to the protection plate 33, since the guide pieces 32, 32 act so as to support the protection plate 33, and further, since, as described above, the three respective contact portions are inserted in the slits 39, 39, 39, the external force acts on the three contact portions 35, 35, 35 through the respective slits 39, 39, 39 against the front and back directional displacement of the protection plate 33. Consequently, since the external force never acts on the one contact portion 35, it is possible in this regard to prevent the contact portions 35, 35, 35 from being deformed.

By the way, as in the above-mentioned embodiment, such main body side terminal 30 may have guide pieces 32, 32 integrally formed at the portion of the upper frame body, and terminal pieces 31, 31, 31 integrally formed by insert molding or a protection plate 33 rotatably provided, or may have respective portions molded or formed as another member in a base member of a predetermined form to thereby attach such member to the upper frame body 13 as a terminal.

Next, how the battery side terminal 120 is connected to the main body side terminal 30 when the battery pack 100 is loaded on the battery loading portion 10 will be explained.

First of all, the battery pack 100 has the battery side terminal 120 (including the terminal positioning rib 109, the terminal pressing rib 116) obliquely positioned so as to dive under the over-hang portion 17 of the upper frame body 13 so that the main body side terminal 30 and the battery side terminal 120 are opposed to each other.

Next, when the battery side terminal 120 is made to dive under the above-mentioned over-hang portion 17 (refer to FIG. 13), the guide pieces 32, 32 of the main body side terminal 30 are relatively inserted in the guide grooves 123, 123 of the battery side terminal 120 (refer to FIG. 26). At this time, since the guide grooves 123, 123 have had the opening side edges thereof chamfered, and the end side edges of the guide pieces 32, 32 have been also chamfered, it has become easy to draw in the both.

In such a condition, the guide pieces 32, 32 are in the state of being slightly inserted in the guide grooves 123, 123, and as the result of which positioning of the battery terminal 120 relative to the main body terminal 30 is performed. As mentioned above, prior to the contact pieces 125, 125 coming in contact with the contact portions 35, 35, 35, since the guide pieces 32, 32 composed of a mold member are engaged with the guide grooves 125, 125, positioning can be performed by a precisely formed member. Consequently, precision positioning of both the terminals 120, 30 can be performed before the contact pieces 125, 125 and the contact portion 35 of both the terminal 120, 30 come in contact with each other, with the result that the contact to be made later on between the contact pieces 125, 125 and the contact portion 35 is performed with high precision.

From this state, the lower portion of the battery pack 100 is rotated and then is loaded on the battery loading portion 10. The rotation of the battery pack 100 is performed by having the portion-to-be-locked of the back surface case 106 caught by the above-mentioned over-hang portion 17 with the region as rotational fulcrum (refer to FIG. 14).

Then, the contact portion 35 of the main side terminal 30 relatively enters into the terminal disposition groove 124 of the battery side terminal 120 (refer to FIG. 27), and contacts with and push aside the two contact convex portions 125a, 125a so that the contact pieces 125, 125 elastically bend and sandwich the contact portions 35. As a result, an electric connection between the battery side terminal 120 and the main body side terminal 30 is established (refer to FIG. 28).

In addition, the relations between the contact portion 35 and the contact pieces 125, 125 are such that the contact portion 35 relatively moves in the surface direction thereof, and since the two contact pieces 125, 125 are elastically bent in a way that the tip portions (contact convex portions 125a,

125a) thereof are pushed to move away from each other, unreasonable force does not act between the both, with the result that the contact portion 35 and the contact pieces 125, 125 are never deformed.

Further, since the relations between the battery side terminal 120 and the main body side terminal 30 are such that the terminal disposition groove 124, 124, 124 that are open in two directions of the battery side terminal 120 contact with the flat plate-like contact portions 35, 35, 35 having corners at approximately right angles thereto, the battery side terminal 120 can be possibly combined with the main body side terminal 30 from directions in the range of 90° degrees including the right and left direction and the up and down direction.

That is, when the structures of only the battery side terminal 120 and the main body side 30 are taken into consideration, the battery side terminal 120 can be combined with the main body side terminal 30 from the left direction or the downward direction, or from the left oblique downward direction including the just-mentioned directions, meaning that the former can be combined with the latter from any of directions in the range of substantially 90° degrees, and further, in any of the combinations from whichever of these directions, unreasonable force never acts on either of the contact portion 35 and the contact pieces 125, 125, with the result that the contact portion 35 and the contact pieces 125, 125 are never deformed.

Of course, in the relations between the above-mentioned battery pack 100 and the battery loading portion 10 of the camera main body 2, since the battery side terminal 120 is so intended to combine with the main body side terminal 30 from the substantially left direction, it may be said that the structures of the battery side terminal 120 and the main body side terminal 30 can not be fully brought into play.

However, since loading of the above-mentioned battery pack 100 on the battery loading portion 10 is performed by rotation, and therefore, the combination of both the terminals 130 and 30 is not a directional component of at least only one direction, by employing the terminal structures, it may be said that the contact portion 35 and the contact pieces 125, 125, of both the terminals 120 and 30 are not subjected to unreasonable force when they combine with each other, and thereby are not subject to deformation.

In addition, since the contact convex portions 125a, 125a are provided at the tip portions of the contact pieces 125, 125 so that the contact convex portions 125a, 125a contact with the contact portion 35, there is a further possibility that both the terminals are combined with each other in the range of 90° degrees including the above-mentioned two directions.

That is, the contact portion 35 enters to push aside the contact pieces 125, 125 such that they move away from each other, but since the contact portion 35 contacts with only the contact convex portions 125a, 125a, the battery loading portion 10 can receive the battery pack 100 in the same manner in any of the combinations of both the terminals 120 and 30 from any of the directions in the range of 90° degrees including the above-mentioned two directions.

Further, since the contact convex portions 125a, 125a are provided at the tip portions of the contact pieces 125, 125, even when the positions in the front and back direction of the contact pieces 125, 125 and the contact portion 35 are slightly shifted, it is possible to maintain the stable state of the connection between the two terminals (contact piece 125, 125 and contact portion 35).

Next, the quality of material and the width of the terminal member 122 that affect the state of contact between the contact pieces 125, 125 and the contact portion 35 relating to the combination of both the terminals 120 and 30 will be examined.

In addition, the terminal piece 31 is made of brass (thickness: t=0.35 mm), and the contact portion thereof is gilded 0.76 μm in thickness. Further, the reason why brass is chosen as the material for the terminal piece 31 is because brass, phosphor bronze and Beryllium copper are generally used as a point of contact, and costs and workability are also taken into consideration.

Furthermore, with respect to gilding, a Nickel layer is used as a base sheet, and 0.75 in thickness is set with an eye to increasing a safety ratio because, when the state of use of the battery pack 100 and the video camera 1 is taken into consideration, repeated insertion and pulling-out of the battery pack 100 are frequently performed.

Consequently, even if applied to the terminal structures of the video camera 1 and the battery pack 100, the contact convex portions 125a, 125a can fully withstand gild wasting when they are in ordinary use.

In addition, the layer thickness of 0.76 μm in gilding is mainly for contact portions, that is, the contact portion 35, though a layer thickness of not more than 0.1 μm in gilding is recommended for the lead portion 34. That is for ensuring an electric connection stability of the both.

Then, as for the terminal member 122, one is chosen out of four samples after testing of them. As materials for such tests, as mentioned above, three materials (brass, phosphor bronze, Beryllium copper) had been considered, but by taking into consideration the spring force of the contact pieces 125, 125, testings were performed on phosphor bronze and Beryllium copper because of their favorable properties.

A sample ① used phosphor bronze (thickness: t=0.2 μmm) as material with 0.76 μm thick gilding being applied to a contact portion, a sample ② used phosphor bronze (thickness: t=0.2 mm) as material with 0.76 μm thick gilding being applied to a contact portion, a sample ③ used Beryllium copper (thickness: t=0.2 mm) as material with 0.76 thick gilding being applied a contact portion, and a sample ④ used Beryllium copper (thickness: t=0.15 mm) as material, and a sample ④ used Beryllium copper (thickness: t=0.15 mm) as material with 0.76 thick gilding being applied to a contact portion. By the way, as for gilding, a Nickel layer was used as a base sheet as in the case of the above-mentioned terminal member 122. In addition, the reason why 0.76 μm layer thickness was chosen is also the same. Further, 0.76 μm gilding on the contact pieces 125, 125 is the same thickness on contact portions, that is, the contact convex portions 125, 125, and it is recommended that gilding on the lead piece 128 be not more than 0.1 μm thick.

As for a testing method, there was performed an endurance test in which the terminal piece 31 was inserted into and pulled out from the terminal member 122 7000 times.

Tests were conducted on items such as contact resistance, total engaging force, total disengaging force and appearance examinations, and the former three test items are shown by respective values at predetermined numbers of times from one to 7000. In addition, appearance examinations were conducted by visual observation after 7000 times of an endurance test.

Further, contact resistance was measured by using a 4-terminal method with an open circuit voltage set at not more than 20 mV, a short circuit current at not more than 100 mA and a stipulated value at 20 mΩmax.

Total engaging force was measured by engaging the terminal 120 with the terminal 30 (combine), and then, engaging force was measured, and the engaging force was set at 10N (Newton) max.

As for total disengagement force, disengaging force was measured at the time of when the engagement between both the terminal 120 and the terminal 30 was released, and the disengaging force was set at 0.3N (Newton) min.

The test results about the former three test items will be shown in FIGS. 31 through 33.

With respect to the sample ①, contact resistance showed little but stable (refer to FIG. 31) dispersion and insertion-and-pull-out force was also stable to thereby obtain a good value (refer to FIGS. 32 and 33). In addition, appearance examinations showed that the contact convex portions 125a, 125a of the contact pieces 125, 125 was worn by proper amounts, and no problematic phenomenon was found.

With respect to the sample ②, contact resistance showed large dispersion in the 7000 times endurance test and weak total engaging force (refer to FIG. 32). In addition, appearance examinations showed there were few traces of scratches. It was also observed that total engaging force was weak to the extent that contact pressure was little to thereby cause a problem with contact resistance.

With respect to the sample ③, there were no problems with contact resistance and total engaging force as well, though disengaging force varied largely, and a so-called jerky feel at disengagement tended to occur at a time of disengagement. Further, appearance examinations showed that the more largely disengaging force varied, the more many abrasive scratches occurred on the terminal piece 31, and the more violently, the contact convex portions 125a, 125a of the terminal piece 31 were worn.

With regard to the sample ④, total engaging force was weak, and contact resistance was comparatively stable, though there was a hidden possibility that a problem would arise with contact resistance value. In addition, appearance examinations showed that to the extent that total engaging force was small, there were few traces of abrasive scratches.

As a result, of the four samples, it can be considered that the sample ① is the most suitable.

Further, as for Beryllium copper, in the case of gilding being applied to Beryllium, a so-called after-plating (plating process after a predetermined form is fabricated) was only available (others being difficult), which was the reason why the sample ① was selected.

That is, Beryllium copper is generally difficult to form and shape (press working such as bending and folding) after it is gilded, so in the form of the above-mentioned terminal member 122, its form after it is formed and shaped is such that the contact convex portions 125a, 125a are in contact with each other. As a result, when gilding is applied to anything that has such contact portions, the contact portions end up being gilded as they are in contact with each other by after-plating.

Meanwhile, with respect to the above-mentioned four samples, they all satisfied above-mentioned stipulated values (contact resistance:20 mΩmax, engaging force:10 Nmax, disengaging force:0.3 Nmin), so there wasn't any problem with selecting any one of these samples. However, when further bad conditions are taken into consideration, the sample ① was favorably selected because good results were obtained by the sample ①.

Figure 34:
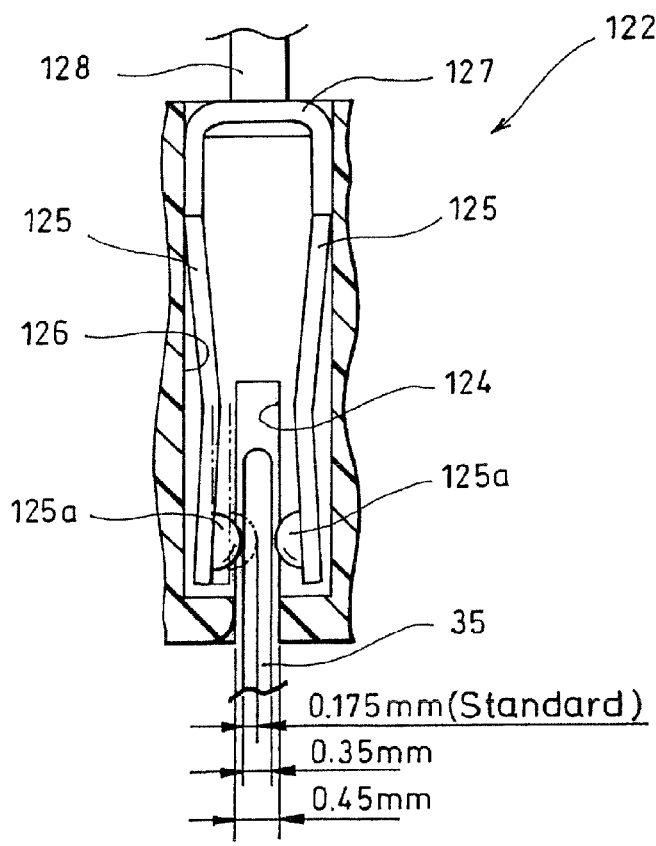
FIG. 34 is an enlarged cross-sectional view of the contact portion in the state of being held between the contact pieces in the standard position.
Figure 35:
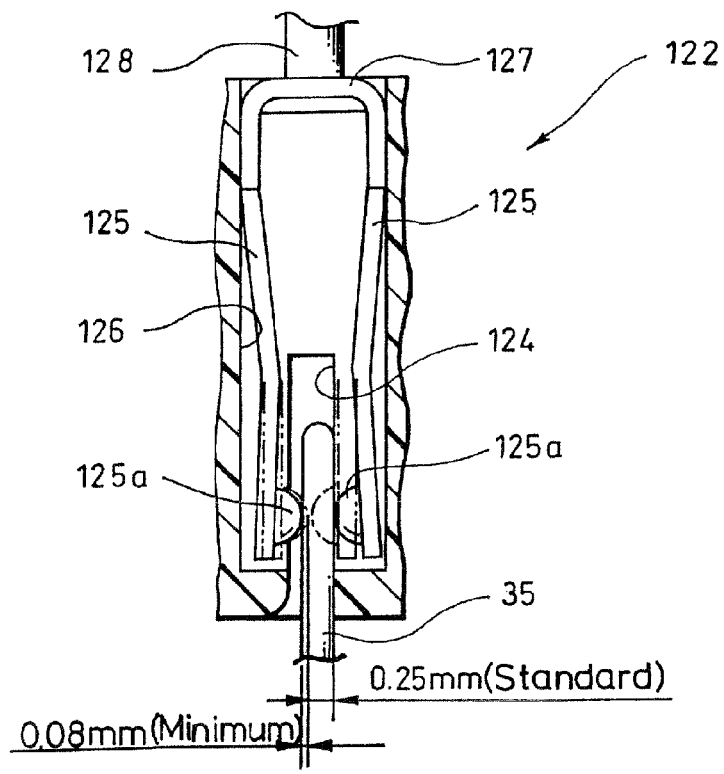
FIG. 35 is an enlarged cross-sectional view of the contact portion in the state of being held between the contact pieces in the position shifted in one direction.
Figure 36:
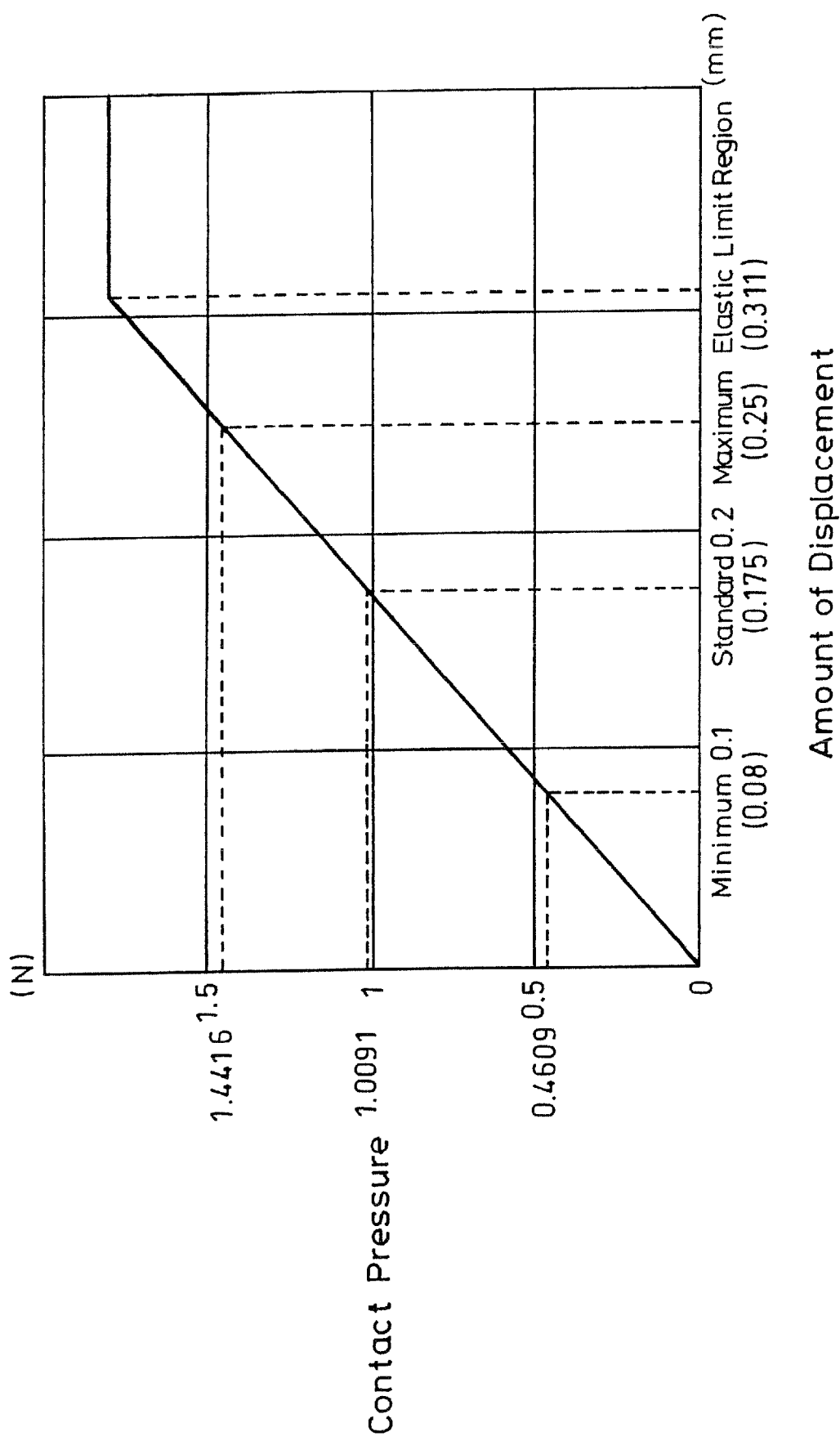
FIG. 36 is a graph showing the relationship between the amount of displacement of the contact piece and the contact pressure.

Further, contact pressure of the spring force of the contact pieces 125, 125, when the sample ① was selected as materials of the terminal member 122, will be considered (FIGS. 34 through 36).

Before that, the dimensions and the like of the terminal member 122 and terminal disposition groove 124 on which the terminal member 122 is disposed will be clearly described (refer to FIGS. 34 and 35).

The contact pieces 125, 125 of the terminal member 122 is, as mentioned before, 0.2 mm in thickness, 1.2 mm in width dimension, and the length of the portion exposed from a buried portion is 3.9 mm, and the above-mentioned contact convex portions 125a, 125a having r=0.3 are formed with the position 0.45 mm shifted from the edge thereof toward the base piece 127 side being at the center (refer to FIGS. 34 and 35). In addition, the contact pieces 125, 125 extend from the buried portion such that they approach each other, and are bent to thereby become parallel to each other approximately at the center of the longitudinal direction with the interval between the two from the bent portion to the edge portion being formed to be 0.6 mm. As a result, the contact convex portions 125a, 125a come into zero contact with each other (refer to FIG. 21).

The opening width of the terminal disposition groove 124 is formed to be 0.45 mm, and the plate thickness t of the above-mentioned contact portion 35 is made 0.35 mm, so that when the contact portion 35 enters into the terminal disposition groove 124 in the standard position (median), the interval between the inner edge of the terminal disposition groove 124 and the contact portion 35 becomes (0.45−0.35/2=0.05 mm) (refer to FIGS. 34 and 35).

At this time, there occur approximately the same bends to the two contact pieces 125, 125, and the amount of displacement becomes 0.175 mm. In addition, contact pressure at that time becomes 1.0091N (refer to FIG. 36).

Then, when the contact portion 35 is entered into the terminal disposition groove 124 by being shifted in one direction, the maximum amount of displacement occurs to one contact piece 125 while the minimum amount of displacement occurs to the other contact piece 125, with the result that respective contact pressure at that time has become 1.4416N and 0.4609, respectively (refer to FIG. 36).

Therefore, in the case where the above-mentioned material (phosphor bronze) of the above-mentioned sample ① is used, when the contact portion 35 comes in contact with the contact convex portion 125a, it is observed that its contact pressure is 1.4416N at the maximum and 0.4609N at the minimum, which is enough as contact pressure.

In the case where gilding is applied, 0.0981N to 0.1961N is generally enough as contact pressure, though in the above-mentioned sample ①, contact pressure greater than that is exerted thereon, which seems too excessive.

However, since this terminal structure is based on the premise that it is applied to the electric contact between the battery pack 100 and the video camera 1, it is easily predicted that the number of insertions and pulling-out are many, and gilding is worn.

Therefore, it is necessary to secure the value of contact resistance below the stipulated value even if the Nickel layer as the base sheet becomes exposed in case gilding is worn off.

Then, since it is said that contact resistance as the stipulated value can be secured when contact pressure of Nickel is generally 0.5884N, by securing the maximum value 1.4416N of the other contact piece 125 though the above-mentioned minimum value of one contact piece 125 is 0.4609N, resistance value is made to satisfy the stipulated value even when the gilding is worn off (refer to FIG. 36).

In addition, insulation resistance and withstand voltage were subjected to examinations as other items of the examination items, with the result that the above-mentioned four samples came within the stipulated value, and there weren't any particular differences, it was observed.

Further, as anti-environmental performance, tests of electric performance and mechanical performance were carried out with respect to moisture resistance, a temperature cycle and spraying of salty water, with the result that any particular differences could not have been obtained.

Next, in the above-mentioned embodiments, the battery pack 100 (component-to-be-loaded) having the battery side terminal 120 and the video camera 1 (main body side apparatus) having the main body side terminal 30 were cited and explained as examples, though there are a dry cell pack 140 (component-to-be-loaded) that also has a battery side terminal 120 as has the battery pack 100, and the video light 150 and a battery charger 160 each of which has a main body terminal 30 as has the video camera 1 (refer to FIGS. 37 through 40).

Further, as for the battery pack 100, there are plural kinds according to capacity, and as for the video camera 1, there are a charge-complying-type 1A equipped with a charge function and a charge-non-complying-type 1B without a charge function (refer to FIGS. 37 through 40).

When all of these plural kinds of devices (plural kinds of battery pack 100, dry cell pack 140 and the like) with the battery pack 100 are capable of being loaded on apparatus (video camera 1 (charge-complying-type 1A and a charge-non-complying-type 1B), video light 150 and battery charger) having the main body terminal, there are cases where problems occur.

For example, the dry cell pack 140 is capable of being loaded on a video camera 1B (charge-non-complying-type) though it is necessary for the dry cell pack 140 to be made not capable of being loaded on a video camera 1A (charge-complying-type) and the battery charger 160, and further, in the case of the video light 150, it is necessary for a high capacity-dedicated-type 150A to be permitted to be loaded on only a high capacity battery pack 100H of the battery packs 100, and never to be permitted to be loaded on other low capacity battery pack 100L, standard capacity battery pack 100S and dry cell pack 140.

Here, the charge-complying-type 1A of the video camera 1 is equipped with a DC in jack terminal, and when the DC in jack is connected thereto, a camera main body 2 can be driven by charging the battery pack 100 that is loaded on the battery loading portion 10, and the charge-non-complying-type 1B is apparatus that does not have such a charge function. By the way, the video camera 1 enumerated in the above-mentioned embodiments belongs to the charge-complying-type 1A on which the above-mentioned dry cell pack 140 is not capable of being loaded.

Then, it is necessary to judge whether or not the battery pack 100, although it has such battery side terminal 120, is capable of being loaded on the apparatus having the main side terminal 30, and thereby to prevent its loading when it is judged that loading is not permitted.

Then the discriminating tab 111 is provided in the vicinity of the above-mentioned battery side terminal 120 while the above-mentioned blocking portion 19 for blocking loading of the battery pack 100 or the like is provided at the corresponding region in the vicinity of the main body side terminal 30

Hereinafter, the specific examples of the discriminating tab 111 of the battery side terminal 120 and the blocking portion 19 of the main body side terminal 30 will be shown.

As for the kinds of the discriminating tab 111 of the battery side terminal 120, there are four kinds such as an L type, H type and D type, the L type discriminating tab 111L being applied to a low capacity type battery pack L, the S type discriminating tab 111S being applied to a standard type battery type 100S, the H type discriminating tab 111 being applied to a high capacity type battery pack 100H and the D type discriminating tab 111D being applied to the dry cell 140 (refer to FIGS. 37 through 40).

In addition, as for the kinds of the blocking portion 19 of the main body side terminal 30, there are four kinds such as a type I, a type II, a type III and a type IV, the blocking portion I being applied to the video camera 1A of the charge-complying-type (the same with the battery charger 160), the blocking portion II being applied to the video camera 13 of the charge-non-complying-type, the blocking portion III being applied to a high capacity-dedicated video light 150A and the blocking portion type IV being applied to a non-low capacity video light 150B (refer to FIGS. 37 through 40).

The S type discriminating tab 111S applied to the standard capacity battery pack 100S is structured as described above, and has the small projecting bars 110 formed to extend in opposite directions (front and back direction) to each other from the left ends of the terminal positioning ribs 109 that is formed at the position shifted slightly rightward from the back surface 106a of the back surface case 106 (refer to FIGS. 37 through 40).

The L type discriminating tab 111L applied to the low capacity battery pack 100L is formed such that the small projecting bar 110 formed at the left end of the terminal positioning rib 109 of the above-mentioned S type discriminating tab 111S extends to the back surface 106a of the back surface case 106, and therefore, a small projecting bar 110L of the L type discriminating bar 111L is formed to be continuous from the back surface 106a of the back surface case 106 (refer to FIGS. 37 through 40).

The H type discriminating tab 111H applied to the high capacity battery pack 100H is such that the small projecting bars 110, 110L extending in opposite directions (front and back direction) to each other in the above-mentioned S type discriminating tab 111S and the L type discriminating 111L are not formed (refer to FIGS. 37 through 40).

The D type discriminating tab 111D applied to the dry cell pack 140 is such that the small projecting bars 110, 110L are not formed from the left end of the terminal positioning rib 109 as in the above-mentioned H type discriminating tab 111H, though a discriminating rib 141 extending in the right direction from the central portion of the terminal pressing rib 116 formed in the front surface case 105 is integrally formed (refer to FIGS. 37 through 40).

Next, the structures of respective blocking portions 19, and how the blocking portions 19 are combined with the above-mentioned respective discriminating tabs 111 will be explained.

Figure 37:
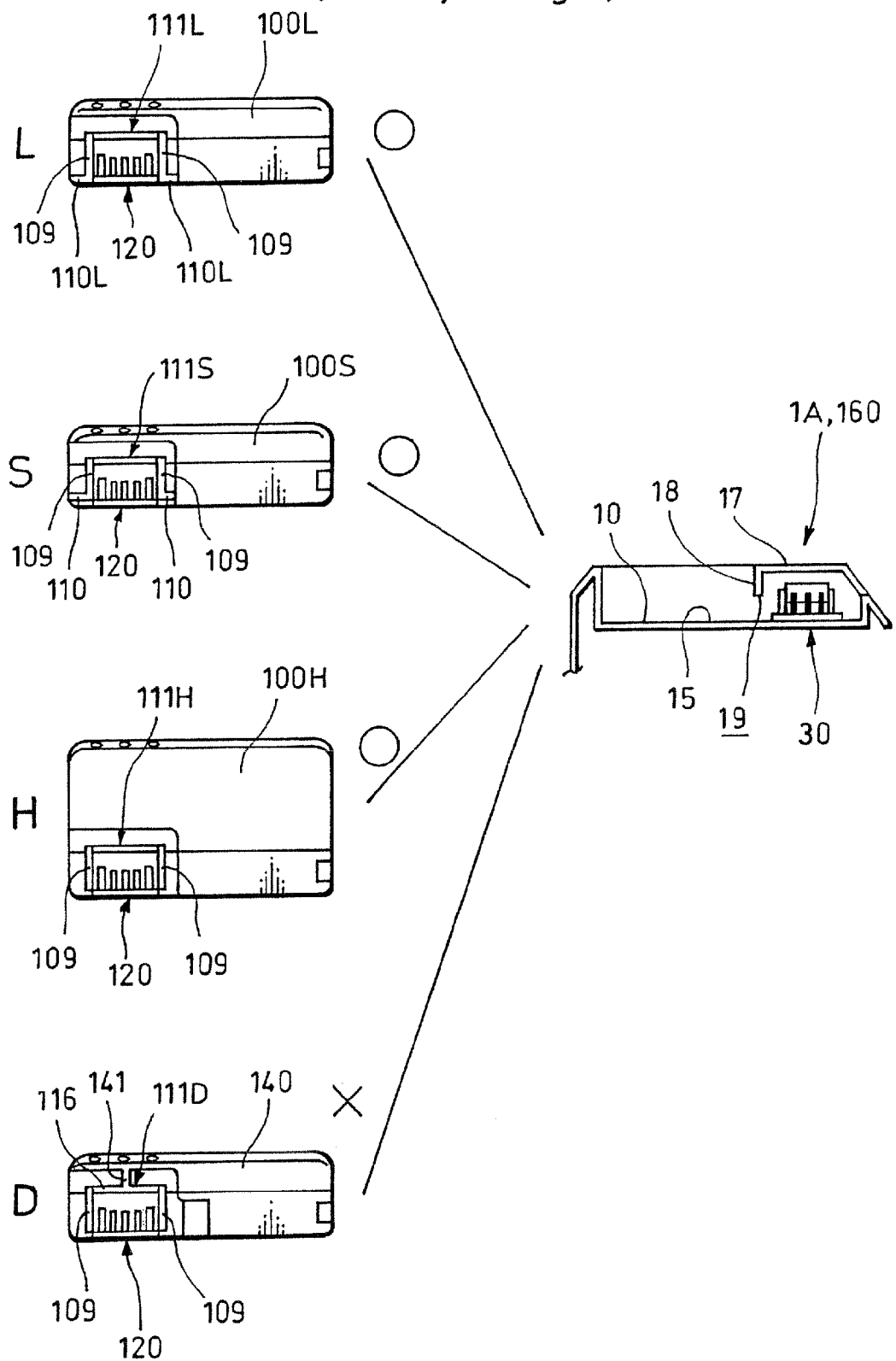
FIG. 37, together with FIGS. 38 to 40, is a diagram for explaining whether or not loading is permitted based on the combination of plural kinds of discriminating tabs and the blocking portions, and this figure shows the relations between a blocking portion type I and respective discriminating tabs.

First of all, a blocking portion type I of the main body side terminal 30 is applied to the video camera 1A (charge-complying-type 1A) in the above-mentioned embodiments, and comprised of the over-hang portion 17 formed in the upper frame body 13 of the main body side terminal 30 and the above-mentioned blocking projecting bar 18 formed to extend in the left direction from the back end of the over-hang portion 17 (refer to FIG. 37).

In such blocking portion type I, since the central portion of the over-hang portion 17 interferes with the discriminating rib 141 of the D type discriminating tab 111D, its loading is not permitted, though its loading is permitted in the cases of the other L, S and H discriminating tabs since the central portions of the eaves portions 17 thereof do not interfere with the discriminating tabs 111.

Therefore, the dry cell pack 140 is not capable of being loaded on the charge-complying-type video camera 1A to which the blocking portion type I is applied, and consequently, it is possible to prevent the trouble in which the dry cell pack 140 is erroneously charged. On the other hand, the battery packs 100L, 100S, 100H to which the other type discriminating tabs 111L, 111S, 111H are applied are capable of being loaded on the battery loading portion 10 regardless of capacity thereof being high or low (refer to FIG. 37).

Figure 38:
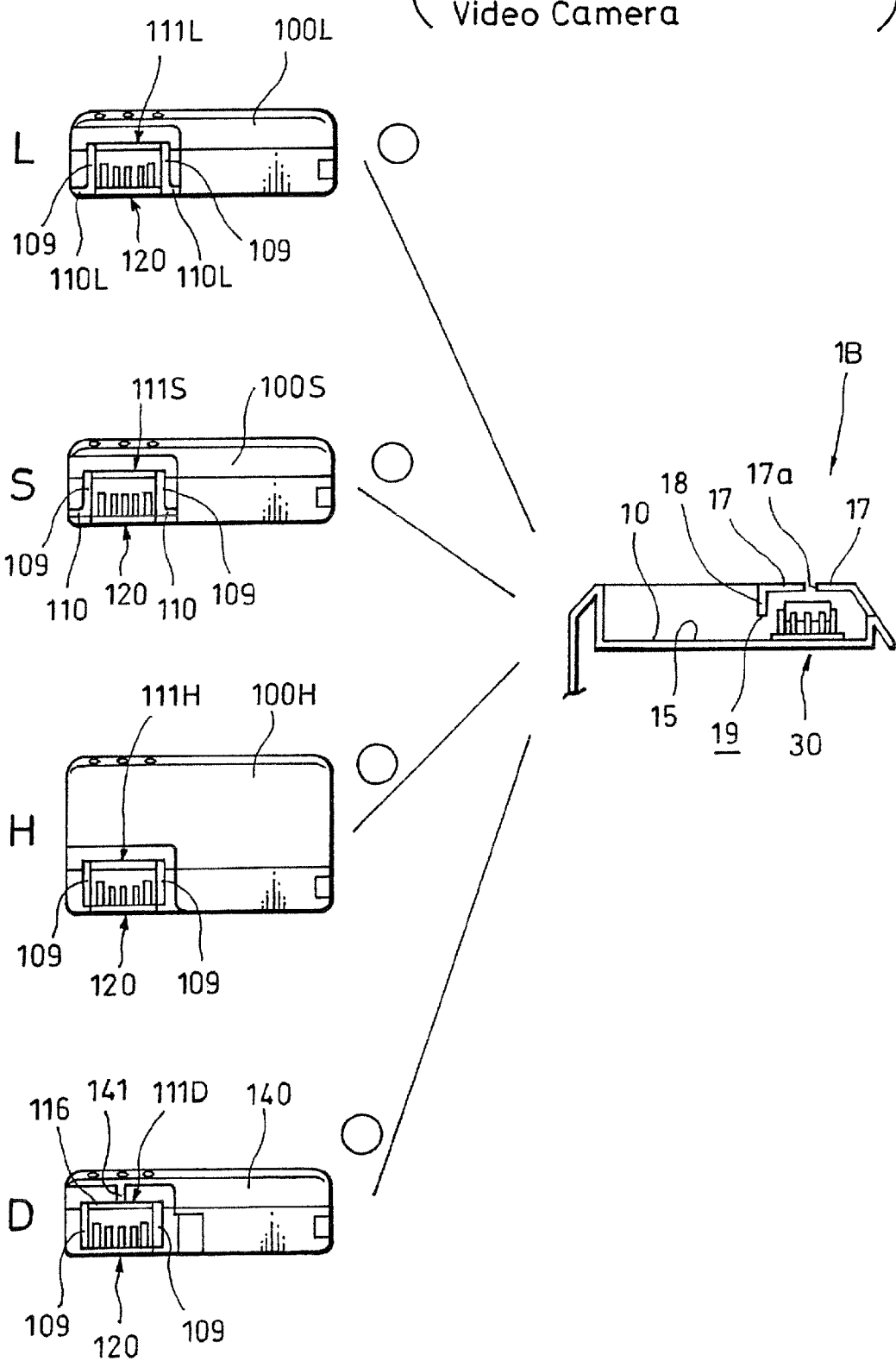
FIG. 38 is a diagram showing the relations between a blocking portion type II and the respective discriminating tabs.

In the blocking portion type II, a cutaway 17a is formed at the central portion of the over-hang portion 17, and as a result, since the over-hang portion 17 does not interfere with the discriminating tab 141, its loading is permitted, and at the same time, does not have any portion that interferes with the other type discriminating tabs 111S, 111L, 111H, loading of all the types of the discriminating tabs 111L, 111S, 111H are consequently permitted (refer to FIG. 38).

Therefore, all of the low capacity battery pack 100L, the standard capacity battery pack 100S, the high capacity battery pack 100H and the dry cell pack 140 are capable of being loaded on the video camera 1B of the charge-non-complying-type to which the blocking portion type II is applied (refer to FIG. 38).

In the blocking portion type III, one end portion of the blocking projecting bar 18 formed toward the bottom surface 15 (left direction) reaches the bottom surface 15 of the battery loading portion 10, and another blocking projecting bar 18 is integrally formed from the above-mentioned bottom surface 15 ahead of the blocking projecting bar 18. The interval between the two blocking projecting bars is formed to be approximately equal to the interval between the two terminal positioning ribs 109, 109 that are formed to sandwich the above-mentioned battery side terminal 120 from the front and back directions (refer to FIG. 39).

In such blocking portion type III, since the central portion of the over-hang portion 17 interferes with the discriminating tab 141 of the D type discriminating tab 111D, its loading is not permitted, and in the L type discriminating tab 111L and the S type discriminating tab 111S, since small projecting bars 110, 110L extending in opposite directions (front and back direction) to each other from the left ends of these terminal positioning ribs 109 interfere with the above-mentioned blocking projecting bars 18, 18, its loading is not permitted as well. And in the H type discriminating tab 111H, there is no portion to interfere with the blocking portion type III, so that its loading is therefore permitted (refer to FIG. 39).

Figure 39:
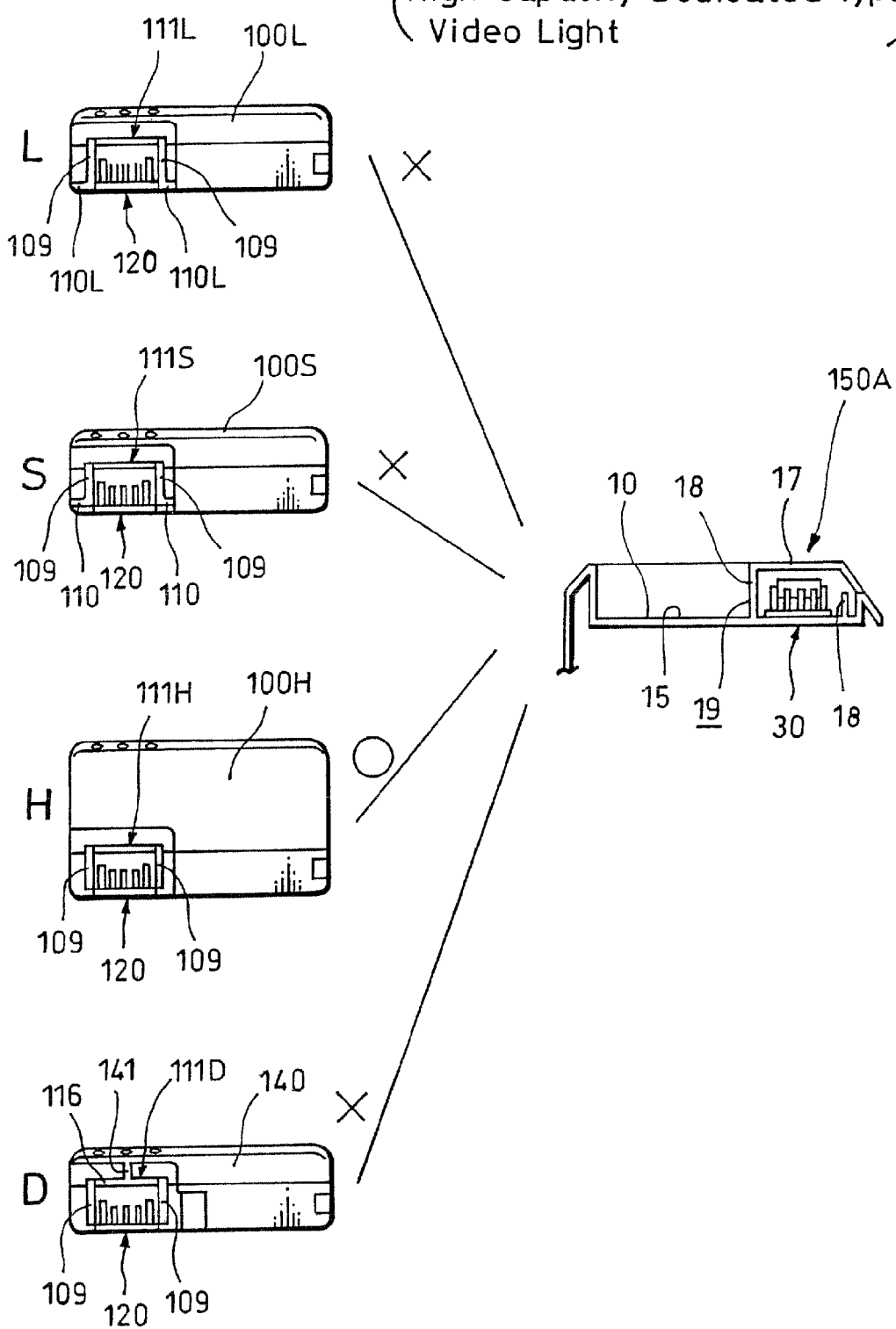
FIG. 39 is a diagram showing the relations between a blocking portion type III and the respective discriminating tabs.

Therefore the low capacity battery pack 100, the standard capacity battery pack 100S and the dry cell pack 140 are not capable of being loaded on the high capacity-dedicated video light 150A to which the blocking portion type III is applied, and only the high capacity-dedicated battery pack 100H is capable of being loaded on the high capacity-dedicated video light 150A (refer to FIG. 39).

In the blocking portion type IV, although the blocking projecting bar 18 formed toward the bottom surface (left direction) from the back end of the over-hang portion 17 as in the above-mentioned blocking portion type I does not reach the bottom surface 15 of the battery loading portion 10, the small projecting portion 18a is formed in the extended region thereof that contacts with the bottom surface 15 of the battery loading portion 10, and another small projecting portion 18a is integrally formed from the above-mentioned bottom surface 15 ahead of the small projecting portion 18a. Then the interval between the two small projecting portions 18a, 18a is formed to be approximately equal to the interval between the two terminal positioning ribs 109, 109 that are formed to sandwich the above-mentioned battery side terminal 120 from the front and back directions (refer to FIG. 40).

In such blocking portion type IV, since the central portion of the over-hang portion 17 interferes with the discriminating rib 141 of the D type discriminating tab 111D, its loading is not permitted, and in the L type discriminating 111L, since the small projecting bars 110L, 110L that extend in opposite directions (front and back direction) to each other from the left ends of the terminal positioning ribs 109, 109 interfere with the above-mentioned small projecting portions 18*a*, 18*a*, its loading is not permitted as well. Then, in the S type discriminating tab 111S, since the small projecting bars 110, 110 that extend in opposite directions (front and back direction) to each other from the terminal positioning ribs 109, 109 formed at the position slightly detached from the bottom surface 106*a* of the battery pack 100 so that there is no portion to interfere with the blocking portion type its loading is, therefore, permitted. In addition, as for the H type discriminating tab 111H, since there is no portion to interfere with the blocking portion type IV, its loading is, therefore, permitted as well (refer to FIG. 40).

Figure 40:
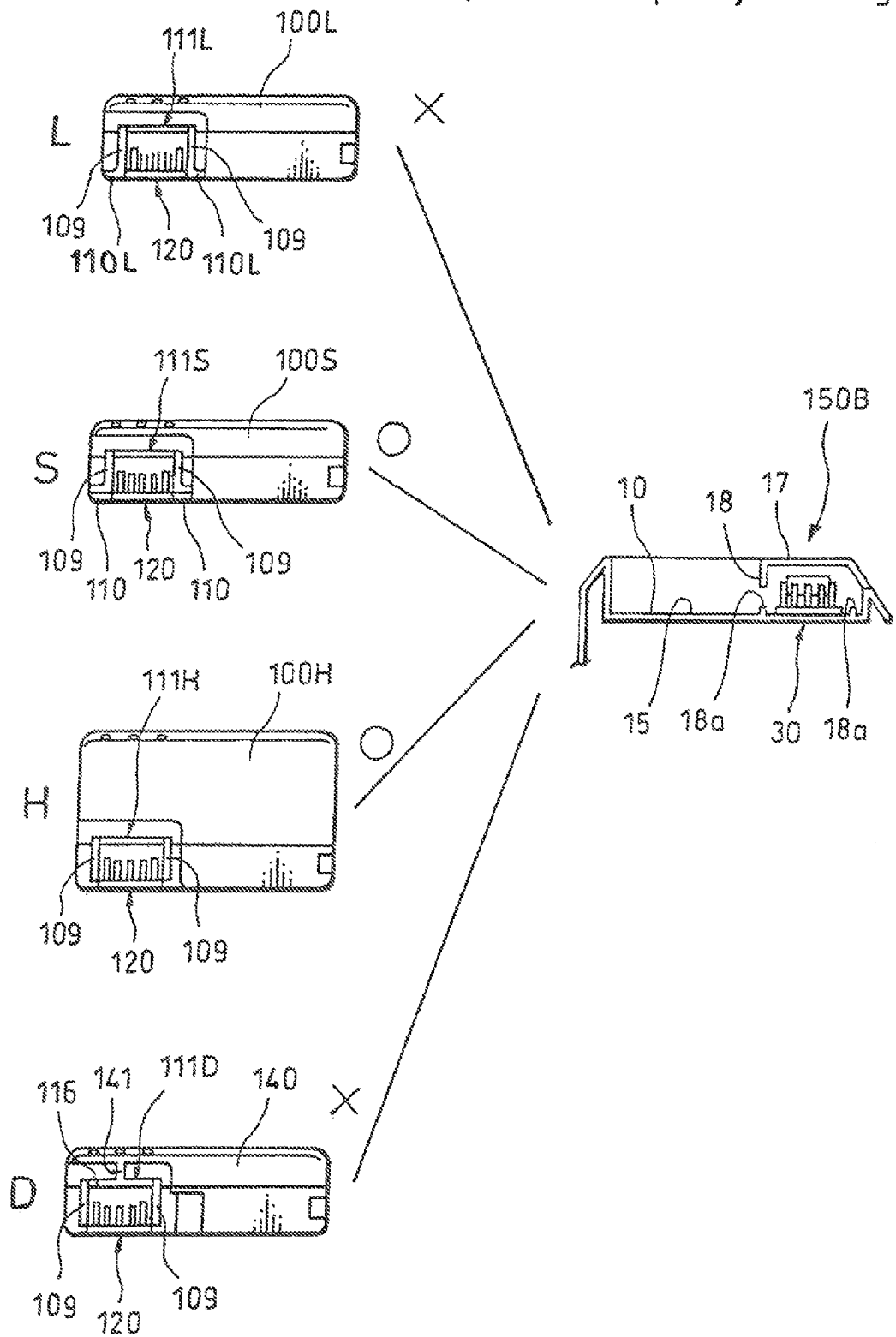
FIG. 40 is a diagram showing the relations between a blocking portion type IV and the respective discriminating tabs.

Therefore, the low capacity battery pack 100L and the dry cell pack 140 are not loaded on the non-low capacity video light 150B though the standard capacity battery pack 100S and the high capacity battery pack 100S are capable of being loaded thereon (refer to FIG. 40).

Meanwhile, although not shown in the figures, in the vicinity of the small projecting portion 18*a* of the blocking portion type IV is disposed a detection switch to detect the presence of the small projecting bar 110 of the S type discriminating tab 111S and to thereby judge whether it is the S type discriminating tab 111S or the L type discriminating tab 111L.

Then the above-mentioned non-low capacity video light 150B is provided with two electric bulbs, and when the high capacity battery pack 100H is loaded, two electric bulbs light up while one electric bulb does so when the standard capacity battery pack 100S is loaded.

In this manner, by respectively providing the discriminating tab 111 and the blocking portion 19 in the vicinity of the battery side terminal 120 and the main body side terminal 30, it is possible to judge whether or not its loading is permitted before the battery side terminal 120 and the main body side terminal 30 are connected, with the result that to connect both the terminals is surely avoided in the case of "NO". Namely, even in the case of erroneous loading, since the above-mentioned discriminating tab and the blocking portion are provided in the vicinity of both the terminals 120 and 30, the connection between both the terminals 120 and 30 can be avoided, and therefore, contact between the terminal member 122 and the terminal piece 31 can be avoided.

In addition, the forms of the above-mentioned discriminating tab 111 and the blocking portion 19 and the positions where they are formed are illustrated as examples. Without being restricted to the illustrations, the discriminating tab 111 and the blocking portion 19 may be provided in the vicinity of the battery side terminal 120 and the blocking portion 19, and further, it should be noted that these forms and positions are not restricted to the battery pack 100, the dry cell pack 140, the video camera 1 (1A, 1B), the video light 150 and the battery charger 160, but that various kinds thereof can be considered.

Figure 41:
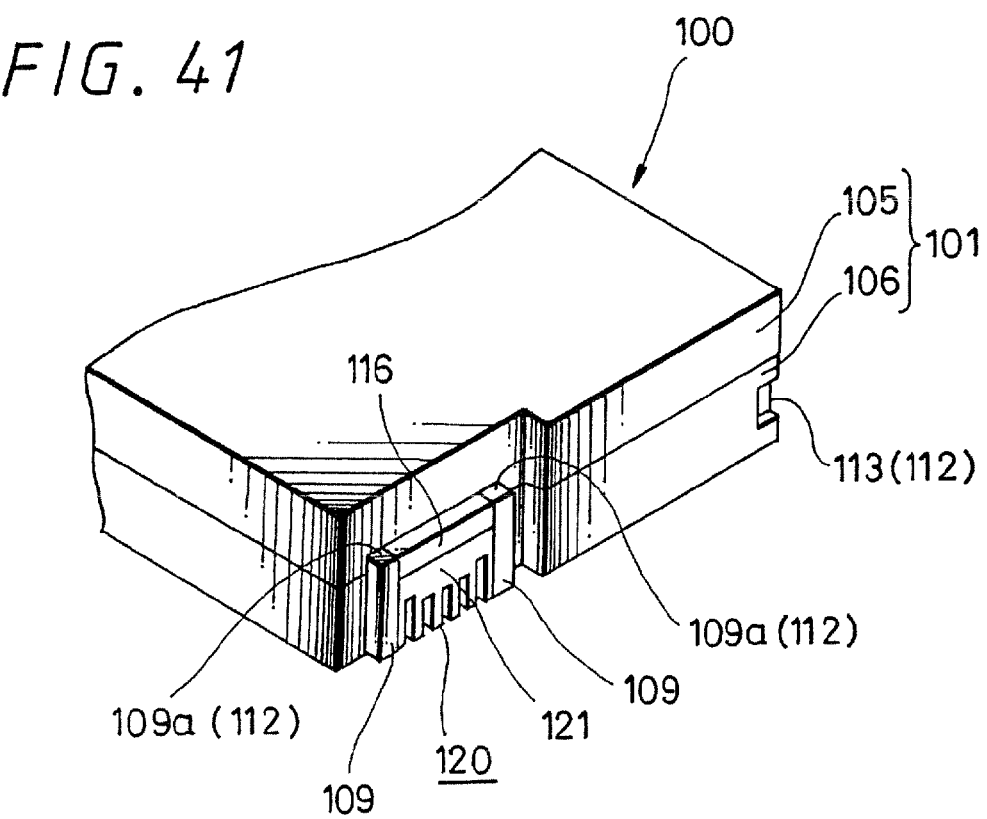
FIG. 41 is a perspective view of an essential portion showing a deformation example of a portion-to-be-locked in the battery pack.

Meanwhile, in the above-mentioned embodiments, a recess portion is formed in the portion where the battery side terminal is disposed and only in its surroundings, and the battery terminal as well as the portion-to-be-locked are provided in the recess portion, though the present invention, being not restricted to this, may provide a stepped difference shown in FIG. 41 between the side (front side in the above-mentioned embodiment) where the battery side terminal of the battery case is disposed and another side (back side in the above-mentioned embodiment) to thereby provide the battery side terminal and the portion-to-be-locked on the recessed front side.

Figure 42:
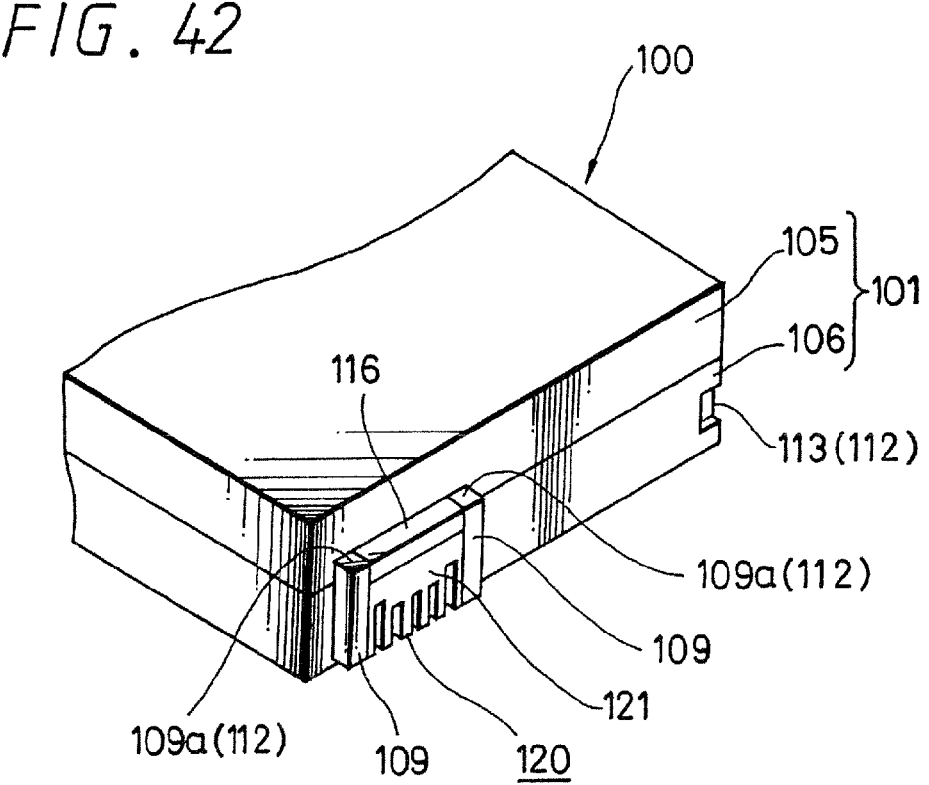
FIG. 42 is a perspective view of an essential portion showing another deformation example of the portion-to-be-locked in the battery pack.

In addition, as shown in FIG. 42, only the battery side terminal and the portion-to-be-locked provided next thereto may project from the surface of the battery case.

Figure 43:
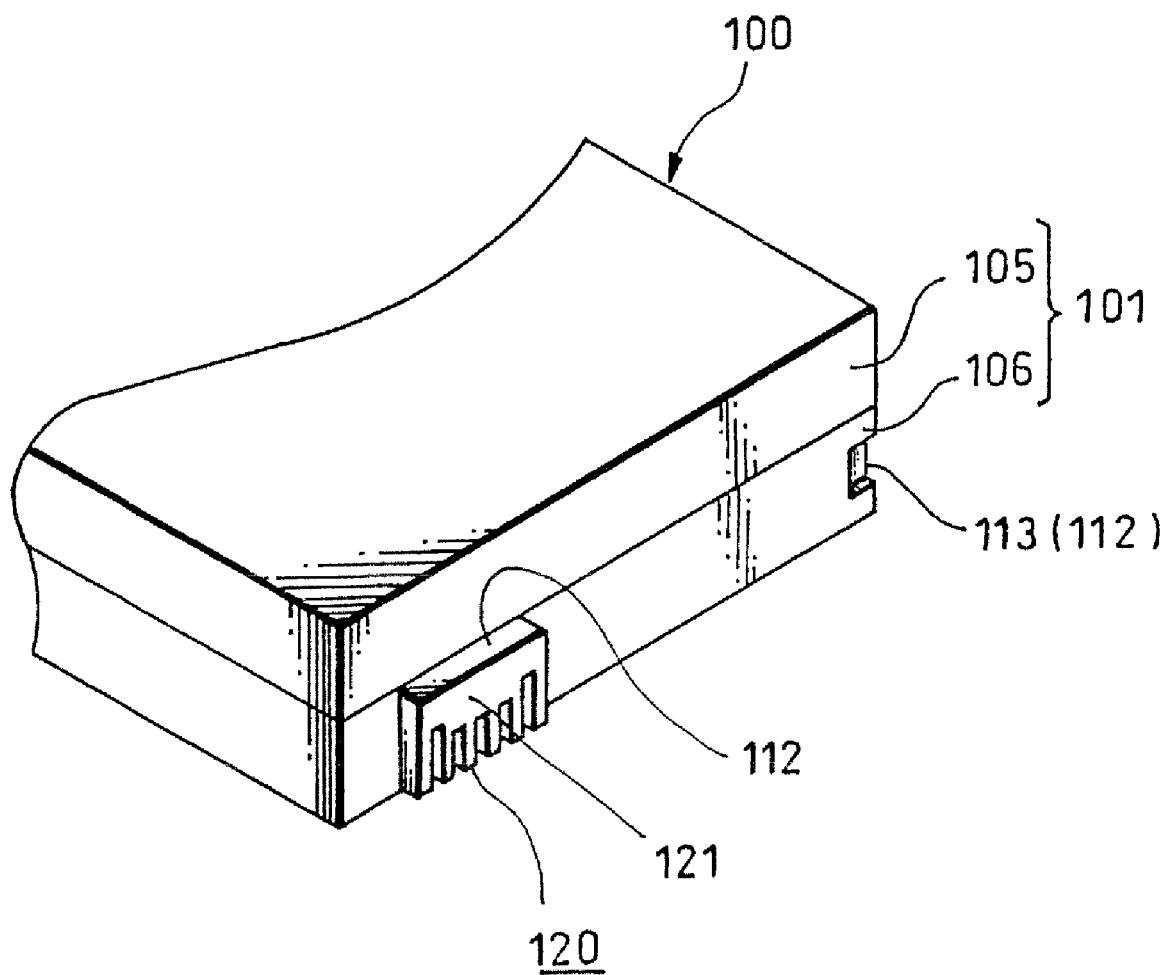
FIG. 43 is a perspective view of an essential portion showing another deformation example of the portion-to-be-locked in the battery pack.

Further, as shown in FIG. 43, only the battery side terminal, that is, terminal case may be provided on the surface of the battery case to thereby project therefrom, and a part of the terminal case may be made the portion-to-be-locked. In addition, in this case, concave and convex engaging portions may be provided in the terminal case to thereby serve as the discriminating tab to determine whether or not loading is permitted.

As apparent from the above-descriptions, the method for preventing erroneous loading of the component-to-be-loaded on the main body side apparatus of the present invention is characterized in that the main body side apparatus has the main body side terminal, the component-to-be-loaded has the component-to-be-loaded side terminal that joins with the above-mentioned main body side terminal, the discriminating tab is provided in the vicinity of the component-to-be-loaded side terminal of the component-to-be-loaded, the blocking portion corresponding to the above-mentioned discriminating tab is provided in the vicinity of the main body side terminal of the main body side apparatus to determine whether or not its loading is permitted based on the combination of the concave and convex engagement, and when loading is not permitted due to the interference between the blocking portion and the above-mentioned discriminating tab, the electric connection between the main body side terminal and the component-to-be-loaded side terminal is not to be established.

In addition, the component-to-be-loaded of the present invention is characterized in that it has the component-to-be-loaded side terminal to join with the main body side terminal provided on the main body side apparatus, the discriminating tab corresponding to the blocking portion provided in the vicinity of the main body side terminal of the main body side apparatus is provided in the vicinity of the component-to-be-loaded side terminal to determine whether or not its loading is permitted, and when loading of the component-to-be-loaded on the main body side apparatus is not permitted due to the interference between the blocking portion and the above-mentioned discriminating tab, the electric connection between the main body side terminal and the component-to-be-loaded side terminal is not to be established.

Therefore, in the method for preventing erroneous loading of the component-to-be-loaded on the main body side apparatus of the present invention, and the component-to-be-loaded used therefor, even when the component-to-be-loaded that can not be fundamentally loaded is loaded on the main body side terminal, since the discriminating tab and the blocking portion are provided in the vicinity of the terminals, it is possible to prevent at least the contact between the terminals so that the electric disturbance can be surely prevented.

In the present invention, the locking portion is provided in the vicinity of the main body side terminal, and the portion-to-be-locked is provided in the vicinity of the component-to-be-loaded side terminal. After the locking portion and the portion-to-be-locked are locked with each other, since the region on the opposite side of the above-mentioned component-to-be-loaded side terminal of the component-to-be-loaded is rotated so that the component-to-be-loaded is loaded on the main body side apparatus, the loading state of the component-to-be-loaded on the main body side apparatus is such that it is possible to prevent play in the vicinity of both the terminals and to maintain the stable state of contact between the terminals.

In the present invention, since the lock mechanism is provided on the opposite side of the above-mentioned locking portion and the portion-to-be-locked to maintain the state in which the component-to-be-loaded is loaded on the main body side apparatus, it is possible to secure the stable loading state of the component-to-be-loaded and to make it easy to load and unload the component-to-be-loaded.

In the present invention, since the above-mentioned component-to-be-loaded side terminal is provided shifted in one direction, a space can be formed in the portion that is on the opposite side of the component-to-be-loaded side terminal, and can house electronic parts such as IC and the like, thereby making it possible to implement the efficiency of the space.

In addition, FIGS. 44 through 52 show the embodiments of the battery pack according to the present invention. In explaining about FIG. 44 through FIG. 52, the battery pack 201 comprises a rectangular-like battery case 202, a battery cell 203 housed in the battery case 202, a substrate 205 with an IC chip 204 being mounted thereon for computing and storing the remaining amount of the battery pack 201 and a battery terminal 206 exposed from one end surface (front end surface) in the longitudinal direction of the battery case attached on the substrate 205 (refer to FIG. 47).

In addition, the U direction, D direction, L direction, R direction, F direction and B direction that are shown in the respective figures denote respectively the upper, lower, left, right, front, and back, directions. Further, the above-mentioned directionality shown in this specification is used for convenience's sake, and depending on the state of how the battery pack 201 is used, its directionality is properly changed.

The battery case 202 is comprised of an upper surface case 207 and a lower surface case 208, and there is formed a rectangular cutaway 209 that is a front end surface of the lower surface case 208 and opens to the position shifted in the left direction from the central portion of the left and right direction and the front end portion of the lower surface of the lower surface continuous from the position, with the above-mentioned battery terminal 206 being slid from the upper direction and attached to the rectangular cutaway 209. The front surface of the battery terminal attached to the rectangular cutaway 209 becomes approximately flush with the lower surface case 208 (refer to FIG. 48).

In addition; the lower corner portion of the right side surface of the lower surface case 208 is cross-sectionally formed into an L like cutaway, and an erroneous loading prevention groove 210 extending in the longitudinal direction is formed along the whole length thereof. As a result, in the inner space of the lower surface case 208, there is formed a stepped difference portion in the region corresponding to the erroneous loading prevention groove 210, with the dimension in left and right width of the upper side half becoming slightly wider than that of the lower side half, and the above-mentioned upper surface case 207 being formed to be equal to the left and right width of the upper side half of the lower surface case (refer to FIG. 51).

Figure 46:
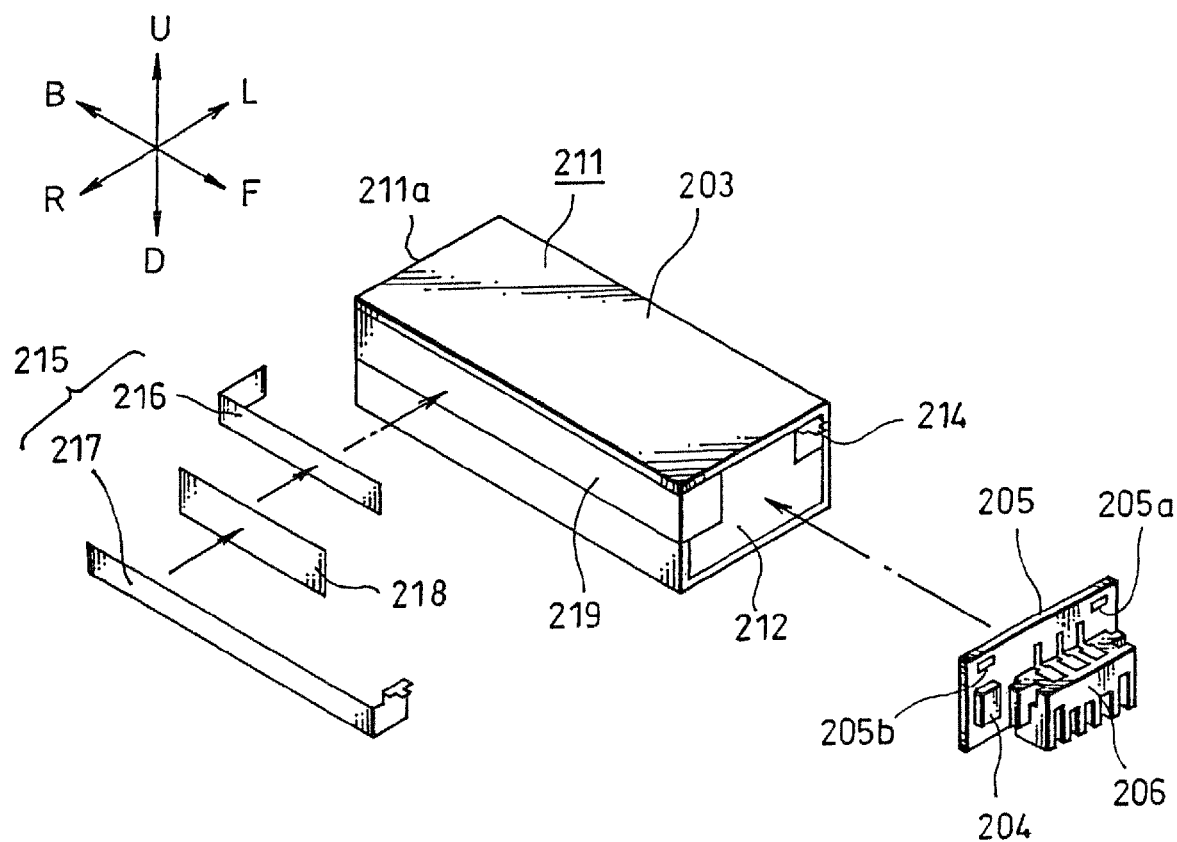
FIG. 46 shows the appearance of how the substrate is soldered to a battery cell.

The battery cell 203 is comprised of a battery can 211 one size smaller than the above-mentioned battery case 202 with one end surface thereof in the longitudinal direction having an opening, a battery lid 212 attached to the opening to cover it and a battery element, not shown, housed in the battery can 211 and the like (refer to FIG. 46).

In addition, the left and right width dimension of the battery cell 203 is slightly smaller than the left and right width of the lower side half so that, when the battery cell 203 is housed in the battery case 202, there is formed a space (hereinafter, referred to as [negative pole side tab disposition space ]) 213 at the upper side of the right side surface in the battery case 202 (refer to FIG. 51).

A positive pole side tab 214 is provided on the battery lid 212, and after being passed through a land aperture 205a on the left side of the above-mentioned substrate 205 the positive pole side tab 214 is soldered (refer to FIG. 46).

Figure 47:
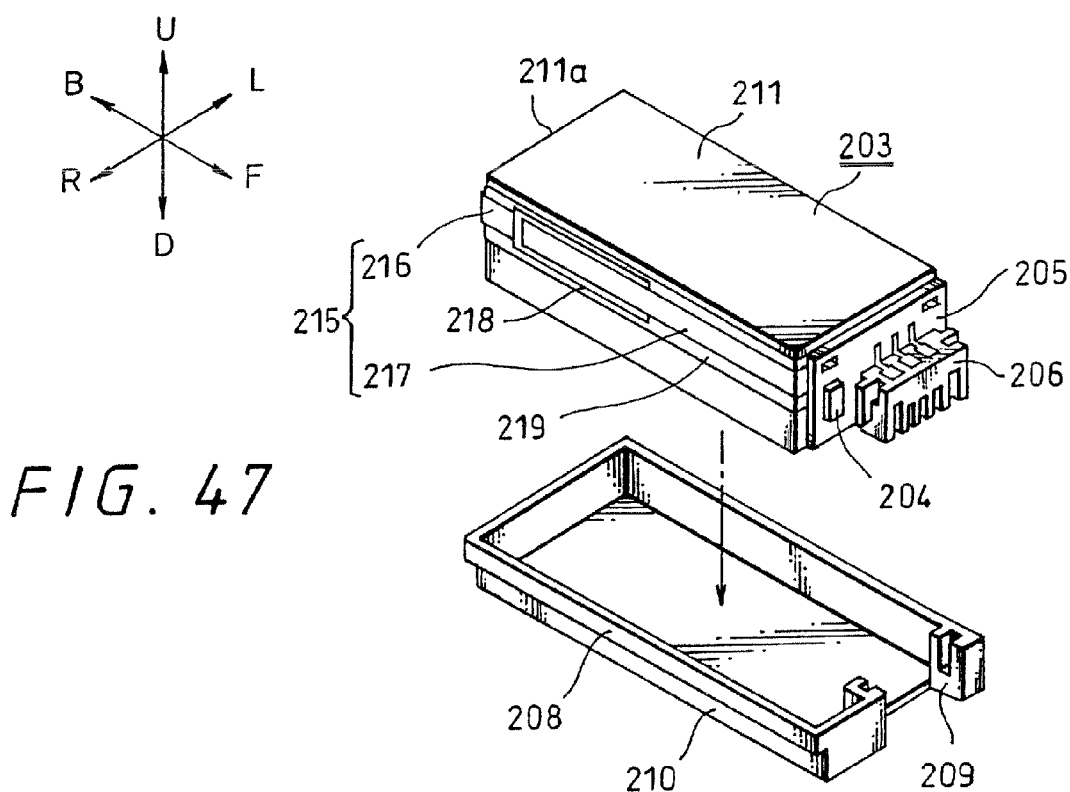
FIG. 47 shows the appearance of how the battery cell is housed in a lower surface case.
Figure 48:
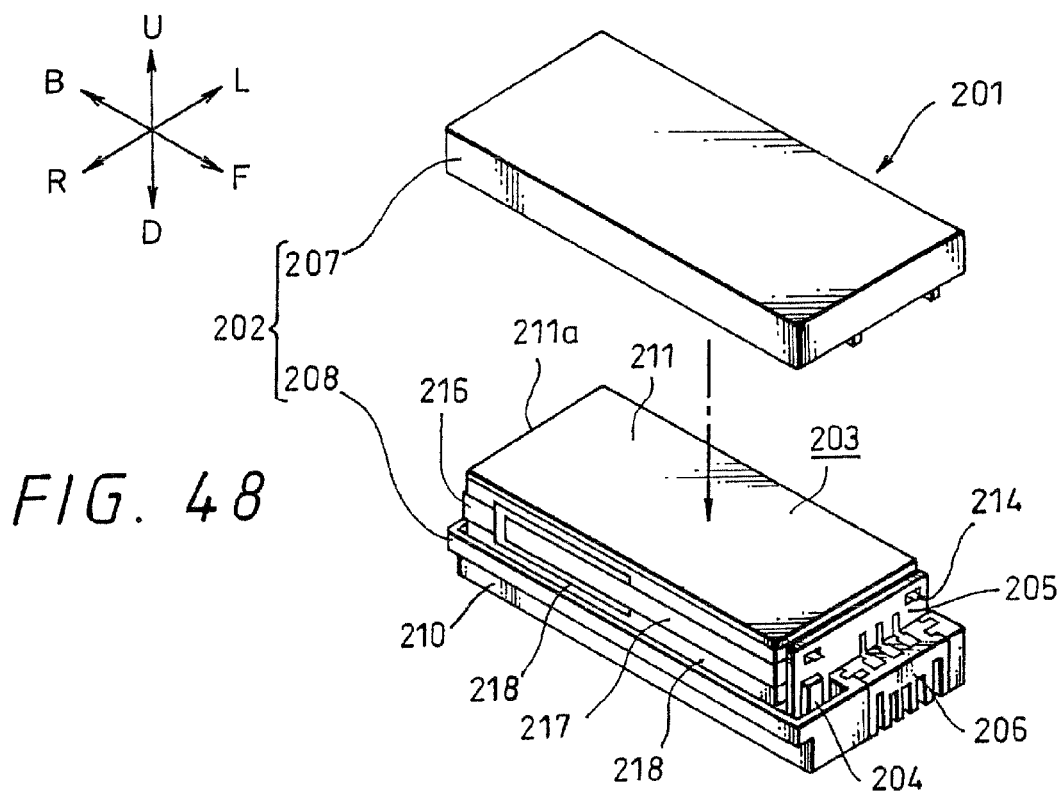
FIG. 48 shows the appearance of how an upper surface case is made to join with the lower surface case.

One end of a negative pole side tab 215 is welded on a can bottom 211a of the battery can 211, and the other end of the negative pole side tab 215 is extended to the front surface side of the above-mentioned battery lid 22 and soldered after being passed through a land aperture 205b on the right side of the substrate 205 (refer to FIGS. 46 and 47).

To be concrete, the negative pole side tab 215 is divided into two of a can bottom side tab 216 and a battery lid side tab 217 with a PTC (Positive temperature coefficient) 218 lying between these can bottom side tab 216 and battery lid side tab 17 (refer to FIG. 46). As a result; the electric connection between the can bottom side tab 216 and the battery lid side tab 217 is to be cut off when the battery cell 203 reached a predetermined temperature.

In addition, an isolation sheet 219 is disposed between the portion to which the negative pole side tab 215 is extended and the battery cab 211 so that insulation between the battery can 211 and the negative pole side tab 217, particularly, the battery lid side tab 217 is established (refer to FIGS. 46 and 47).

Figure 51:
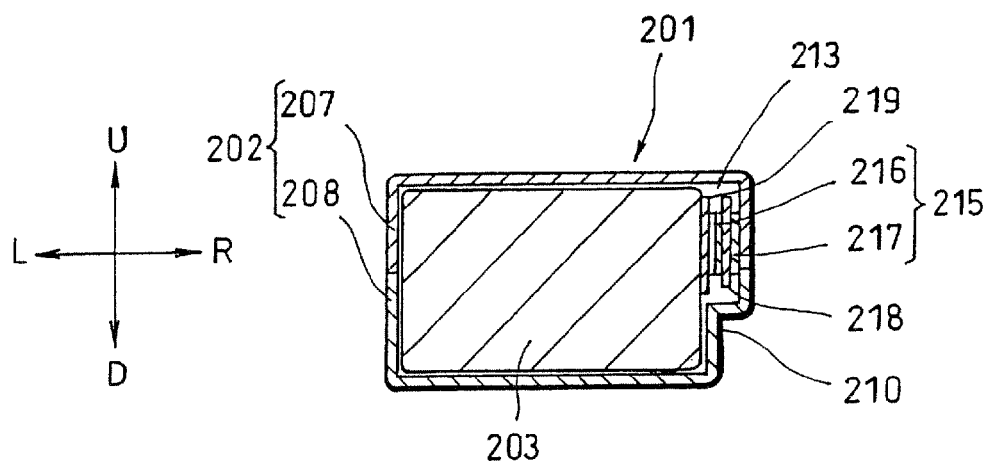
FIG. 51 is a longitudinal cross-sectional view of the battery pack.

Further, the portions (can bottom side tab 216, PTC 218, battery lid side tab 217) that are extended to the substrate of the negative pole side tab 215 are positioned in the upper side half of the right side surface of the battery cell 203, with the result that these can bottom side tab 216, PTC 218, and battery lid side tab 217 are positioned in the above-mentioned negative pole side disposition space 213 (refer to FIG. 51).

Further, the combination in which the upper surface case 207 is joined with the lower surface case 208 to cover the battery cell 203 is performed by ultrasonic welding with peripheral edges of the two in the state of being joined with each other, though not shown in the figures. Meanwhile, bonding with adhesive material may be performed instead of ultrasonic welding.

Figure 44:
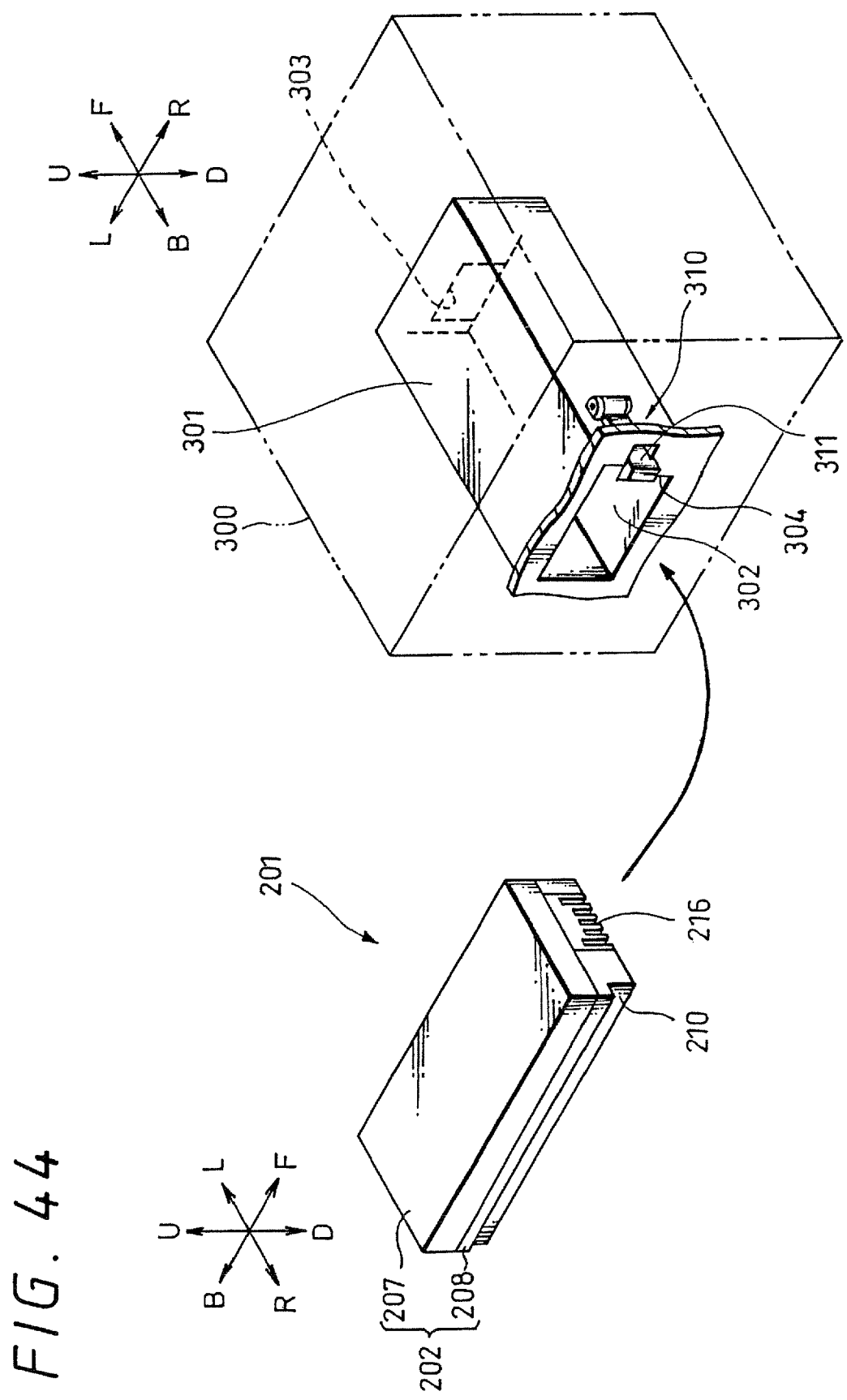
FIG. 44 is a perspective view of the battery pack of the present invention showing the state of the battery pack immediately before it is loaded on the battery loading portion of an electronic apparatus.
Figure 45:
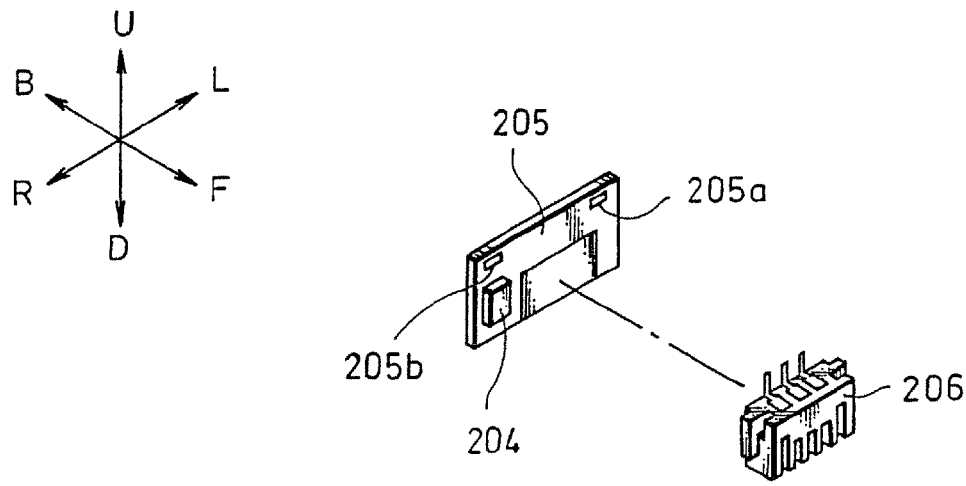
FIG. 45, together with FIGS. 46 through 48, is a perspective view of the battery pack for sequentially explaining the assembling thereof, and this figure shows the appearance of how the battery side terminal is attached to a substrate.

Therefore, there can be assembled the battery pack 201 housing one battery cell 203 in the battery case 202 in which the battery terminal 206 is formed on the front end surface, and the erroneous loading prevention groove 210 having L like cross-section is formed at the lower corner portion of the right side surface (refer to FIG. 44).

Next, electronic apparatuses having a battery loading portion on which the above-mentioned battery pack 201 is loaded will be explained. Meanwhile, any kinds of the electronic apparatuses may be suitable, for example, such as a digital still camera, video camera, personal computer and the like. The present invention is generally applied to the electronic apparatuses called a mobile apparatus and a handy apparatus that are put to use by battery driving.

An electronic apparatus 300 is provided with a casing 301 that has a space of approximately the same size as that of the above-mentioned battery pack 201 and an opening in the back direction, and a lock member 310 disposed on the edge of the back surface opening for stopping the loaded battery pack 201 from coming off with the inner portion of the above-mentioned casing 301 serving as a battery loading portion 302 (refer to FIG. 44).

On the depth end surface (front end surface) of the battery loading portion 302 of the casing 301 is provided a main body side terminal 303 corresponding to the above-mentioned battery terminal 206 of the battery pack 201 (refer to FIG. 44).

Figure 49:
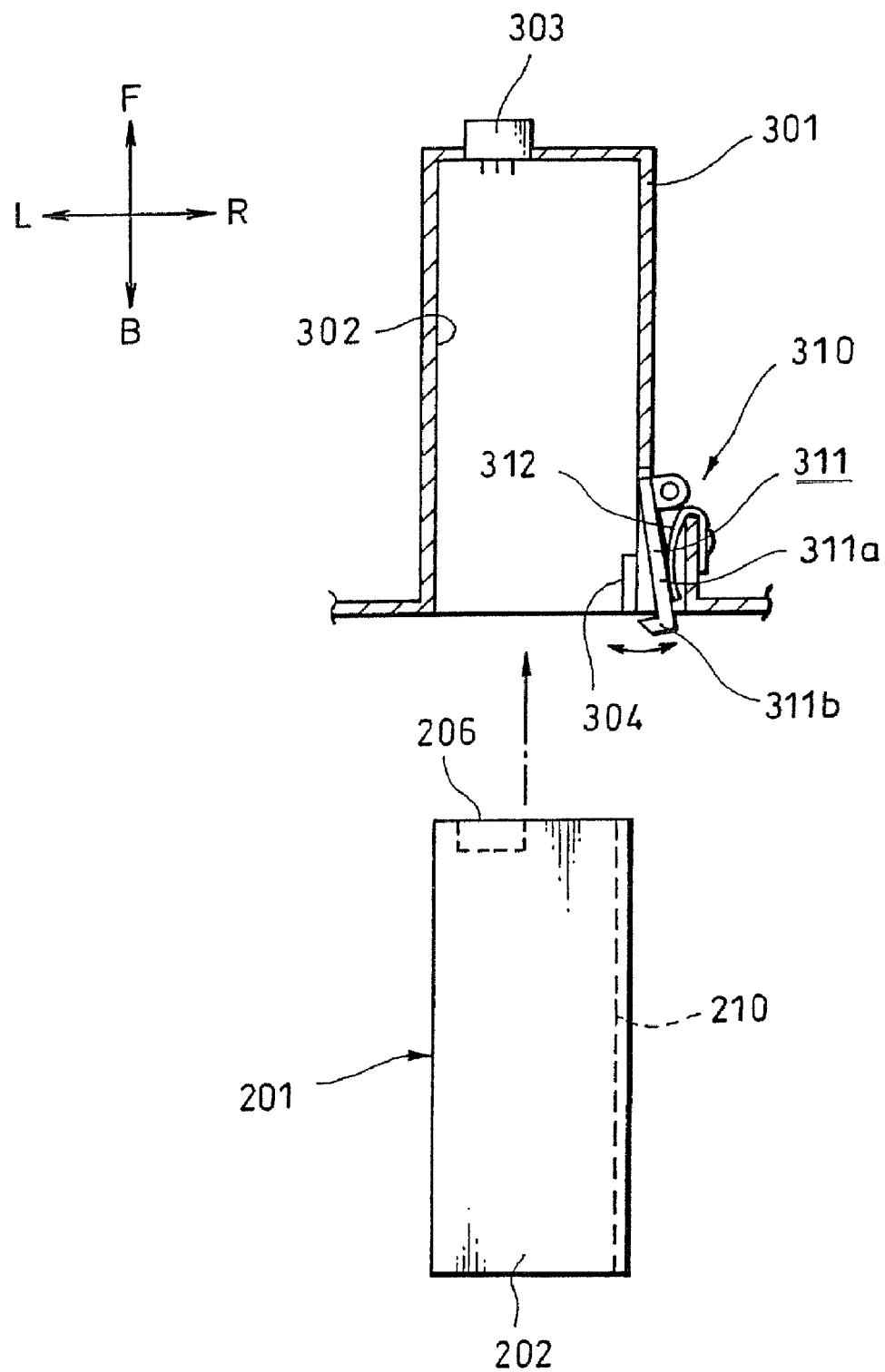
FIG. 49 is a horizontal cross-sectional view of the electronic apparatus showing the appearance of how it has been loaded, and this figure shows the state before the electronic apparatus is loaded.
Figure 50:
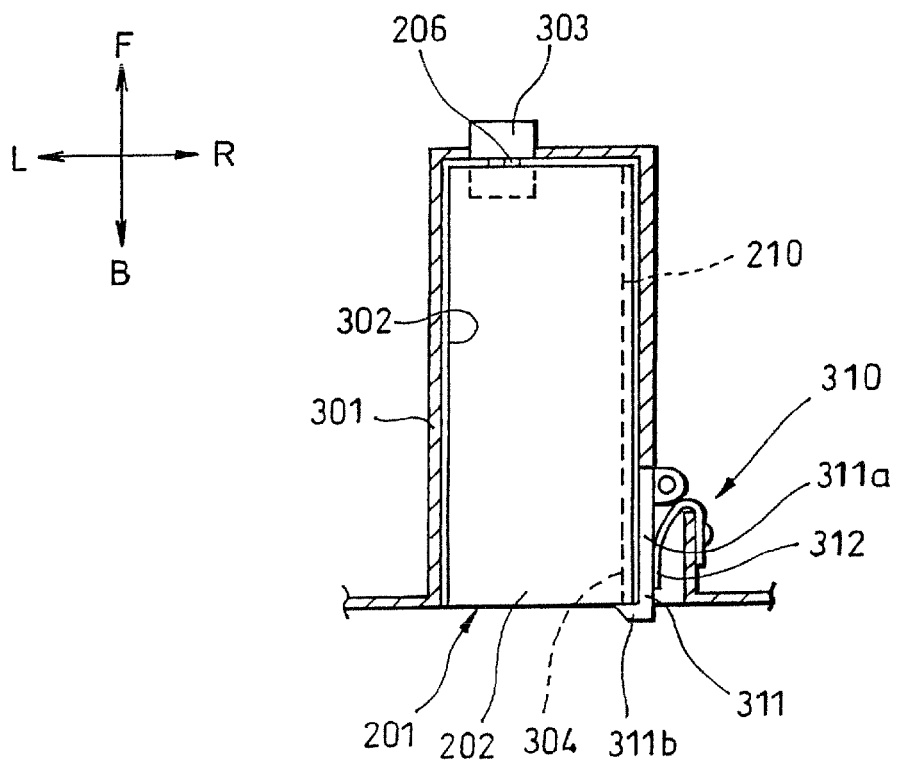
FIG. 50 shows the state in which the electronic apparatus is loaded.

In the lower right portion of the back surface opening of the casing 301, there is provided a blocking projecting portion 304 that is formed approximately equivalent to or slightly smaller than the cross-sectional form of the erroneous loading prevention groove 210 of the above-mentioned battery pack 201 (refer to FIGS. 49, 50, and 51).

As a result, when the battery pack 201 is loaded on the battery loading portion 302 in the regular orientation, the above-mentioned blocking projecting portion 304 is positioned in the erroneous loading prevention groove 210 of the battery pack 201 to thereby permit the battery pack 201 to be slide-inserted in the battery loading portion 302 (refer to FIGS. 51 and 52(*a*)).

The lock member 310 is comprised of an L like lock lever 311 seen from the flat surface and a urging means 312 for urging the lock lever 311 toward the locking direction (refer to FIGS. 49 and 50).

To be concrete, the lock lever 311 comprises a long arm piece 311*a* that is part of the opening side of the right side surface of the casing 301 and a short arm piece 311*b* provided to project leftward from the back edge thereof with the front end portion of the long arm piece 311*a* being rotatably supported to the casing 301 by a rotation shaft extending in the up and down direction (refer to FIGS. 49 and 50).

A sheet metal member is bent and folded into a U like shape to form the above-mentioned urging means 312, and the urging means 312 has one piece thereof fixed to the member of the above-mentioned casing 301 side and the other piece elastically contact with the right surface of the long arm piece 311*a* of the above-mentioned lock lever 311, with the result that the lock lever 311 is urged to rotate in the opposite direction to the clockwise direction in the FIGS. 49 and 50.

In addition, the lock lever 311 that is urged to rotate is blocked from rotating by a rotation blocking means, not shown, and in its state of being blocked, the short arm piece 311*b* of the lock lever 311 covers one part of the back surface opening of the casing 301 (refer to FIG. 50).

Therefore, in order to load the battery pack 201 on the battery loading portion 302 of the electronic apparatus 300, the above-mentioned lock lever 311 is to be urged in the clockwise direction against the urging means 312 to thereby let the short arm piece 311*b* shelter from the back surface opening of the battery loading portion 302 (refer to FIG. 49), and then the battery pack 201 is slide-inserted into the battery loading portion 302.

At this time, as mentioned above, in the case where the battery pack 201 is in the regular orientation (refer to FIG. 52 (*a*)), that is, in orientation in which the erroneous loading prevention groove 210 is positioned at the lower right corner, the above-mentioned blocking projecting portion 304 is positioned in the erroneous loading prevention groove 210 to thereby permit to slide-insert the battery pack 201. In addition, when the battery pack slides into the depth end portion of the battery loading portion 302, the battery terminal 206 is connected with the main body side terminal 303, and the lock lever 311 is rotated in the opposite direction to the clockwise direction with its short arm piece 311*b* being locked by the back end surface of the battery pack 201 so that the battery pack 201 is to be prevented from coming off from the battery loading portion (refer to FIG. 50).

In addition, when the battery pack 201 is not in the regular orientation, the blocking portion 304 of the above-mentioned battery loading portion 302 interferes with the battery pack 201 to thereby prevent its insertion (refer to FIGS. 52 (*b*), (*c*), and (*d*)).

Namely, for example, in the case where the orientation of the battery pack 201 is right in the front and back direction but is upside down (refer to FIG. 52 (*b*)), since there exists no erroneous loading prevention groove 210 at the lower right corner portion of the battery pack 201, the blocking projecting portion 304 of the battery loading portion 302 interferes with the lower right corner portion so that it is impossible to insert the battery pack 201 into the battery loading portion 302.

Further, in the case where the orientation of the battery case 201 is right in the up and down direction but is reversed in the front and back direction (refer to FIG. 52(*c*)) or is revered both in the up and down direction and the front and back direction, (refer to FIG. 52 (*d*)), since there exists no erroneous loading prevention groove 210 at the lower right corner portion of the battery pack 201, the blocking projecting portion 304 of the battery loading portion 302 interferes with its lower right corner portion so that it is impossible to insert the battery pack 201 into the battery loading portion 302.

In this manner, when the battery pack 201 is not in the regular orientation, since the battery pack 201 is blocked by the blocking projecting portion 304 covering part of the back surface opening of the battery loading portion 302, it is impossible to insert the battery pack 201 even slightly into the battery loading portion 304, which leads to the immediate recognition by the operator that the battery pack 201 he is about to load is in wrong orientation. As a result, even when the battery pack 201 is capable of being slightly inserted into the battery loading portion 304, it is possible to prevent the operator from forcedly loading the battery pack thinking the orientation of the battery pack is right.

In addition, in the battery pack 201 relating to the above-mentioned embodiments, it has been explained that the square-pole-like battery cell 203 is housed in the square-pole-like battery case 202, but the present invention is not limited thereto, which means that a circular cylinder-like battery cell may be housed in the square-pole-like battery case 201. In short, as far as the battery case is approximately square-pole-like, the present invention can be applied thereto.

Further, in the battery pack 201 relating to the above-mentioned embodiments, it has been explained that the erroneous loading prevention groove 210 is formed all along the whole length of the sliding direction of the battery case 202, but the present invention is not limited thereto, which means that an erroneous loading prevention groove that reaches the inserting side end surface may be formed, though the length of the sliding direction doesn't need the whole length thereof. In this case, when the battery pack is erroneously loaded, the blocking projecting portion of the electronic apparatus side to prevent the loading may be formed at the position shifted toward the depth end portion of the battery loading portion 302.

Furthermore, in the battery pack 201 relating to the above-mentioned embodiments, it has been explained that the erroneous loading prevention groove 210 is formed at the corner portion of the battery case 201, but the present invention is not limited thereto, which means that the erroneous loading prevention groove 210 may be formed on the side surface of the battery case 201. In this case, by forming an erroneous loading prevention groove at the position shifted to one end side from the central portion in the width direction of the side surface on which the erroneous loading prevention groove is formed, even when a battery pack is about to be loaded in reversed orientation in both the up and down as well as front and back directions, erroneous loading of the battery pack can be prevented.

As apparent from what have been described, the battery pack according to the present invention is a battery pack that is loaded on an electronic apparatus by being slid toward the electronic apparatus having a battery loading portion, and is characterized by having a approximately square-pole-like battery case and a battery terminal provided on one end surface in the slide direction, and forming an erroneous loading prevention groove extending in the sliding direction on one part of one side surface other than the both end surfaces in the sliding direction of the battery case.

Therefore, according the battery pack of the present invention, since the form seen from the sliding direction is not symmetry at multiple points, by taking advantage of this, it is possible to specify a unique orientation with regard to the battery loading portion on the side of the electronic apparatus.

As a result, when the battery pack is in different orientation from the regular orientation, it can not be inserted into the battery loading portion, so that it is possible to prevent the battery pack from being erroneously loaded.

In addition, since the battery terminal is loaded on the battery loading portion in the regular orientation, it is possible to prevent the trouble in which both the terminal on the side of the electronic apparatus and the wrong terminal contact with each other.

Further, in the present invention, since the form of the battery cell to be housed in the battery case is made square-pole-like, there is no spatial waste relative to the square-pole-like battery case, thereby making it possible to offer the battery pack with large capacity in spite of the whole size.

In the present invention, since the above-mentioned erroneous loading prevention groove is formed at the corner portion extending in the sliding direction of the battery case, there can be formed a predetermined space between the battery case and the battery cell, and the space can serve as a space in which the negative pole side tab extended around the battery cell can be disposed, with the result that spatial efficiency can be obtained.

In the present invention, since the negative pole Side tab extended from the can bottom of the battery can of the battery cell is disposed at the position that is on the side surface side where the erroneous loading prevention groove in the battery case is formed, and avoids the erroneous loading prevention groove, there is no spatial waste, and thereby it is possible to offer the battery pack with large capacity in spite of the whole size.

In the present invention, since the negative pole side tab extended from the can bottom of the battery cell to the battery cell lid side is divided into the can bottom side tab and the battery cell lid side tab, and the PTC is disposed between these can bottom side tab and battery cell lid side tab, the PTC can be spatially housed in the battery case without being forced to, so that the safety of the battery pack can be improved.

The specific forms and structures of respective portions shown in the above-mentioned embodiments illustrate merely one example of the embodiments in implementing the present invention, and thereby, the technical scope of the present invention should not be limitedly construed.

DESCRIPTION OF REFERENCE NUMERALS

1 . . . VIDEO CAMERA (MAIN BODY SIDE APPARATUS)
17 . . . OVERHANG (LOCKIN PORTION)
17a . . . CUTAWAY PORTION
18 . . . BLOCKING PROJECTING BAR
18a . . . SMALL PROJECTING PORTION
19 . . . BLOCKING PORTION
30 . . . MAIN BODY SIDE TERMINAL
40 . . . LOCK MECHANISM
100, 201 . . . BATTERY PACK
111 . . . DISCRIMINATING TAB
120 . . . BATTERY SIDE TERMINAL
202 . . . BATTERY CASE
203 . . . BATTERY CELL
206 . . . BATTERY TERMINAL
210 . . . ERRONEOUS LOADING PREVENTION GROOVE
211 . . . BATTERY CELL CAN
211a . . . CAN BOTTOM
212 . . . BATTERY CELL LID
215 . . . NEGATIVE POLE SIDE TAB
216 . . . CAN BOTTOM SIDE TAB
217 . . . BATTERY CELL LID SIDE TAB
218 . . . PTC
300 . . . ELECTRONIC APPARATUS
302 . . . BATTERY LOADING PORTION

The invention claimed is:

1. A battery device for being loaded on an electronic apparatus, comprising:
a casing configured to house at least one battery cell therein, said casing having first and second side surfaces and first and second end surfaces, said first end surface defining an outermost surface of said casing;
a plurality of terminal members;
a terminal case disposed in said casing, said terminal case having a front surface and a top surface;
a plurality of terminal grooves disposed in said terminal case, said terminal grooves being opened to two surfaces of said terminal case and in which said plurality of terminal members are disposed;
first and second guide grooves in said terminal case, provided at respective transverse opposite ends of said plurality of terminal grooves, and opened to said two surfaces of said terminal case;
first and second terminal positioning rib bodies formed on said casing and projecting from said first end surface for positioning the terminal case in said casing, each of said positioning rib bodies extending in a direction beyond the top surface of said terminal case; and
wherein said terminal case, including said front surface, projects outwardly from said first end surface of said casing so as to extend beyond said outermost surface of said casing.

2. The battery device according to claim 1, further including a concave portion disposed at a corner formed between said end surface and a longitudinal side surface.

3. The battery device according to claim 2, wherein said concave portion is adapted to receive and engage a locking member in said electronic apparatus.

4. The battery device according to claim 1, wherein said terminal case is offset from a longitudinal center line of said casing.

* * * * *